US009833765B2

(12) United States Patent
Mangarella et al.

(10) Patent No.: US 9,833,765 B2
(45) Date of Patent: Dec. 5, 2017

(54) CARBIDE-DERIVED CARBONS HAVING INCORPORATED METAL CHLORIDE OR METALLIC NANOPARTICLES

(71) Applicant: Georgia Tech Research Corporation, Atlanta, GA (US)

(72) Inventors: Michael Charles Mangarella, Atlanta, GA (US); Krista S. Walton, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 15/137,338

(22) Filed: Apr. 25, 2016

(65) Prior Publication Data
US 2016/0310929 A1    Oct. 27, 2016

Related U.S. Application Data

(60) Provisional application No. 62/152,441, filed on Apr. 24, 2015.

(51) Int. Cl.
| | |
|---|---|
| *B01J 20/20* | (2006.01) |
| *B01J 23/745* | (2006.01) |
| *B01J 21/18* | (2006.01) |
| *B01J 37/24* | (2006.01) |
| *B01J 37/18* | (2006.01) |
| *B01J 20/06* | (2006.01) |
| *B01J 20/02* | (2006.01) |
| *B01J 20/28* | (2006.01) |
| *B01J 20/32* | (2006.01) |
| *B01J 20/30* | (2006.01) |
| *B01J 23/28* | (2006.01) |
| *B01J 23/74* | (2006.01) |
| *B01J 27/128* | (2006.01) |
| *B01J 27/132* | (2006.01) |
| *B01J 35/10* | (2006.01) |
| *B01J 35/00* | (2006.01) |

(52) U.S. Cl.
CPC ............... *B01J 20/20* (2013.01); *B01J 20/02* (2013.01); *B01J 20/06* (2013.01); *B01J 20/28061* (2013.01); *B01J 20/28064* (2013.01); *B01J 20/28071* (2013.01); *B01J 20/3085* (2013.01); *B01J 20/3204* (2013.01); *B01J 20/3236* (2013.01); *B01J 21/18* (2013.01); *B01J 21/185* (2013.01); *B01J 23/28* (2013.01); *B01J 23/74* (2013.01); *B01J 23/745* (2013.01); *B01J 27/128* (2013.01); *B01J 27/132* (2013.01); *B01J 35/006* (2013.01); *B01J 37/18* (2013.01); *B01J 37/24* (2013.01); *B01J 35/002* (2013.01); *B01J 35/1019* (2013.01); *B01J 35/1023* (2013.01); *B01J 35/1028* (2013.01); *B01J 35/1038* (2013.01); *B01J 35/1042* (2013.01); *B01J 35/1047* (2013.01); *B01J 35/1057* (2013.01); *B01J 35/1061* (2013.01)

(58) Field of Classification Search
CPC ... B01J 20/02; B01J 20/06; B01J 20/20; B01J 20/28061; B01J 20/28064; B01J 20/28071; B01J 20/3085; B01J 20/3204; B01J 20/3236; B01J 21/02; B01J 21/18; B01J 23/28; B01J 23/745; B01J 23/75; B01J 23/755; B01J 23/881; B01J 23/882; B01J 23/883; B01J 27/125; B01J 27/128; B01J 27/132; B01J 27/22; B01J 35/002; B01J 35/006; B01J 35/1019; B01J 35/1023; B01J 35/1038; B01J 35/1042; B01J 37/08; B01J 37/008; B01J 37/18; B01J 37/24
USPC .......................... 502/177, 182, 185; 423/439
See application file for complete search history.

(56) References Cited

U.S. PATENT DOCUMENTS

| | | | |
|---|---|---|---|
| 3,066,099 A | * | 11/1962 | Mohun ................... B01J 27/22 423/449.1 |
| 7,678,452 B2 | | 3/2010 | Kim et al. |
| 9,576,694 B2 | * | 2/2017 | Gogotsi ................ H01M 4/583 |

(Continued)

FOREIGN PATENT DOCUMENTS

EE    WO 2009101607 A1 *  8/2009  ......... C04B 38/0022

OTHER PUBLICATIONS

"Molybdenum carbide-derived carbon for hydrogen storage," Hyun Seok Kim et al. Microporous and Mesoporous Materials 120 (2009), pp. 267-271.*

(Continued)

*Primary Examiner* — Patricia L Hailey
(74) *Attorney, Agent, or Firm* — Thomas|Horstemeyer, LLP

(57) ABSTRACT

Carbide-derived carbons are provided that have high dynamic loading capacity for high vapor pressure gasses such as $H_2S$, $SO_2$, or $NH_3$. The carbide-derived carbons can have a plurality of metal chloride or metallic nanoparticles entrapped therein. Carbide-derived carbons are provided by extracting a metal from a metal carbide by chlorination of the metal carbide to produce a porous carbon framework having residual metal chloride nanoparticles incorporated therein, and annealing the porous carbon framework with $H_2$ to remove residual chloride by reducing the metal chloride nanoparticles to produce the metallic nanoparticles entrapped within the porous carbon framework. The metals can include Fe, Co, Mo, or a combination thereof. The carbide-derived carbons are provided with an ammonia dynamic loading capacity of 6.9 mmol $g^{-1}$ to 10 mmol $g^{-1}$ at a relative humidity of 0% RH to 75% RH.

12 Claims, 20 Drawing Sheets

(56) References Cited

U.S. PATENT DOCUMENTS

| | | | | |
|---|---|---|---|---|
| 2006/0165584 | A1* | 7/2006 | Gogotsi | B01J 20/20 423/445 B |
| 2008/0248310 | A1* | 10/2008 | Kim | B82Y 30/00 428/408 |
| 2009/0036302 | A1* | 2/2009 | Gogotsi | B01J 20/20 502/402 |
| 2009/0117094 | A1* | 5/2009 | Leis | B01J 20/20 424/125 |
| 2009/0213529 | A1* | 8/2009 | Gogotsi | H01M 4/96 361/502 |
| 2009/0301902 | A1* | 12/2009 | Gogotsi | B01J 20/20 206/0.7 |
| 2010/0107731 | A1* | 5/2010 | Kippeny | B01J 20/28011 73/23.41 |
| 2010/0285392 | A1* | 11/2010 | Elabd | H01M 4/8828 429/484 |
| 2012/0148473 | A1* | 6/2012 | Kramarenko | C01B 31/087 423/445 R |
| 2014/0017158 | A1 | 1/2014 | Sengupta et al. | |
| 2014/0142007 | A1* | 5/2014 | Lim | C10M 103/02 508/129 |
| 2014/0251134 | A1 | 9/2014 | Sengupta et al. | |

OTHER PUBLICATIONS

"Synthesis and characterization of aluminum carbide-derived carbon with residual aluminum-based nanoparticles," Colton M. Moran et al. Carbon 114 (2017), pp. 482-495.*

"Electrochemical and physical characterisation of Pt-nanocluster activated molybdenum carbide derived carbon electrodes," K. Vaarmets et al. Electrochimica Acta 104 (2013), pp. 216-227.*

"Oxygen reduction on molybdenum carbide derived micromesoporous carbon electrode in alkaline solution," R. Jager et al. Electrochemistry Communications 35 (2013), pp. 97-99.*

"Influence of specific surface area and microporosity-mesoporosity of pristine and Pt-nanoclusters modified carbide derived carbon electrodes on the oxygen electroreduction," E. Lust et al. Electrochimica Acta 140 (2014), pp. 294-303.*

"Exploring the role of the catalytic support sorption capacity on the hydrodechlorination kinetics by the use of carbide-derived carbons," Macarena Munoz et al. Applied Catalysis B: Environmental 203 (2017), pp. 591-598.*

"Synthesis of embedded iron nanoparticles in Fe3C-derived carbons," Michael C. Mangarella et al. Carbon 79 (2014), pp. 74-84.*

"The effect of Mo2C derived carbon pore size on the double-layer characteristics in propylene carbonate-based electrolyte," J. Leis et al. Carbon 48 (2010), pp. 4001-4008.*

* cited by examiner

CARBIDE-DERIVED CARBONS HAVING INCORPORATED METAL CHLORIDE OR METALLIC NANOPARTICLES

CROSS-REFERENCE TO RELATED APPLICATIONS

This application claims priority to, and the benefit of, co-pending U.S. provisional application entitled "IRON CARBIDE-DERIVED CARBONS WITH EMBEDDED RESIDUAL IRON PARTICLES" having Ser. No. 62/152,441, filed Apr. 24, 2015, the contents of which are incorporated by reference in their entirety.

TECHNICAL FIELD

The present disclosure generally relates to porous carbon structures, especially porous carbide-derived carbons for gas storage, filtration, catalysis, capacitance, and other applications.

BACKGROUND

Ammonia is a highly toxic and corrosive gas that is a key component within the agriculture and chemical industries. It is heavily produced for its essential role in fertilizer within agriculture, and also found as a significant emitted compound from livestock and wastewater. Even at low concentrations, ammonia can negatively impact the growth and health of livestock as well as the well-being of industrial workers that are responsible for its transportation, use, and removal. The US Occupational Safety and Health Administration (OSHA) has set a permissible exposure limit (PEL) for ammonia at 50 ppm, highlighting the need to separate any appreciable concentration of ammonia from air. Due to its small size and high vapor pressure, ammonia remains a challenging gas for common adsorbents to adequately remove at ambient conditions.

For high vapor pressure gases such as ammonia, physisorption interactions are typically not strong enough to promote high adsorption loadings. As a result, many small, high vapor pressure toxic industrial chemicals (TICs), such as $H_2S$, $SO_2$, and $NH_3$ are of primary concern for emergency and military personnel due to their high toxicity and inability to be effectively removed by many adsorbents. The removal of $NH_3$ from air is particularly important due to its pervasive use in the fertilizer and waste treatment industries, as well as its low permissible exposure limit (PEL) of 50 ppm.

Porous carbons have long seen pervasive use within the gas separation and purification industries due to their low cost, wide chemical and thermal stability, and high bulk porosity Over the past few decades, carbon materials have garnered great attention as catalyst supports, sorbents, electrodes, etc. due to increased control over their pore structure through the use of nanocasting and other synthesis approaches. In addition, increasingly ordered carbon structures, such as SWNTs, graphene, fullerenes and nanodiamond, have been investigated due to great inherent tribological and conductive properties. A new class of highly tailorable nanoporous carbons, carbide-derived carbons (CDCs), has also recently been established. These materials are produced through the selective extraction of a metal or heteroatom from a carbide precursor, commonly by halogenation. The resulting nanoporous carbon exhibits large specific surface areas and a high degree of microporosity.

There has been growing interest to functionalize CDCs with metal nanoparticles. Many traditional methods focus on impregnation of the metal by wetting the adsorbent with a solution containing the metal precursor. However, this often results in limited control of metal particle size, pore blockage of the carbon support, and weak support-metal interactions, particularly within templated pore architectures that rely on interconnecting pores.

There remains a need for improved carbide derived carbons and methods of making thereof that overcome the aforementioned deficiencies.

SUMMARY

In various aspects, carbide-derived carbons are provided that overcome one or more of the aforementioned deficiencies. For example, carbide-derived carbons are provided containing a plurality of metal chloride or metallic nanoparticles entrapped therein. The carbide-derived carbon can be made by the steps of extracting a metal from a metal carbide by chlorination of the metal carbide at a temperature of about 500° C. to about 700° C. for a period of time from about 0.25 hours to about 2 hours to produce a porous carbon framework having residual metal chloride nanoparticles incorporated therein, and annealing the porous carbon framework with $H_2$ to remove residual chloride by reducing the metal chloride nanoparticles to produce the metallic nanoparticles entrapped within the porous carbon framework. The metal can be Fe, Mo, or a combination thereof. The carbide-derived carbon can have a surface area of about 300 $m^2$ $g^{-1}$ to about 900 $m^2$ $g^{-1}$. The carbide-derived carbon can have a pore volume of about 0.25 cc $g^{-1}$ to about 0.5 cc $g^{-1}$.

In various aspects, carbide-derived carbons are provided having a porous carbon framework having a plurality of metal chloride or metallic nanoparticles entrapped therein. In various aspects, the carbide-derived carbons are made by the steps of extracting a metal from a metal carbide by chlorination of the metal carbide to produce a porous carbon framework having residual metal chloride nanoparticles incorporated therein. Carbide-derived carbons having metallic nanoparticles entrapped therein can then be prepared by removing residual chloride by reducing the metal chloride nanoparticles to produce metallic nanoparticles entrapped within the porous carbon framework. Reducing the metal chloride can include annealing with $H_2$ gas to reduce the metal chloride nanoparticles and produce the metallic nanoparticles.

The nanoparticles can contain a metal such as Fe, Co, Ni, Al, Mo, or a combination thereof. While the nanoparticles can be tailored to a variety of sizes, in various aspects the nanoparticles have an average diameter of 1 nm to 10 nm. The metal can be a residual metal from the metal carbide that is entrapped in the porous organic structure of the carbide-derived carbon. The metal can be present in an amount from about 2.0 wt % to about 25.0 wt % based upon the weight of the carbide-derived carbon.

The carbide-derived carbon can be made with a variety of surface areas and pore sizes. In certain aspects, the carbide-derived carbon has a surface area of about 300 $m^2$ $g^{-1}$ to about 1000 $m^2$ $g^{-1}$. In some aspects, the carbide-derived carbon has a pore volume of about 0.2 cc $g^{-1}$ to about 0.8 cc $g^{-1}$.

The carbide-derived carbon can be made to have a plurality of acidic functional groups, e.g. acidic functional groups covalently attached to the porous carbon framework. The acidic functional groups can be attached covalently to the porous carbon framework by reacting the carbide-derived carbon with a strong acid such as nitric acid or sulfuric acid to produce the carbide-derived carbon having a plurality of acidic functional groups covalently attached to the porous carbon framework. The acidic functional groups can be present at a concentration of about 2 mmol $g^{-1}$ to about 10 mmol $g^{-1}$ based upon the weight of the carbide-derived carbon.

In various aspects, the carbide-derived carbon can be used for filtration applications, e.g. for high vapor pressure gases such as $H_2S$, $SO_2$, and $NH_3$. In some aspects, the carbide-derived carbon can have one or both of an ammonia dynamic loading capacity of 1.5 mmol $g^{-1}$ to 10 mmol $g^{-1}$ at 0% RH and an ammonia dynamic loading capacity of 3 mmol $g^{-1}$ to 15 mmol $g^{-1}$ at 75% RH. In various aspects, the ammonia dynamic loading capacity is about 6.9 mmol $g^{-1}$ to about 10 mmol $g^{-1}$ at any relative humidity from 0% RH to 75% RH. In various aspects, the carbide-derived carbon has an ammonia dynamic loading capacity that is 300% to 1500% greater than the ammonia dynamic loading capacity of the otherwise same carbide-derived carbon except without the metallic nanoparticles, wherein the ammonia dynamic loading capacities are measured under the same conditions and at the same relative humidity.

Methods of making a carbide-derived carbon are provided. The methods can include etching or extracting a metal from a metal carbide to produce a porous carbon framework having metal chloride nanoparticles entrapped therein. The methods can include the partial chlorination of the metal carbide to leave residual metal chloride nanoparticles entrapped in the porous carbon framework. The chlorination can include flowing chlorine gas through the metal carbide at an elevated temperature, e.g. about 200° C. to 900° C., for a period of time from about 0.2 hours to about 3 hours. The methods can include annealing the porous carbon framework at an elevated temperature, e.g. about 200° C. to 900° C. The annealing can include exposing the porous carbon framework to $H_2$ gas to reduce the residual metal chloride nanoparticles, thereby forming metallic nanoparticles entrapped within the porous organic framework.

The methods can include attaching acidic functional groups to the porous carbon framework. The addition of acidic functional groups can lead to improved dynamic loading capability of the carbide-derived carbon. The methods can include reacting the carbide-derived carbon with a strong acid solution, e.g. a concentrated solution of sulfuric acid, nitric acid, or a combination thereof. The methods can include reacting the carbide-derived carbon with a concentrated solution of sulfuric acid at an elevated temperature, e.g. about 70° C., for a period of time up to about 12 hours, and/or reacting the carbide-derived carbon with a concentrated solution of nitric acid at an elevated temperature, e.g. about 70° C., for a period of time up to about 6 hours.

In various aspects, filtration devices are provided containing a carbide-derived carbon described herein, as well as methods of using the carbide-derived carbons and filtration devices for gas filtration, e.g. for high vapor pressure gases such as $H_2S$, $SO_2$, and $NH_3$.

Other systems, methods, features, and advantages of the carbide-derived carbons and methods of making thereof will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

DETAILED DESCRIPTION

Figure 1:
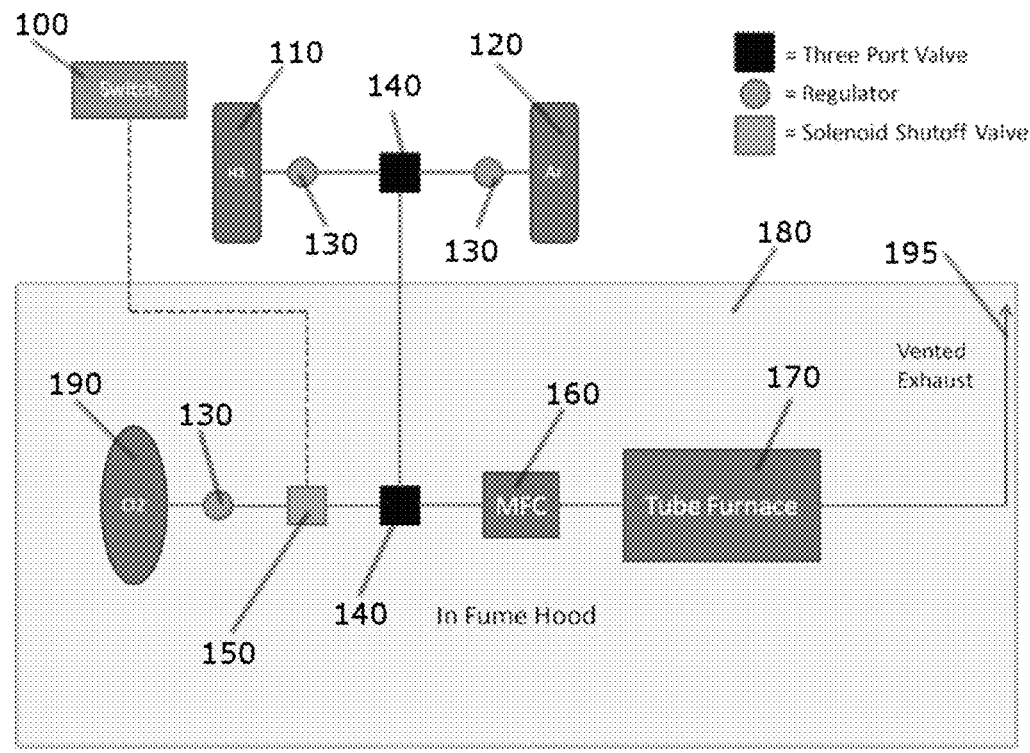
FIG. 1 is a schematic of the carbide-derived carbon chlorination reactor.

In various aspects, carbide-derived carbons and methods of making carbide-derived carbons are provided. In particular aspects, carbide-derived carbons are provided having metal chloride or metallic nanoparticles entrapped therein and/or having acidic functional groups covalently attached. The carbide-derived carbons can be prepared by etching or partially removing metal from a metal carbide via chlorination to leave residual metal chloride nanoparticles, followed by reducing the metal chloride nanoparticles to produce metallic nanoparticles entrapped within the porous carbon framework of the carbide-derived carbon.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The terms "pore diameter" and "pore size", as used interchangeably herein, refer to a measure of the effective diameter of the pores in the composition. The pore diameter can be the effective diameter of the largest gas molecule that can pass through the majority of the pores in the composition. The pore diameter can be estimated from the average pore diameter obtained from crystallographic measurements. The pore diameter can be estimated from measured adsorption isotherms for an inert gas such as $N_2$ using models such as the Horvath-Kawazoe model or the Quenched Solid Density Functional Theory (QSDFT) model.

The term "pore volume," as generally used herein, refers to the average volume of pores per unit mass of a material, typically given in cubic centimeters per gram (cc g$^{-1}$) as can be estimated, for example, from the Quenched Solid Density Functional Theory (QSDFT) model fit to adsorption and desorption isotherms of an inert gas such as $N_2$. In some instances the pore volume may further be described as the micropore volume ($V_{micro}$) or the mesopore volume ($V_{meso}$), which refer to the average volume per unit mass of the micropores (diameter <2 nm) and the mesopores (diameter=2-50 nm) respectively.

Methods of Making Carbide-Derived Carbons

Various methods of making carbide-derived carbons are provided, and especially for making carbide-derived carbons having metal chloride or metallic nanoparticles entrapped within the porous carbon framework of the carbide-derived carbon. The methods can allow for precise control over one or more of the amount of residual metal in the carbide-derived carbon, the surface area of the carbide-derived carbon, the pore volume of the carbide-derived carbon, and the amount and presence of acidic functional groups on the carbide-derived carbons.

The methods can include making the carbide-derived carbon from a metal carbide. A carbide, as used herein, refers to a material composed primarily of carbon and one or more elements less electronegative than carbon. Suitable metal carbides can include iron carbides such as $Fe_3C$; cobalt carbides such as CoC, $Co_2C$, and $Co_3C$; and molybdenum carbides such as MoC and $Mo_2C$. Suitable carbides can include a carbide of a Group III metal such as Sc, Y, or Al. Suitable carbides can include a carbide of a group IV metal such as Ti or Zr. Suitable carbides can include a carbide of a group V metal such as V or Nb. Suitable carbides can include a carbide of a group VI metal such as Cr or Mo. Suitable carbides can include a carbide of a group VII metal such as Mn or Tc. Suitable carbides can include a carbide of a group VII metal such as Fe, Co, Ni, Ru, Rh, or Pd. In various aspects, the metal carbide is an interstitial carbide such as CrC, TiC, or WC. In some aspects, the metal carbide is an intermediate transition metal carbide, e.g. a carbide containing Cr, Mn, Fe, Co, Ni, or a combination thereof. The carbide can be a carbide of a metal having a metallic radius of about 140 pm, 139 pm, 138 pm, 137 pm, 136 pm, 135 pm, or less. In some aspects, the metal carbide contains a metal selected from Al, Fe, Co, Ni, Mo, and a combination thereof. The carbide can be granular, e.g. having a particle size of −120 mesh, −140 mesh, −170 mesh, −200 mesh, −230 mesh, +400 mesh, +325 mesh, +270 mesh, +230 mesh, or a combination thereof.

The methods can include etching or extracting metal from the metal carbide using chlorine gas to produce a porous carbon framework having metal chloride nanoparticles entrapped therein. The methods can include the partial chlorination of the metal carbide to leave residual metal chloride nanoparticles entrapped in the porous carbon framework. The chlorination can include flowing chlorine gas through the metal carbide at an elevated temperature for a period of time. The metal carbide can be placed in a horizontal tube furnace and heated to the chlorination temperature while under an inert gas, e.g. an Ar gas flow. Once at the chlorination temperature, the flow can be switched to chlorine gas, e.g. having a flow rate from about 15 ml/min to 30 ml/min. The chlorination temperature can be about 200° C. to 1000° C., about 400° C. to 1000° C., about 500° C. to 1000° C., about 200° C. to 900° C., about 500° C. to 900° C., about 200° C. to 800° C., about 500° C. to 800° C., about 200° C. to 700° C., about 500° C. to 700° C., about 500° to 600° C., about 550° C. to 650° C., or about 600° C. to 700° C. The period of time for the chlorination can be about 0.2 hours to 5 hours, about 0.2 hours to 4 hours, about 0.25 hours to 4 hours, about 0.25 hours to 3 hours, about 0.25 hours to 3 hours, or about 0.25 hours to 1.5 hours. The methods can include annealing the porous carbon framework at an elevated temperature, e.g. about 500° C. to 900° C., about 500° C. to 800° C., about 500° C. to 700° C., or about 550° C. to 650° C., for a period of time from about 1 hours to 10 hours, about 1 hours to 8 hours, about 2 hours to 7 hours, about 2 hours to 5 hours, about 2 hours to 4 hours, or about 3 hours.

The annealing can include reducing the residual metal chloride nanoparticles thereby forming metallic nanoparticles entrapped within the carbide-derived carbon, i.e. entrapped within the porous carbon framework. The annealing can include exposing the porous carbon framework to $H_2$ gas to reduce the residual metal chloride nanoparticles, thereby forming metallic nanoparticles entrapped within the porous organic framework. The $H_2$ gas can be a 5% $H_2$ gas in a noble gas at a flow rate of about 50 ml min$^{-1}$ to 150 ml min$^{-1}$, or about 100 ml min$^{-1}$. The presence of acidic functional groups can increase the loading capacity of the carbide-derived carbon. Therefore, the methods can include reacting the carbide-derived carbon with a strong acid to attach a plurality of acidic functional groups. Suitable strong acids can include sulfuric acid, nitric acid, or a combination thereof. The strong acid can include 10 M to 15 M $H_2SO_4$ or 12 M to 18 M $HNO_3$. In some aspects, the methods includes reacting the carbide-derived carbon with the sulfuric acid solution for a period of time from about 6 hours to 30 hours or 12 hours to 24 hours at a temperature of about 70° C. to 200° C. In some aspects, the methods includes reacting the carbide-derived carbon with the nitric acid solution for a period of time from about 3 hours to 9 hours or about 6 hours at a temperature of about 70° C. to 100° C. The methods can include reacting the carbide-derived carbon with the strong acid for a period of time and at a temperature sufficient to achieve acidic functional groups covalently attached to the porous carbon framework at a concentration of about 1 mmol g$^{-1}$ to 20 mmol g$^{-1}$, about 2 mmol g$^{-1}$ to 20 mmol g$^{-1}$, about 2 mmol g$^{-1}$ to 10 mmol g$^{-1}$, about 3 mmol g$^{-1}$ to 10 mmol g$^{-1}$, or about 3 mmol g$^{-1}$ to 7 mmol g$^{-1}$ based upon the weight of the carbide-derived carbon.

Carbide-Derived Carbons

Various carbide-derived carbons are provided. The carbide-derived carbons can be made by one of many methods described herein. For example, The carbide-derived carbon can be made by the steps of extracting a metal from a metal carbide by chlorination of the metal carbide at a temperature of about 500° C. to about 700° C. for a period of time from about 0.25 hours to about 2 hours to produce a porous carbon framework having residual metal chloride nanoparticles incorporated therein, and annealing the porous carbon framework with H$_2$ to remove residual chloride by reducing the metal chloride nanoparticles to produce the metallic nanoparticles entrapped within the porous carbon framework.

The carbide-derived carbons are provided containing a plurality of metal chloride or metallic nanoparticles entrapped therein. In some aspects, the nanoparticles contain Fe, Co, Mo, or a combination thereof. The nanoparticles can contain a metal such as Fe, Co, Ni, Al, Mo, or a combination thereof. In some aspects, the nanoparticles can include a Group III metal such as Sc, Y, or Al. In some aspects, the nanoparticles can include group IV metal such as Ti or Zr. In some aspects, the nanoparticles can include a group V metal such as V or Nb. In some aspects, the nanoparticles can include a group VI metal such as Cr or Mo. In some aspects, the nanoparticles can include a group VII metal such as Mn or Tc. In some aspects, the nanoparticles can include a group VII metal such as Fe, Co, Ni, Ru, Rh, or Pd. In some aspects, the nanoparticles can include a transition metal such as Cr, Mn, Fe, Co, Ni, or a combination thereof. In some aspects, the nanoparticles can include a metal having a metallic radius of about 140 pm, 139 pm, 138 pm, 137 pm, 136 pm, 135 pm, or less. The nanoparticle can be a metal chloride nanoparticle or, in some embodiments, a metallic nanoparticle.

While the nanoparticles can be tailored to a variety of sizes, in various aspects the nanoparticles have an average diameter of about 1 nm to 20 nm, about 1 nm to 10 nm, about 10 nm to 20 nm, about 2 nm to 10 nm, about 3 nm to 8 nm, or about 10 nm to 15 nm. The metal in the metal chloride or metallic nanoparticles can be a residual metal from the metal carbide that is entrapped in the porous organic structure of the carbide-derived carbon. The metal can be present in an amount from about 0.1 wt % to about 25 wt %, about 0.1 wt % to about 20 wt %, about 1 wt % to about 25 wt %, about 1 wt % to about 20 wt %, about 1 wt % to about 15 wt %, about 2 wt % to about 15 wt %, about 2 wt % to about 12 wt %, or about 3 wt % to about 6 wt % based upon the weight of the carbide-derived carbon.

The carbide-derived carbons can have a large surface area and a well-defined pore volume. The carbide-derived carbon can have a surface area of about 200 m$^2$ g$^{-1}$ to about 1200 m$^2$ g$^{-1}$, about 300 m$^2$ g$^{-1}$ to about 1200 m$^2$ g$^{-1}$, about 300 m$^2$ g$^{-1}$ to about 1000 m$^2$ g$^{-1}$, about 300 m$^2$ g$^{-1}$ to about 900 m$^2$ g$^{-1}$, about 300 m$^2$ g$^{-1}$ to about 600 m$^2$ g$^{-1}$, about 100 m$^2$ g$^{-1}$ to about 200 m$^2$ g$^{-1}$, about 200 m$^2$ g$^{-1}$ to about 300 m$^2$ g$^{-1}$, about 300 m$^2$ g$^{-1}$ to about 400 m$^2$ g$^{-1}$, about 400 m$^2$ g$^{-1}$ to about 500 m$^2$ g$^{-1}$, about 500 m$^2$ g$^{-1}$ to about 600 m$^2$ g$^{-1}$, about 600 m$^2$ g$^{-1}$ to about 700 m$^2$ g$^{-1}$, about 700 m$^2$ g$^{-1}$ to about 800 m$^2$ g$^{-1}$, about 800 m$^2$ g$^{-1}$ to about 900 m$^2$ g$^{-1}$, or about 900 m$^2$ g$^{-1}$ to about 1000 m$^2$ g$^{-1}$. The carbide-derived carbon can have a pore volume of about 0.1 cc g$^{-1}$ to about 1.0 cc g$^{-1}$, about 0.1 cc g$^{-1}$ to about 0.8 cc g$^{-1}$, about 0.2 cc g$^{-1}$ to about 0.8 cc g$^{-1}$, about 0.25 cc g$^{-1}$ to about 0.75 cc g$^{-1}$, about 0.25 cc g$^{-1}$ to about 0.5 cc g$^{-1}$, about 0.25 cc g$^{-1}$ to about 0.5 cc g$^{-1}$, about 0.2 cc g$^{-1}$ to about 0.3 cc g$^{-1}$, about 0.3 cc g$^{-1}$ to about 0.4 cc g$^{-1}$, about 0.4 cc g$^{-1}$ to about 0.5 cc g$^{-1}$, or about 0.5 cc g$^{-1}$ to about 0.6 cc g$^{-1}$.

The carbide-derived carbon can include a plurality of acidic functional groups. For example, the acidic functional groups can be covalently attached to the porous organic framework of the carbide-derived carbon. The acidic functional groups can be covalently attached to the porous carbon framework at a concentration of about 1 mmol g$^{-1}$ to 20 mmol g$^{-1}$, about 2 mmol g$^{-1}$ to 20 mmol g$^{-1}$, about 2 mmol g$^{-1}$ to 10 mmol g$^{-1}$, about 3 mmol g$^{-1}$ to 10 mmol g$^{-1}$, or about 3 mmol g$^{-1}$ to 7 mmol g$^{-1}$ based upon the weight of the carbide-derived carbon.

The carbide-derived carbon can have a high dynamic loading capacity for a high vapor pressure gas such as H$_2$S, SO$_2$, or NH$_3$. The dynamic loading capacity can be about 1.5 mmol g$^{-1}$ to 15 mmol g$^{-1}$, about 3 mmol g$^{-1}$ to 15 mmol g$^{-1}$, about 1.5 mmol g$^{-1}$ to 12 mmol g$^{-1}$, about 1.5 mmol g$^{-1}$ to 10 mmol g$^{-1}$, about 1.5 mmol g$^{-1}$ to 9 mmol g$^{-1}$, about 1.5 mmol g$^{-1}$ to 8 mmol g$^{-1}$, about 3 mmol g$^{-1}$ to 13 mmol g$^{-1}$, about 3 mmol g$^{-1}$ to 10 mmol g$^{-1}$, about 3 mmol g$^{-1}$ to 9 mmol g$^{-1}$, about 3 mmol g$^{-1}$ to 8 mmol g$^{-1}$, about 5 mmol g$^{-1}$ to 8 mmol g$^{-1}$, about 5 mmol g$^{-1}$ to 9 mmol g$^{-1}$, about 5 mmol g$^{-1}$ to 10 mmol g$^{-1}$, about 5 mmol g$^{-1}$ to 12 mmol g$^{-1}$, or about 5 mmol g$^{-1}$ to 15 mmol g$^{-1}$ at a relative humidity of about 0% RH, about 15% RH, about 30% RH, about 45% RH, about 60% RH, about 75% RH, or about 90% RH. In various aspects, the carbide-derived carbon has an ammonia dynamic loading capacity of about of 3 mmol g$^{-1}$ to 15 mmol g$^{-1}$ at 75% RH, about 1.5 mmol g$^{-1}$ to 10 mmol g$^{-1}$ at 0% RH, or both. In various aspects, the carbide-derived carbon has an ammonia dynamic loading capacity that is greater than the ammonia dynamic loading capacity of the otherwise same carbide-derived carbon except without the metal nanoparticles and/or without the acid functional groups. The ammonia dynamic loading capacity can be about 100% to 2000% greater, about 300% to 2000% greater, about 300% to 1500% greater, about 400% to 1500% greater, about 400% to 1200% greater, or about 600% to 1200% greater than the dynamic loading capacity of the otherwise same carbide-derived carbon except without the metal nanoparticles and/or without the acid functional groups. The ammonia dynamic loading capacity can be measured under the same conditions and at the same relative humidity, e.g. about 0% RH, about 15% RH, about 30% RH, about 45% RH, about 60% RH, about 75% RH, or about 90% RH.

Methods and Devices for Using Carbide-Derived Carbons

The carbide-derived carbons provided herein can be used for filtration, especially for the filtration of high vapor pressure gasses such as H$_2$S, SO$_2$, or NH$_3$. The carbide-derived carbon can be used in a filter medium alone or in a combination with one or more additional high surface area particles, e.g. activated carbon, alumina, zeolites, and the like. The carbide-derived carbon can be used in a filter mask or gas mark, as well as in a removable canister therefor. The carbide-derived carbon particles can be combined with one or more additional high surface area particles, e.g. activated carbon, alumina, zeolites, and the like.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Methods

Carbide-derived Carbon Synthesis Experimental Setup

For this work, carbide-derived carbons were synthesized on an in-house chlorination setup, a schematic of which is found in FIG. 1. The system was designed similar to setups in literature, generally having a sample placed on a quartz or alumina boat within a quartz tube that can be heated using a horizontal tube furnace (170) (Leis J, et al., *Carbon*, 2002, 40(9):1559-64; Gogotsi Y, et al., *Nat Mater.* 2003, 2(9):591-4; Avila-Brande D, et al., *Carbon*, 2006, 44(4):753-61; Becker P, et al., *Chemical Engineering Journal*, 2010, 159(1-3):236-41; Borchardt L, et al., *Carbon*, 2012, 50(5): 1861-70). Many safety and design constraints were taken under consideration to minimize the risk involved with handling concentrated chlorine gas and ensuring smooth operation within limited fume hood space. A full schematic of the chlorination reactor setup can be seen in FIG. 1. A chlorine gas (Airgas 99.5%) lecture bottle (190) was attached to a cross purge panel with a stainless steel regulator (130) (Nexair PRS40223731-180D) and sealed with a PTFE o-ring. After the regulator, an actuator ball valve (150) (Swagelok SS-43GS4-42AC) hooked up to a switch (100) outside the fume hood (180) is used to remotely enable chlorine flow to regulator. The switch is also used as an emergency shutoff valve, to limit the flow of chlorine past the regulator in case of any substantial leak downstream that would prevent a user from safely reaching in to close the chlorine lecture bottle manually. The chlorine stream is regulated to the desired flow rate by a mass flow controller (160). A separate line, controlled by a mass flow meter, is used to dilute the chlorine gas to the desired concentration with Argon (120) (Airgas 99.999%). This line can also be switched to a 5% $H_2$ (110) in Argon tank using a 3-way valve (140) for CDC annealing, if desired.

All lines, except for the quartz tube, are ¼" OD PFA tubing. Although 316 stainless steel is rated as "Good" against dry chlorine, small amounts of $H_2O$ that are able to infiltrate the system as an impurity in reacting gases or from humid air during system maintenance can quickly convert $Cl_2$ to HCl and cause corrosion with stainless steel. In addition, these issues are easily spotted using PFA, as the distinctive yellow hue of HCl is a quick indicator of small amounts of water in the system likely due to inadequate purging after attaching the quartz reactor to the system. Despite their flexibility, no leak issues were seen with PFA.

The ¼" PFA is expanded to 1" OD, via several stainless steel fitting adapters to match the 1" OD of the quartz tube reactor. Two 1" Ultra Torr fittings with Viton o-rings are used to connect and disconnect a 20" long, 1" OD quartz tube from a horizontal tube furnace (Thermo Scientific Lindberg® Blue M® Mini-Mite™) where chlorination takes place at temperatures ranging from 200-1000° C. The effluent stream from the reactor is bubbled through a concentrated NaOH solution to neutralize excess chlorine gas, HCl, and metal chlorides, before exiting through the vented exhaust (195).

Ammonia Breakthrough System Experimental Setup

To evaluate the ammonia adsorption capabilities of the synthesized samples within this work, an ammonia breakthrough system was designed for dynamic adsorption experiments under both dry and humid conditions. The micro-bed setup was used to evaluate milligram quantities of both MOF and CDC materials as ammonia adsorbents. Both the experimental procedure and system specifications heavily mirrored an experimental setup designed by the Edgewood Chemical Biological Center (ECBC) (Long J W, et al., *Journal of Materials Chemistry.* 2011, 21(10):3477-84; Grant Glover T, et al., *Chemical Engineering Science*, 2011, 66(2):163-70; Jasuja H, et al., *Chemical Engineering Science*, 2015, 124(0):118-24). This allowed easy and systematic comparison between materials tested at the center and in our laboratory. After initial testing, a vertical bed orientation was chosen, as this was seen to have the best repeatability between multiple runs. To account for the dead volume within the system, a blank bed of sand was used to calculate the time ammonia would reach the sensor in the absence of a porous adsorbent. This was subtracted from the breakthrough time of evaluated samples.

Figure 2:
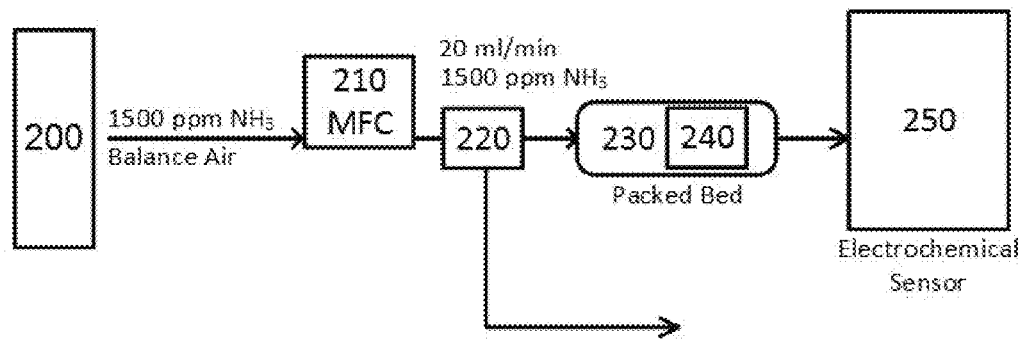
FIG. 2 is a schematic of the setup for ammonia breakthrough testing under dry conditions.
Figure 3:
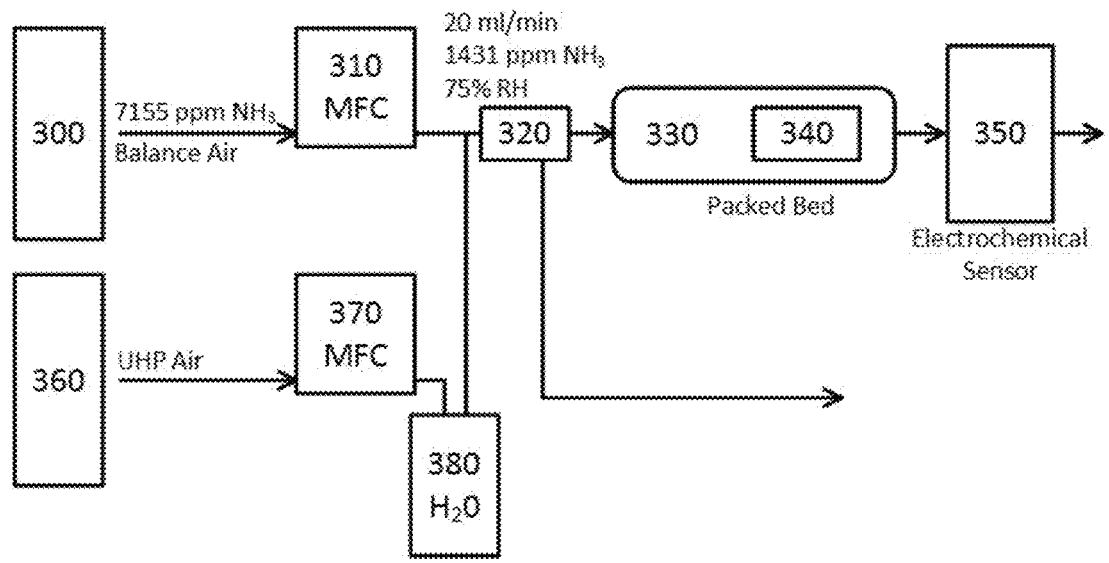
FIG. 3 is a schematic of the setup for ammonia breakthrough testing under humid conditions.

FIG. 2 and FIG. 3 provide the schematics for the ammonia breakthrough system under dry (0% RH) and humid (75% RH) conditions respectively.

The experimental procedure was as follows. Fine powder (240, 340) is packed within a quartz bed (230, 330) against a fine quartz frit of internal diameter (ID) 4 mm to a standardized bed volume of 55 $mm^3$. Samples are activated using heat tape for the desired time and temperature conditions under $N_2$ flow and then allowed to cool to room temperature. After cooling, the dry or wet breakthrough run was started. A dry run was initiated by switching the $N_2$ to a stream of 1500 ppm $NH_3$ (200, 300) in air at a rate of 20 ml $min^{-1}$ (Airgas). The effluent stream was analyzed using an Analytical Technology H10-15 ammonia electrochemical sensor (250, 350). Once the dilute $NH_3$ stream is switched on, data points are taken at 30 second intervals until the sensor reached 500 ppm $NH_3$, at which point the $NH_3$ is switched off to preserve the life of the sensor. $N_2$ flow was maintained at 50 ml $min^{-1}$ to capture the desorption behavior of the bed, and the sensor reading was recorded until the $NH_3$ concentration returned to ~100 ppm.

For humid breakthrough experiments, a humid stream is created by flowing air (360) at 16 ml $min^{-1}$ through a $H_2O$ bubbler (380), and then combining it with a $NH_3$ stream of 7155 ppm and a flow rate of 4 ml $min^{-1}$. The total mixed stream flowed through the packed bed at a rate of 20 ml $min^{-1}$ with a measured relative humidity of 75% and a calculated $NH_3$ concentration of 1431 ppm. The experimental procedure for wet and dry conditions were identical. Data points were again taken at 30 second intervals until the sensor reached 500 ppm $NH_3$, at which point the ammonia stream was switched to $N_2$ flow at 50 ml $min^{-1}$ and the desorption behavior was recorded. The gas flow is controlled by a mass flow controller (210, 310, 370) and three way valves (220, 320).

Example 1

Synthesis of Embedded Iron Nanoparticles in $Fe_3C$-derived Carbons

Carbide-derived carbons with embedded Fe nanoparticles were synthesized by partial chlorination of iron carbide at 600° C. Interestingly, the residual Fe studied by X-ray absorption near edge spectroscopy, scanning electron microscopy, and transmission electron microscopy showed the extraction process did not follow a layer-by-layer extraction process, as proposed in the literature for the chlorination of other carbides. Instead, a large percentage of iron carbide converted to iron (II) and iron (III) chloride nanoparticles, which remained trapped within the resulting nanoporous carbon framework. Further reductive treatment was used to produce dispersed Fe nanoparticles with an average particle diameter approaching 10 nm.

Materials

One gram of $Fe_3C$ (F. J. Brodmann & Co. 99.5% purity −200/+270 mesh) was placed on a quartz boat and inserted into a quartz tube of internal diameter (ID) 1", length 20" and into a horizontal tube furnace. Each sample was heated to 600° C. at a ramp rate of 5° C. min$^{-1}$ under Ar flow (Airgas 99.999%) at a rate of 100 ml min$^{-1}$ and at ambient pressure. After reaching 600° C., chlorine gas (Airgas 99.5%) flow was introduced into the reactor at a flow rate of 25 ml min$^{-1}$ for a predetermined chlorination time ranging from 0.25-3 hours. The Ar flow was maintained during chlorination. Acidic gases present in the effluent stream ($Cl_2$, HCl, iron chlorides) were neutralized with a concentrated NaOH scrubber solution downstream of the reactor.

After the chlorination time had elapsed the chlorine gas flow was turned off. Samples were maintained at 600° C. for 30 minutes under Ar flow, and then cooled to room temperature. A second series of annealed $Fe_3C$-CDCs were prepared for each chlorination time. These samples were purged with Ar for 30 minutes at 600° C., after which the Ar flow was switched to 5% $H_2$ in Ar (99.999%) at a rate of 100 ml min$^{-1}$ for 3 hours at 600° C. to remove residual chlorine. Afterwards, these samples were cooled to room temperature under Ar flow.

Unannealed samples were subsequently labeled as $Fe_3C$-CDC-CT, where CT stands for chlorination time, such as 0.25 h, 0.5 h, 0.75 h, 1.0 h, and 1.5 h. Annealed samples were labeled as $Fe_3C$-CDC-CT-$H_2$ to denote exposure to hydrogen. In addition, layer separation was noted for $Fe_3C$-CDC-0.25h and $Fe_3C$-CDC-0.5h samples. These samples were hand-sieved and separated into a top, black powdered layer, and a bottom, silver/brown particulate layer. These samples were further subdivided into $Fe_3C$-CDC-CT-top and $Fe_3C$-CDC-CT-bot to denote either the top or bottom layer, respectively. The $Fe_3C$-CDC prefix is dropped in subsequent figures and throughout this chapter for brevity.

Methods

PXRD (Powder X-ray Diffraction) patterns were collected using an X'Pert X-ray PANalytical diffractometer with a Cu Kα X-ray source (λ=1.5418 Å). XRD spectrums were collected from a range of 4-90° in two theta (2θ) with a step size of 0.02°. All samples were run at room temperature. Nitrogen adsorption measurements were obtained on a Quadrasorb System from Quantachrome Instruments. Isotherms were collected at 77K using a sample of 30-50 mg. Prior to each isotherm, samples were activated overnight at 423K under vacuum. Specific surface areas were calculated using the BET model under the pressure range 0.01-0.05 P/P0. Pore size distributions for all samples were obtained using the Quenched Solid Density Functional Theory (QSDFT) model built into version 5.11 QuadraWin™ software. An adsorption branch slit-pore/cylindrical pore model, nitrogen adsorbate, and carbon adsorbent were assumed for the DFT model parameters. Thermogravimetric analyses of all samples were carried out on a NETZSCH STA 449 F1 Jupiter instrument. Approximately 10 mg of sample were heated from 25-1500° C. at a ramp rate of 5° C. min$^{-1}$ and a flow rate of 20 ml min$^{-1}$ of air (Airgas 99.999%). Residual metal % was calculated by assuming total combustion of carbon, and conversion of Fe to $Fe_2O_3$.

Pre-edge and XANES Fe K-edge spectra were collected at beamline 12-BM-B at the Advanced Photon Source of Argonne National Laboratories (Chicago). A Si(111) double monochromator was used to select the beam energy for all measurements. The beam size was 800 μm×1000 μm. Samples were pressed into wafers of 13 mm diameter and fixed to a sample stage with adhesive tape. The beam was internally calibrated with a metallic Fe reference foil, which was also run in series with all samples to account and correct for the energy shift of the beam. The first inflection point of the Fe K-edge was set to 7111.08 eV. XANES data was collected in transmission mode via the use of ionization chambers, and a step size of 0.3 eV was used. Before each sample, an area scan of beam flux was taken to ensure no pinholes in the pressed wafer. Data was analyzed within Athena software (Ravel B, et al., *Journal of Synchrotron Radiation*, 2005, 12:537-42).

SEM images were obtained using a LEO 1530 Thermally-Assisted Field Emission (TFE) Scanning Electron Microscope (SEM). All samples were deposited onto carbon tape and not sputter coated prior to scanning. Images were scanned at an accelerating voltage of 3-10 kV, depending on the charging effects of the sample. Particle size distributions were obtained by measuring the diameter of 50-100 particles from multiple SEM images of each sample. TEM images were obtained using a JEOL 100CX II transmission electron microscope (TEM) at an operating voltage of 100 kV. Samples were suspended in a solution of methanol and deposited on a lacey carbon grid. High resolution (HRTEM) images were obtained using a FEI Tecnai F30 at an operating voltage of 300 kV. Other HRTEM images were obtained using a Hitachi HT7700 TEM at an operating voltage of 120 kV.

Structural Properties and Porosity Characteristics of Prepared $Fe_3C$-CDCs

Iron was extracted by chlorine gas to form iron chloride compounds by the following reactions:

$$Fe_3C+t,?9/2Cl_2 \rightarrow 3FeCl_3+C \quad (1)$$

$$Fe_3C+3Cl_2 \rightarrow 3FeCl_2+C \quad (2)$$

Figure 4:
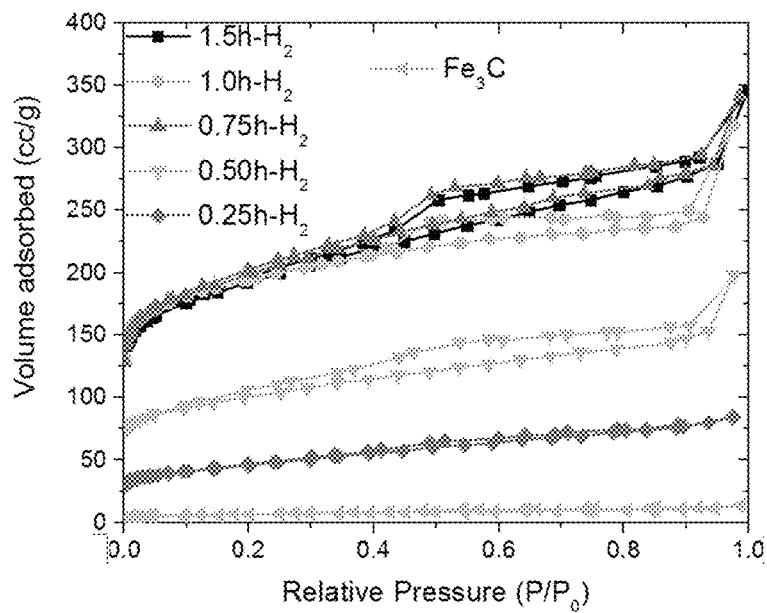
FIG. 4 is a graph of the $N_2$ adsorption isotherm at 77K for $Fe_3C$ and annealed $Fe_3C$-CDCs plotted as the volume of $N_2$ adsorbed (cc/g) as a function of the relative pressure ($P/P_0$).
Figure 5:
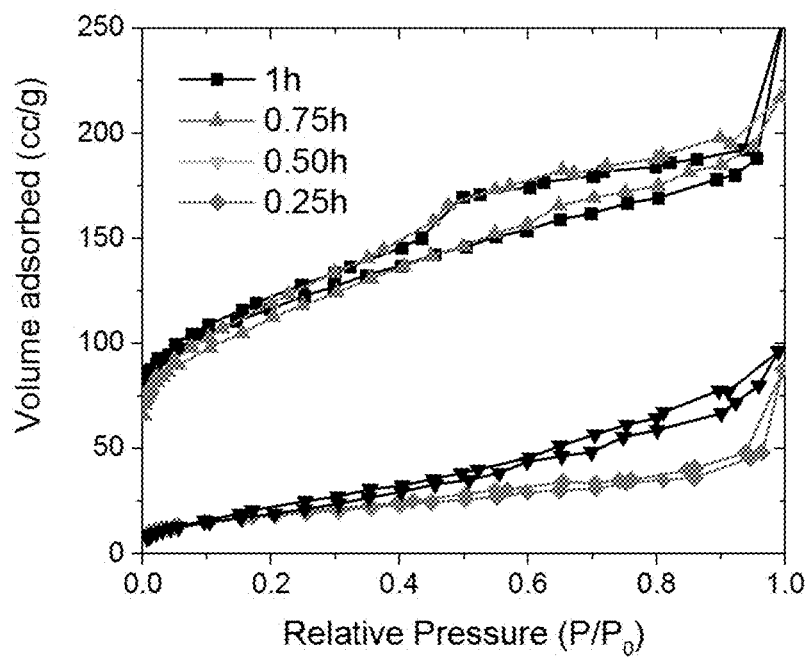
FIG. 5 is a graph of the $N_2$ adsorption isotherm at 77K for unannealed $Fe_3C$-CDCs plotted as the volume of $N_2$ adsorbed (cc/g) as a function of the relative pressure ($P/P_0$).

The adsorption properties were investigated by nitrogen physisorption. The isotherms at 77K can be seen in FIG. 4 and FIG. 5, with porosity results summarized in Table 1. The Fe3C precursor exhibits little specific surface area (20 m$^2$ g$^{-1}$) and pore volume (0.02 cc g$^{-1}$). Unannealed $Fe_3C$-CDCs prepared at chlorination times ≤0.5 hours formed two layers: a black, powdery top layer and a silver/brown clay bottom layer. The relative mass percentages of each layer are reported in Table 2. At chlorination times ≥0.75 hours, no layer separation was seen, and the $Fe_3C$-CDC visually resembled the black, powdery top layer at low chlorination times. All $Fe_3C$-CDCs annealed in $H_2$ formed one visually homogenous black powder layer irrespective of chlorination time.

TABLE 1

Porosity and residual metal for prepared Fe$_3$C-CDCs

| Sample Name | Chlorination Time (h) | Annealing Time (h) | Specific Surface Area (m$^2$ g$^{-1}$)$^a$ | Pore Volume (cc g$^{-1}$)$^b$ | Residual Metal (%)$^c$ |
|---|---|---|---|---|---|
| Fe$_3$C | 0 | 0 | 20 | 0.02 | 93 |
| 0.25h-top | 0.25 | 0 | 96 | 0.18 | — |
| 0.25h-bot | 0.25 | 0 | 53 | 0.14 | — |
| 0.25h-H$_2$ | 0.25 | 3 | 147 | 0.13 | 77.3 |
| 0.5h-bot | 0.50 | 0 | 229 | 0.26 | — |
| 0.5h-top | 0.50 | 0 | 51 | 0.15 | — |
| 0.5h-H$_2$ | 0.50 | 3 | 356 | 0.31 | 25.5 |
| 0.75h | 0.75 | 0 | 339 | 0.34 | — |
| 0.75h-H$_2$ | 0.75 | 3 | 667 | 0.53 | 8.4 |
| 1.0h | 1.0 | 0 | 374 | 0.40 | — |
| 1.0h-H$_2$ | 1.0 | 3 | 657 | 0.48 | 4.0 |
| 1.5h | 1.5 | 0 | 353 | 0.38 | — |
| 1.5h-H$_2$ | 1.5 | 3 | 683 | 0.54 | 2.7 |
| 3.0h-H$_2$ | 3.0 | 3 | — | — | 0.8 |

$^a$Obtained by BET Analysis at a Relative Pressure Range of 0.01-0.05 P/P$_0$
$^b$Obtained at P/P$_0$ = 0.99
$^c$Calculated by TGA

TABLE 2

Relative Portion of Top and Bottom Layers

| Sample Name | Relative Percent (%) Mass |
|---|---|
| 0.25h-top | 12.4 |
| 0.25h-bot | 87.6 |
| 0.5h-top | 51.9 |
| 0.5h-bot | 48.1 |

The specific surface area and pore volume are strongly affected by the chlorination time and annealing treatment. The bottom layers (0.25h-bot, 0.5h-bot) have little (~50 m$^2$ g$^{-1}$) porosity while the top layers (0.25h-top, 0.5h-top), as well as 0.75 h and 1.0 h samples, have progressively increasing porosity and characteristic type IV isotherms according to the Brunauer classification (Brunauer S, et al., *Journal of the American Chemical Society*, 1940, 62:1723-32; Brunauer S, et al., *Journal of the American Chemical Society*, 1938, 60:309-19; Kruk M, et al., *Chemistry of Materials.* 2001, 13(10):3169-83). Annealed samples also exhibit type IV isotherms, seen in FIG. 4, with a H$_2$ type hysteresis that exhibits a sharp desorption branch and a gradual increase in the adsorption branch. This signifies the presence of cavitation effects, and the closure of the hysteresis around the relative pressure P/P$_0$=0.42 can be attributed to a sudden nucleation of nitrogen gas bubbles within the mesopores of annealed Fe$_3$C-CDC samples. To verify that the hysteresis was not caused by a chemisorption mechanism due to residual Fe, a sample with a large amount of residual iron, 0.25h-H$_2$, was recorded twice in series. There was no significant change in specific surface area, signifying no irreversible chemisorption.

Annealed samples exhibit significantly higher surface areas, with a 97% increase in surface area comparatively between 0.75 h and 0.75h-H$_2$. Hydrogen has been shown to be a far more effective annealing gas than Ar for Cl$_2$ removal from CDCs, and the drastic increase in porosity can be explained by a combination of the removal of physisorbed chlorine gas, bonded surface Cl species, and the conversion of FeCl$_x$ species. There is a maximum surface area and pore volume obtained at chlorination times ≥0.75 hours (0.75h-H2-667 m$^2$ g$^{-1}$, 0.53 cc g$^{-1}$). These values are low for CDC materials, but the reaction temperature in this study was not optimized to obtain maximum porosity. Also, the onset of significant graphitization, as seen in the synthesis of other carbide-derived carbons, has been shown to severely reduce surface area and pore volume. The presence of well-ordered graphitic sheets seen in Fe$_3$C-CDCs can limit porosity as the d-spacing of graphite, 3.4 Å, can hinder the accessibility of the nitrogen probe molecule.

Figure 6:
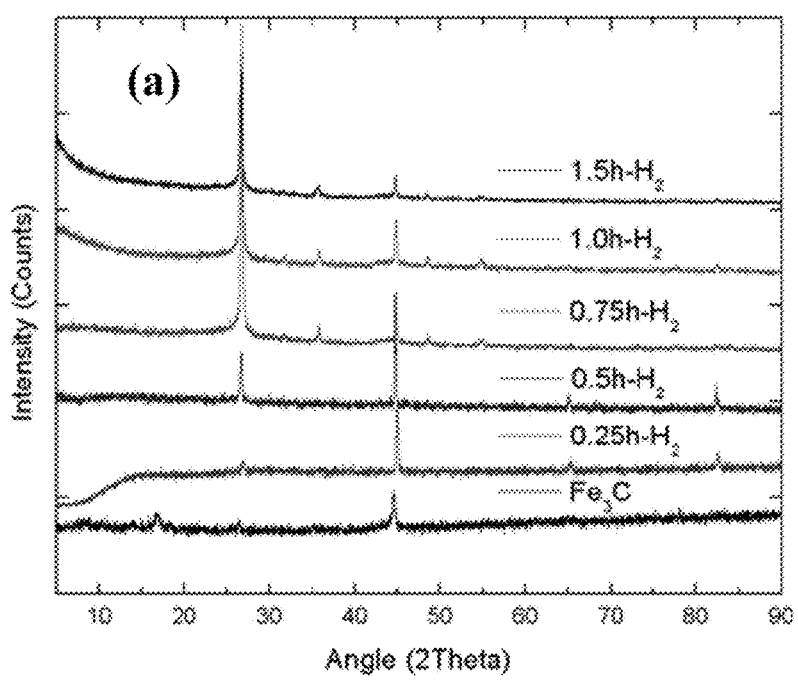
FIG. 6 is a graph of the X-Ray diffraction (XRD) spectrum of annealed $Fe_3C$-CDCs plotted as the diffraction intensity (Counts) as a function of the angle (2Theta).
Figure 7:
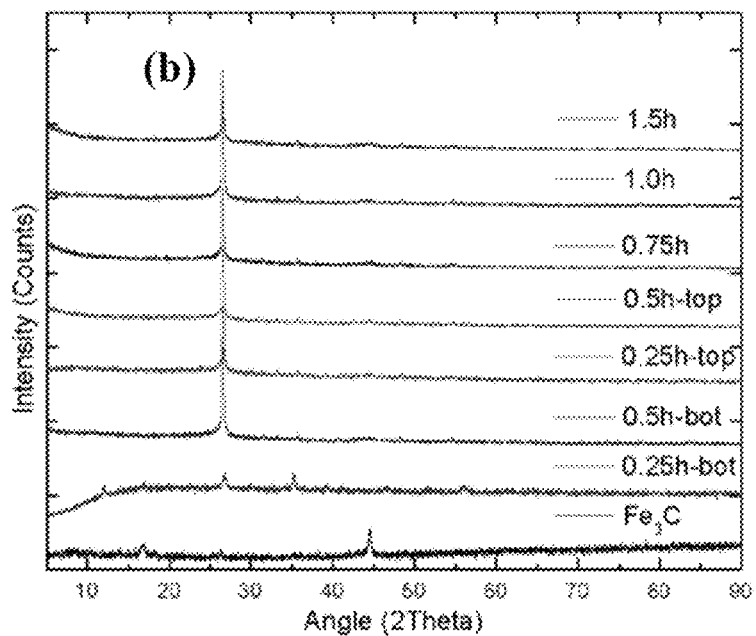
FIG. 7 is a graph of the X-Ray diffraction (XRD) spectrum of unannealed $Fe_3C$-CDCs plotted as the diffraction intensity (Counts) as a function of the angle (2Theta).

The hysteresis loop for unannealed Fe$_3$C-CDCs at long chlorination times and annealed Fe$_3$C-CDCs corresponds to a broad (002) graphite reflection in the XRD spectrum as seen in FIG. 6 and FIG. 7, indicating the formation of a significant amount of mesoporosity as the degree of graphitization increases. The formation of highly ordered graphitic sheets was also observed in SEM, which is discussed in greater detail below. In addition to the (002) graphite reflection, the (004) graphite reflection can be seen at 2θ=~55° for longer chlorination times. Other peaks were observed for annealed samples, present at 2θ=~45°, ~65°, and ~82° corresponding to the (011), the (002), and the (112) reflection of α-Fe. Peaks are also seen in unannealed samples at >0.75 h present at 2θ=~32°, ~35.5°, ~48° with d-spacings of 0.272, 0.244, and 0.178 nm respectively. Other studies have attributed similar peaks to more ordered carbon structures, such as nanodiamond, but confirmation of these structures was not obtained by TEM in this study. The possible attribution of these peaks to residual iron complexes was also studied. The disappearance of peaks from the commercial Fe$_3$C spectrum in FIG. 7 after short chlorination times indicate the precursor is quickly converted to iron chloride products. In FIG. 6, the intensity of the peak at 2θ=~45 correlates very well with the percent of residual metal in annealed samples, supporting its attribution to reduced Fe in annealed samples and the (011) reflection of α-Fe. There were no definitive XRD peaks for Fe$_2$O$_3$, Fe$_3$O$_4$, FeC$_3$, or FeCl$_2$ in both series of samples, therefore, more in-depth investigations on Fe speciation were conducted with XANES, discussed below.

Figure 8:
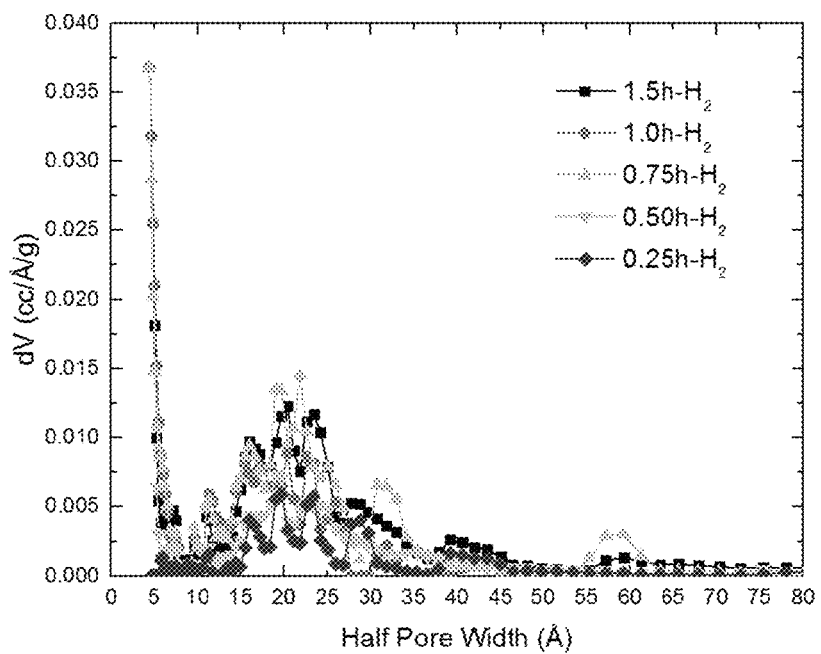
FIG. 8 is a graph of the pore size distribution of annealed $Fe_3C$-CDCs plotted as derivative volume (cc/Å/g) as a function of the half pore width (Å).
Figure 9:
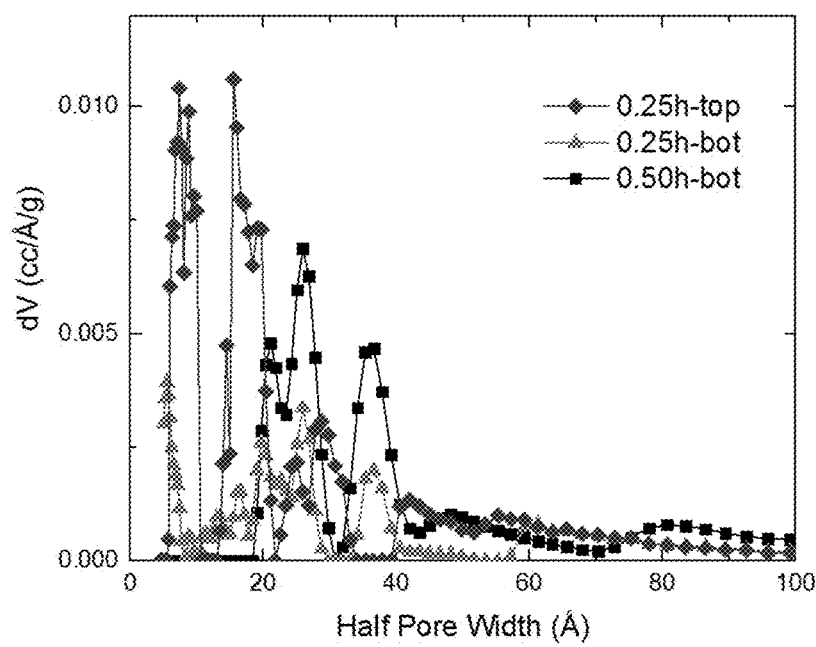
FIG. 9 is a graph of the pore size distribution of unannealed $Fe_3C$-CDCs plotted as derivative volume (cc/Å/g) as a function of the half pore width (Å).

For more insight into the pore structure, Quench Solid Density Functional Theory (QSDFT) calculations were carried out and pore size distributions for annealed samples are presented in FIG. 8 and FIG. 9 The QSDFT model is a quantitative model designed for curved, non-homogenous surface geometries, and can be used to accurately describe CDC porosimetry (Neimark A V, et al., *Carbon*, 2009, 47(7):1617-28). Due to the cavitation effect, the adsorption branch of the N$_2$-isotherm was applied. A slit-pore and cylindrical pore model were used in the QSDFT model to account for the hysteresis and the degree of graphitization within the samples, which are both indicative of significant mesoporosity. In FIG. 8, all pore size distribution plots have similar shapes, with a distinct micropore diameter of 9 Å. The peak area increases with the total amount of N$_2$ adsorbed, and levels off near complete conversion at chlorination times ≥0.75 h. There is a broad development of mesopores with an average diameter of 4 nm seen at chlorination times ≥0.75 h. The increase in mesoporosity is consistent with the increase in graphite crystallinity seen in XRD, and is likely due to increased ordering at longer reaction times, as well as an increase in overall porosity. It is common for graphitized carbide-derived carbons to exhibit more mesoporosity.

In FIG. 9, different porosity characteristics are seen for the top and bottom unannealed samples. Top layer CDCs are more closely aligned with annealed samples, and feature a microporous peak at 13 Å in diameter, as well as mesopores of around 3.4 nm in diameter. Bottom layer CDCs are more mesoporous, with most pores greater than 5 nm in diameter and a broad range of mesopores up to 20 nm in diameter. The 0.25h-bot sample has characteristics of both 0.25h-top and 0.5h-bot, suggesting it is a mixture of the layers, possibly due to poor layer separation. Further analysis was done to couple these porosity differences with the specific carbon and Fe nanostructures present in the top, bottom, and annealed series of samples.

Nanostructures Obtained from Partial Chlorination of $Fe_3C$

Planar graphitic sheets were observed in SEM images of all samples, consistent with XRD patterns in FIG. 7. Depending on the chlorination time and layer, vastly different substructures were formed.

Figure 10:
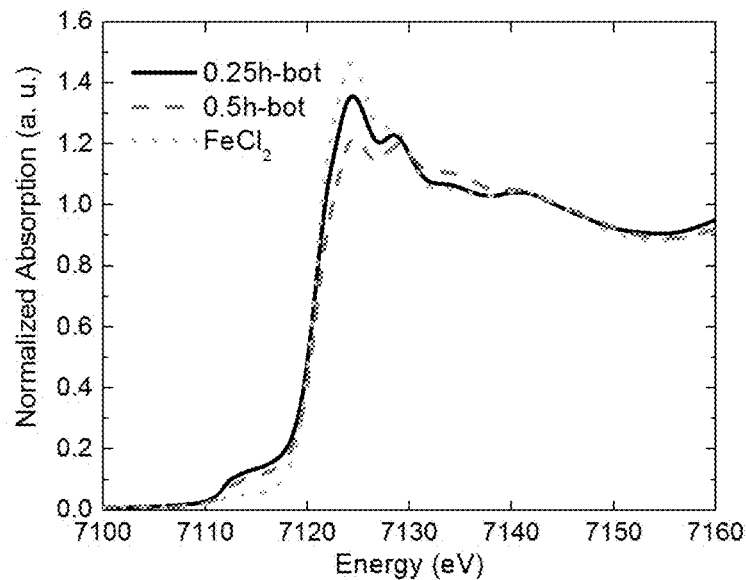
FIG. 10 is a graph of the Fe—K edge spectrum for the bottom layer of unannealed $Fe_3C$-CDCs plotted as normalized absorption (a.u.) as a function of the photon energy (eV).

Top layers at chlorination times ≥0.5 h, as seen in SEM images, are largely graphitic, disordered, and contain embedded $FeCl_3$ nanoparticles. The XANES spectra in FIG. 10 and FIG. 11 were used to confirm the oxidation state of the iron. There is a well-established separation of 1.4 eV between the $Fe^{2+}$ and $Fe^{3+}$ oxidation states in the pre-edge region, as the position of the pre-edge centroid shifts towards higher energy with an increase in Fe oxidation state. The characteristic pre-edge region at ~7114 eV is indicative of an Fe(III) state, and the pre-edge feature matches very closely with the FeCl3 standard. There is some discrepancy between the 0.25h-top spectra and the other CDCs, particularly in the white line region but also in the isosbestic point shared by the other CDCs at ~7127 eV. This is likely due to the presence of unreacted iron carbide at low chlorination times. Stoichiometrically, the minimum time required for complete conversion is calculated to be between 45 minutes, assuming complete selectivity to $FeCl_2$ in Equation (2), and 67 minutes, assuming complete selectivity to $FeCl_3$ in Equation (1).

The presence of $FeCl_3$ was observed, despite its boiling point of 315° C. being well below the 600° C. chlorination temperature. Although not wishing to be bound by any theory, it is hypothesized that after the surface reaction, $FeCl_3$ products agglomerate as they begin to diffuse through the resulting CDC, and catalyze the formation of carbon nanostructures before entering the bulk gas phase. As previously stated, the role of $FeCl_3$ as a graphitization catalyst has been seen in the formation of graphitic carbon nanospheres, amorphous carbon nanotubes, and well-ordered graphite where $FeCl_3$ is hypothesized to transport carbon and facilitate graphitization. In the chlorination of ferrocene, carbon nanostructures are thought to prevent $FeCl_3$ sublimation until it is reduced to $FeCl_2$.

The decomposition of $FeCl_3$ occurs by either the vaporization of $FeCl_3$ or the dimer $Fe_2Cl_6$. The dimer is reported to be the dominant species as high as 400° C. A thermodynamic study of the chlorination of $Fe_3C$ by Gogotsi et al. have also shown significant amounts of $Fe_2Cl_6$ at equilibrium at 600° C. $FeCl_3$ and $Fe_2Cl_6$ have $D_3h$ and $D_2h$ symmetry, respectively and the size of $Fe_2Cl_6$ is 0.502 nm long by 0.379 nm wide, while $FeCl_3$ can be calculated to be 0.318 nm long from the equilibrium bond length of 0.2122 nm. Given the size and shape of $FeCl_3$ and $Fe_2Cl_6$, it is plausible that they are sterically prevented from escaping by graphitic carbon nanostructures. The diffusion of $FeCl_3$ decomposition species are hypothesized to be inherently slow and hindered by graphitic carbon nanostructures, as a sample chlorinated at 3 hours contained less than 1% residual Fe. A similar phenomenon has recently been observed for the chlorination of TiC nanopowders, where residual TiC is postulated to be preserved due to surrounding graphitic carbon nanostructures that prevent chlorine diffusion. Later, in annealed samples, graphite layers are seen surrounding a reduced Fe particle, further supporting this theory.

Figure 11:
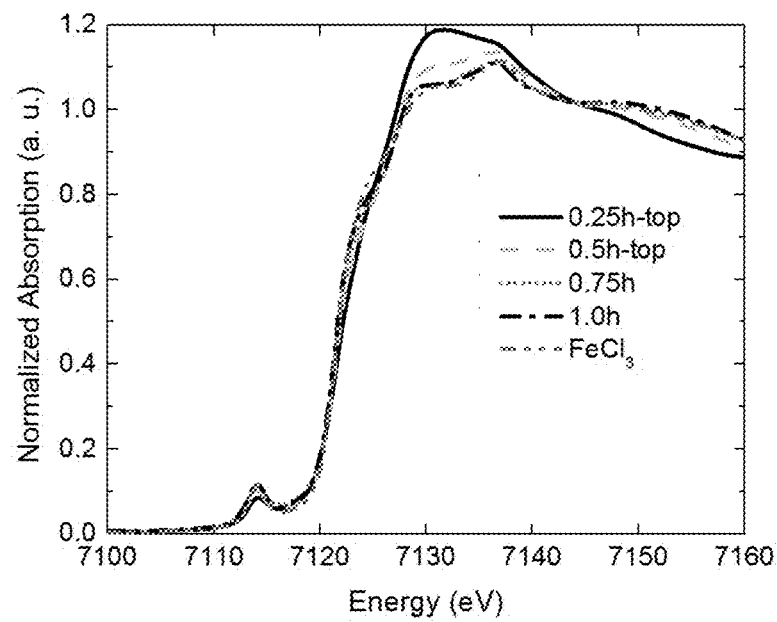
FIG. 11 is a graph of the Fe—K edge spectrum for the top layer of unannealed $Fe_3C$-CDCs plotted as normalized absorption (a.u.) as a function of the photon energy (eV).

Different substructures were observed at lower chlorination times for each layer. The 0.25h-top sample shows the presence of small tubular structures approximately 200-400 nm in length in SEM images and planar graphitic sheets can be seen in the SEM images of 0.25h-bot sample, as well as Fe nanoparticles in SEM images at 3 kV. Due to charging effects, however, we were unable to increase magnification for a closer look without adding excessive noise to the detector signal. At 0.5 h chlorination time, there is a more pronounced difference between the top and bottom layers. Rod-like structures were observed in the SEM and TEM images of the 0.5h-bot sample, with diameters ranging from ~30-50 nm and lengths up to 10 μm. This was further investigated in TEM. It has been suggested that $FeCl_3$ can facilitate carbon dissolution, which is responsible for the creation of amorphous hollow carbon nanotubes upon the chlorination of ferrocene. The contrast difference between the tubular structure and the tip in SEM and TEM images greatly supports $FeCl_3$ catalyzed carbon nanotube formation in the bottom sample. The SEM and TEM images show many joined structures with domains that have an observed lattice parameter of 7 Å, on the order of a unit cell and much larger than the d-spacing of a graphitic carbon nanotube (3.4 Å). It is heavily supported from the XANES spectra in FIG. 11 that this sample contains predominantly $FeCl_2$, and these are suggested to be needle-like FeCl2 structures. In FIG. 11, samples have a pre-edge transition of ~7112.1 eV, which is indicative of the $Fe^{2+}$ oxidation state. In addition, both samples match the same double peak white line and post-edge features of the $FeCl_2$ standard spectrum.

Significant amounts of residual $FeCl_2$ in the bottom layer samples are unexpected, as a previous thermodynamic study of the chlorination of $Fe_3C$ by Gogotsi et al. showed that only small amounts of $FeCl_2$ could be produced at low chlorine concentrations. It is possible that the formation of $FeCl_2$ in $Fe_3C$ follows the same mechanism proposed for the chlorination of ferrocene. $FeCl_2$ was not supported as an initial product for the chlorination of ferrocene, and is suggested to form via the reduction of $FeCl_3$. Carbon nanostructures would consequently encapsulate the crystalline $FeCl_2$ to prevent oxidization by excess $Cl_2$. It is interesting that the bottom layer is no longer seen at longer chlorination times. The melting point and boiling point for $FeCl_2$ are 676° C. and 1020° C., and $FeCl_2$ has a low vapor pressure at 600° C. Intuitively, $FeCl_2$ could be further oxidized to $FeCl_3$, which slowly diffuses to the bulk phase.

These results show marked differences for $Fe_3C$-CDCs compared to other CDCs in terms of both metal dispersion and speciation. Kinetic studies with SiC have suggested a layer-by-layer extraction of Si, while the extraction of Fe results in dispersed residual iron chloride domains. Studies with WC, NbC, SiC, and TiC have observed that when the extraction process has not proceeded to completion, the residual metal is largely in unreacted carbide form. In Table 1 and FIGS. 10-12, it is shown that 0.5h-$H_2$ features 25.5% residual iron which is present as $FeCl_2$ and $FeCl_3$ in 0.5h-top and 0.5h-bot samples before reduced during annealing treatment.

Figure 12:
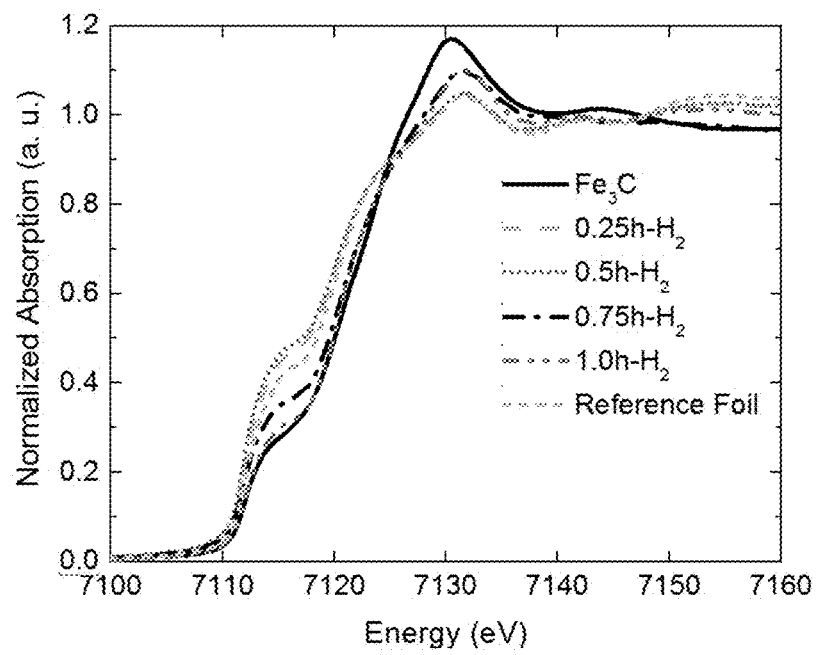
FIG. 12 is a graph of the Fe—K edge spectrum for the annealed $Fe_3C$-CDCs plotted as normalized absorption (a.u.) as a function of the photon energy (eV).

Representative SEM and TEM images of annealed $Fe_3C$-CDCs were examined and XANES spectrum for annealed samples are presented in FIG. 12. A high degree of graphitic ordering is seen in all annealed samples, consistent with the intense (002) reflection of graphite in the XRD spectrum in FIG. 6. X-ray diffraction spectra for annealed samples show a steep (100) reflection for α-Fe at 45°, indicating $H_2$ annealing reacts with metal chlorides and removes chloride species. Dispersed within the observed planar graphitic crystals are Fe nanoparticles with diameters ranging from 5-100 nm.

Figure 13:
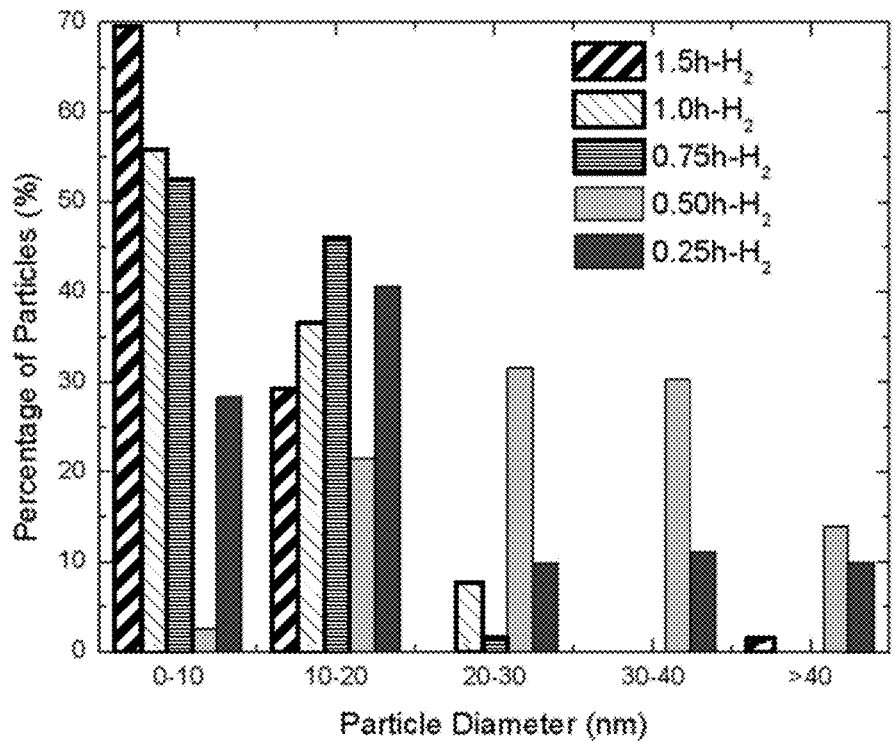
FIG. 13 is a graph of the particle size distributions for Fe nanoparticles in annealed $Fe_3C$-CDCs plotted as the percentage of particles (%) as a function of the particle diameter (nm).

Particle size distribution versus chlorination time was calculated for annealed samples, and the results are summarized in FIG. 13. Mean particle size decreases with increasing chlorination time, and almost all particles are less than 10 nm in diameter at chlorination times ≥0.75 h. This suggests that >10 nm Fe particles are mainly derived from reduced $FeCl_2$ species in the bottom layer, and upon annealing treatment they are partially or fully removed along with the disappearance of the carbon nanotubes. Upon chlorination times ≥0.75 h, after the disappearance of the bottom layer, only <10 nm particles are present. Low resolution TEM images and high resolution TEM images further suggest that these particles are embedded within the CDC framework. HRTEM shows that there are evident graphitic sheets that envelope the Fe nanoparticle, supporting the hypothesis that these graphitic nanostructures prevent the sublimation of iron chloride species during chlorination.

XANES spectra for the annealed $Fe_3C$-CDCs in FIG. 12 also confirm metallic Fe is present in the annealed samples, and closely match the Fe reference foil spectrum. Therefore, iron chloride species present in unannealed samples are seen to be easily reduced to metallic Fe for catalytic applications. It is important to note that there is a significantly higher white line for $Fe_3C$ precursor compared to annealed $Fe_3C$-CDCs and the reference foil. This is likely due to mild surface oxidation on the $Fe_3C$ precursor, which can result from a common passivation treatment at the end of $Fe_3C$ synthesis that requires exposure to dilute $O_2$ to create a non-reactive surface on the freshly prepared carbide.

The successful reduction of $FeCl_3$ particles during the annealing treatment demonstrates that there is some selective accessibility between the bulk gas phase and the trapped iron chloride nanoparticles. For instance, during the annealing treatment, for the case of longer chlorination time samples which contain $FeCl_3$ nanoparticles, $H_2$ gas is able to diffuse into a trapped $FeCl_3$ particle, reduces the particle to metallic Fe, and HCl gas is able to diffuse back out to the bulk phase. We believe that the size and shape differences between $H_2$ and HCl and the iron chloride decomposition species explain this behavior. The kinetic diameters of $H_2$ and HCl are quite small, 0.289 nm and 0.442 nm, and the linear shape of these gases offers much less steric hinderance than molecules with $D_3h$ and $D_2h$ point groups.

Observations $Fe_3C$-CDCs were synthesized at 600° C. at various chlorination times to study their porosity and residual metal characteristics. At low chlorination times, XANES analysis shows two distinct layers form with different $FeCl_x$ oxidation states: A porous layer containing $FeCl_3$ forms on top of unannealed samples, and a significantly less porous layer containing $FeCl_2$ forms on the bottom of unannealed samples. Unique structures are formed for each layer—with notable carbon nanotubes of ~30-50 nm diameters in the bottom layer. Annealed $Fe_3C$-CDCs form mainly planar graphitic sheets with embedded Fe particles.

The present study clearly shows that the chlorination of $Fe_3C$ at 600° C. does not follow a traditional layer-by-layer extraction of Fe from the carbide matrix. After the surface reaction of chlorine with iron carbide, a significant percentage of $FeCl_2$ and $FeCl_3$ products do not diffuse out of the resulting carbide-derived carbon, and are able to agglomerate and catalyze the formation of graphitic carbon nanostructures. These graphitic carbon nanostructures prevent the diffusion of vaporized iron chloride species and their decomposition products, and allow iron chloride species to remain as supported nanoparticles. This is a marked difference from traditional layer-by-layer extraction, in which the chloride products would diffuse out of the carbide-derived carbon into the bulk gas phase.

There are many attractive features of these retained iron chloride species. These nanoparticles can subsequently be reduced in $H_2$ and approach an average Fe nanoparticle size of 10 nm. $Fe_3C$-CDCs can be synthesized with specific surface areas and pore volumes approaching 700 $m^2$ $g^{-1}$ and 0.54 $cm^3$ $g^{-1}$, and a high degree of microporosity, which renders them as good supports for catalytic and filtration applications. Theoretically, these materials can also be calcined to allow for Fe oxide sites and thus be further tailored for desired sorbate-sorbent interactions. These results provide a new strategy for a facile, one pot synthesis for supported Fe nanoparticles in CDC materials.

Example 2

Tailored $Fe_3C$-Derived Carbons for Ammonia Filtration

Carbide-derived carbons are synthesized by chlorination of $Fe_3C$ at temperatures ranging from 200-1000° C. The complex extraction method of Fe from $Fe_3C$ at moderate temperatures (600° C.) allows for the tailored inclusion of $FeCl_2$, $FeCl_3$, or Fe nanoparticles in the resulting CDC by controlling the synthesis conditions and post-treatment methods. In this study, we extend the synthesis to other temperatures in order to understand the role of chlorination temperature on the physical and textural properties of the resulting CDC. We also examine the activity of $Fe_3C$-CDCs with embedded $FeCl_3$ nanoparticles for ammonia adsorption. Materials synthesized at 600° C. show exceptional results in ammonia breakthrough experiments, and achieved dynamic loadings of 1.88 mmol $g^{-1}$ at 0% relative humidity and 3.44 mmol $g^{-1}$ at 75% relative humidity calculated at initial breakthrough when $[NH_3]>0$ ppm. $NH_3$ temperature programmed desorption ($NH_3$-TPD) and Fourier Transform Infrared Spectroscopy (FTIR) experiments suggest that the uptake is primarily due to ammonia complexation with $FeCl_3$ nanoparticles under dry conditions, and additional interactions with trapped chlorine in the presence of water.

Materials

One gram of a commercially available $Fe_3C$ (F. J. Brodmann & Co. 99.5% purity −200/+275 mesh) was placed on a quartz boat and inserted into a quartz tube of ID 1", length 20" and into a horizontal tube furnace. Samples were heated to a reaction temperature ranging from 200-1000° C. at a ramp rate of 5° C. $min^{-1}$ under Ar flow (Airgas 99.999%) at a rate of 100 ml $min^{-1}$ and at ambient pressure. After reaching the desired chlorination temperature, chlorine gas (Airgas 99.5%) flow was introduced into the reactor at a flow rate of 25 ml $min^{-1}$ for 2 hours, while the Ar flow was maintained. A scrubber solution of concentrated NaOH was used to neutralize acidic gases present in the effluent stream ($Cl_2$, HCl, iron chlorides).

After the chlorination time had elapsed the chlorine gas flow was turned off and samples were cooled to 600° C. at a ramp rate of 5° C. $min^{-1}$ under Ar flow. The Ar flow was then switched to 5% $H_2$ in Argon (99.999%) at a rate of 100 ml $min^{-1}$ for 3 hours at 600° C. to remove residual chlorine and reduce residual metal chlorides. Afterwards, these samples were cooled to room temperature under Ar flow.

These samples are referred to as "annealed" iron carbide derived carbons and are labeled as $Fe_3C$-CDC-CT-$H_2$, where CT denotes the chlorination temperature and the $H_2$ denotes exposure to hydrogen. Samples referred to as "unannealed" carbide-derived carbons follow the same synthesis procedure as above but are not treated with $H_2$ and are simply cooled down to room temperature after chlorination. These samples are chlorinated at 600° C. and labeled as $Fe_3C$-CDC-CT-T, where T represents the chlorination time. The $Fe_3C$-CDC prefix is dropped in subsequent figures and throughout this chapter for brevity.

Methods

Power X-ray diffraction (PXRD) patterns were collected using an X'Pert X-ray PANalytical diffractometer with a Cu Kα X-ray source ($\lambda$=1.5418 Å). PXRD diffractograms were collected from a range of 4-90° in two theta (2θ) with a step size of 0.02°. All experiments were carried out at room temperature. Nitrogen adsorption measurements were obtained on a Quadrasorb Surface Area Analyzer from Quantachrome Instruments. Isotherms were collected at 77 K using a sample of 30-50 mg. Prior to each isotherm, samples were activated overnight at 423 K under vacuum. Specific surface areas were calculated using the BET model over the pressure range 0.01-0.05 P/$P_0$. Pore size distributions for all samples were obtained using the Quenched Solid Density Functional Theory (QSDFT) model built into version 5.11 QuadraWin™ software. The QSDFT parameters were selected depending on the characteristics of the isotherm. For microporous, type I isotherms, a slit-pore model, nitrogen adsorbate, and carbon adsorbent were assumed for the QSDFT model. Whereas, for type IV isotherms that exhibit characteristic cavitation effects, an adsorption branch slit-pore/cylindrical pore model was used with an assumed nitrogen adsorbate and carbon adsorbent.

Raman spectra were obtained on a Confocal Raman Microscope Alpa-Witek operating at a wavelength of 514 nm. Each sample was flattened on a glass slide and focused under a 20× microscope lens. Spectra were collected from five distinct spots for each sample. Ten scans were performed for each spot. Peak fitting was performed using GRAMS/Al spectroscopy software from Thermo Scientific. Thermogravimetric analyses of all samples were carried out on a NETZSCH STA 449 F1 Jupiter instrument. Approximately 10 mg of sample were heated from 25-1500° C. at a ramp rate of 5° C. $min^{-1}$ and a flow rate of 20 ml $min^{-1}$ of air (Airgas 99.999%). Residual metal (%) was calculated by assuming total combustion of carbon, and conversion of Fe to $Fe_2O_3$.

Scanning electron microscopy (SEM) images were obtained using a LEO 1530 Thermally-Assisted Field Emission (TFE) Scanning Electron Microscope (SEM). All samples were deposited onto carbon tape and not sputter coated prior to scanning. Images were scanned at an accelerating voltage of 10 kV. Quantitative chemical analysis of select samples was conducted utilizing an Oxford-7426 EDS detector attached to the LEO 1530 TFE SEM. At least three separate spots were surveyed for each sample. TEM images were obtained using a Hitachi HT7700 TEM at an operating voltage of 120 kV. High resolution (HRTEM) images and diffraction patterns were obtained using a FEI Tecnai F30 at an operating voltage of 300 kV. Samples were suspended in a solution of methanol and deposited on a holey carbon grid with an ultrafine carbon film.

The schematic of our experimental setup can be seen in FIG. 2 and FIG. 3. $Fe_3C$-CDC powder was packed within a quartz bed against a fine quartz frit of ID 4 mm to a standardized bed volume of 55 $mm^3$. Samples were activated under 50 ml $min^{-1}$ $N_2$ flow at 150° C. for 2 hours and then allowed to cool back down to room temperature for 30-45 minutes. After cooling, the dry or wet breakthrough run was started. The dry run was initiated by switching the $N_2$ to a stream of 1500 ppm $NH_3$ in air at a rate of 20 ml $min^{-1}$ (Airgas). For humid breakthrough experiments, the humid stream was created by flowing air at 16 ml $min^{-1}$ through a $H_2O$ bubbler, and then combining it with a $NH_3$ stream of 7155 ppm and a flow rate of 4 ml $min^{-1}$. The total mixed stream flowed through the packed bed at a rate of 20 ml $min^{-1}$ with a measured relative humidity of 75% and a calculated $NH_3$ concentration of 1431 ppm. The effluent stream was analyzed using an Analytical Technology H10-15 ammonia electrochemical sensor. Once the dilute NH3 stream was switched on, data points were taken at 30 second intervals until the sensor reached 500 ppm $NH_3$, at which point the $NH_3$ was switched off to preserve the life of the sensor. $N_2$ flow was maintained at 50 ml $min^{-1}$ to capture the desorption behavior of the bed, and the sensor reading was recorded until the $NH_3$ concentration returned to ~100 ppm. A blank bed of sand was used to calculate the dead time within the system, and was subtracted from the breakthrough time of evaluated samples. No significant pressure drop was noted for these conditions. The experimental procedure for wet and dry conditions was identical. Exhausted unannealed samples were labeled $Fe_3C$-CDC-CT-T-DE or $Fe_3C$-CDC-CT-T-WE to signify exposure to ammonia under both dry (DE) and wet (WE) conditions.

$NH_3$-TPD experiments were carried out using a Micromeritics© AutoChem II 2920 apparatus to probe the strength of acidic sites on $Fe_3C$-CDCs evaluated for ammonia adsorption. Approximately 40 mg of $Fe_3C$-CDC was loaded into a quartz U-tube, and each sample was pretreated in flowing He at 150° C. to remove adsorbed $H_2O$. After cooling, the sample was exposed to 20 ml $min^{-1}$ of 2000 ppm $NH_3$ in a He carrier gas for 2 hours at 25° C. To obtain the $NH_3$-TPD profile, the flow was then switched to He and the temperature was ramped to 500° C. at a rate of 5° C. $min^{-1}$. The effluent stream was analyzed by a thermal conductivity detector (TCD).

A Magna 560 FTIR (Nicolet Instruments) was used to collect FTIR spectra on samples before and after ammonia exposure. FTIR samples were prepared by diluting CDC powder with KBr in a 1:200 ratio and then pressed into a 13 mm disk. Absorbance data was averaged over 128 scans at a resolution of 2 $cm^{-1}$. A fresh background scan was taken and subtracted before each sample.

Dependence of $Fe_3C$-CDC Porosity on Reaction Temperature

Iron carbide was reacted with chlorine gas to selectively extract iron through Eqn. (1) and Eqn. (2) from Example 1.

Figure 14:
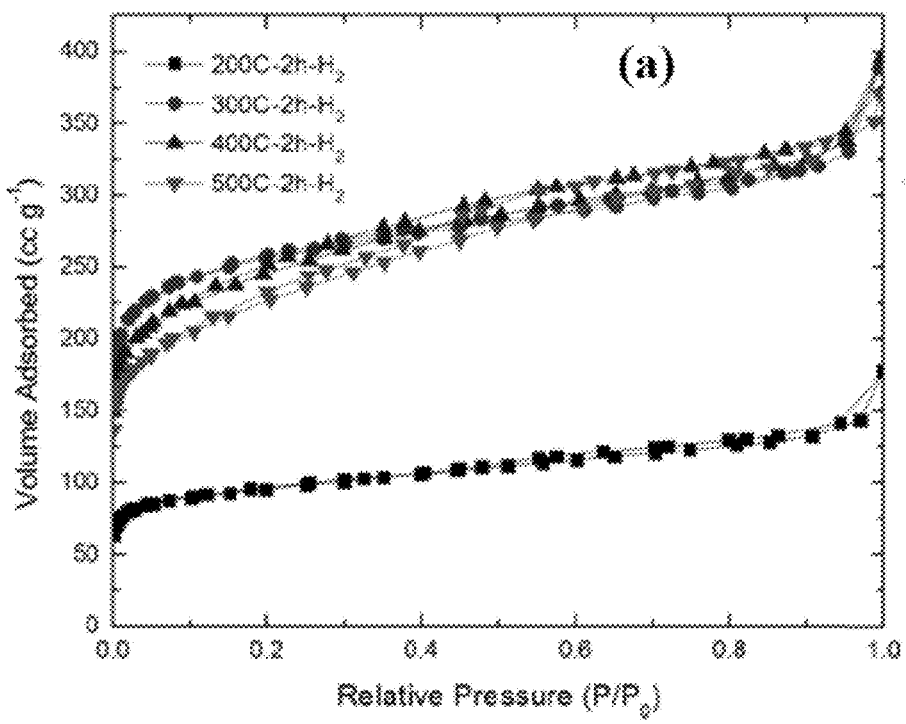
FIG. 14 is a graph of the $N_2$ adsorption isotherms at 77K for annealed $Fe_3C$-CDCs chlorinated at various temperatures from 200° C. to 500° C.
Figure 15:
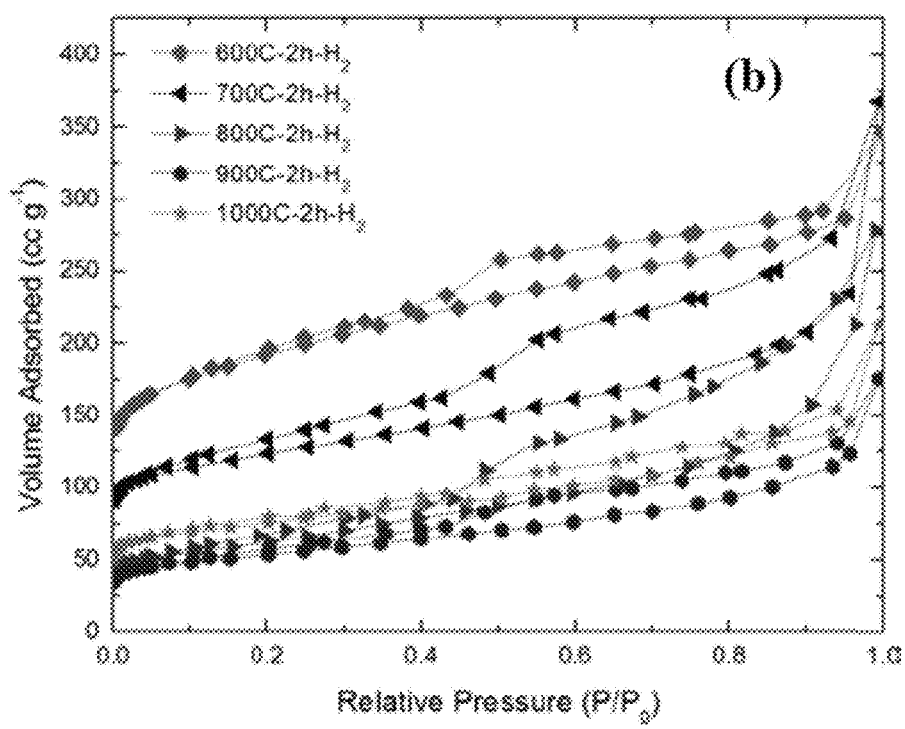
FIG. 15 is a graph of the $N_2$ adsorption isotherms at 77K for annealed $Fe_3C$-CDCs chlorinated at various temperatures from 600° C. to 1000° C.

$Fe_3C$-CDCs were synthesized at different chlorination temperatures and evaluated by nitrogen physisorption, QSDFT, and PXRD to understand the effect of chlorination temperature on their physical properties. Nitrogen isotherms at 77 K are shown in FIG. 14 and FIG. 15.

There was an evident contrast between samples chlorinated below and above 500° C. These results are shown in FIG. 14 and FIG. 15. The isotherms in FIG. 14 for $Fe_3C$-CDCs samples synthesized at temperatures ≤500° C., exhibit characteristic type I isotherms by Brunauer classification. There is a slight hysteresis and more gradual slope observed in the isotherms of 400C-2h-$H_2$ and 500C-2h-$H_2$, as the isotherm shape gradually shifts to a type IV isotherm seen for 600C-2h-$H_2$ in FIG. 15. As the chlorination temperature increases, the hysteresis beginning around the relative pressure P/$P_0$=0.42 widens. The gradual slope of the adsorption branch and the sharp decline in the desorption branch around this relative pressure resembles a $H_2$ type hysteresis and heavily suggests the presence of cavitation effects. There is also higher uptake close to the saturation pressure for 700C-2h-$H_2$ and 800C-2h-$H_2$, indicating a significant evolution of macroporosity at higher chlorination temperatures. Before QSDFT analysis, it was initially concluded that samples chlorinated at ≤500° C. were mainly microporous, while samples chlorinated at >500° C. exhibited a much larger degree of meso and macroporosity.

Figure 16:
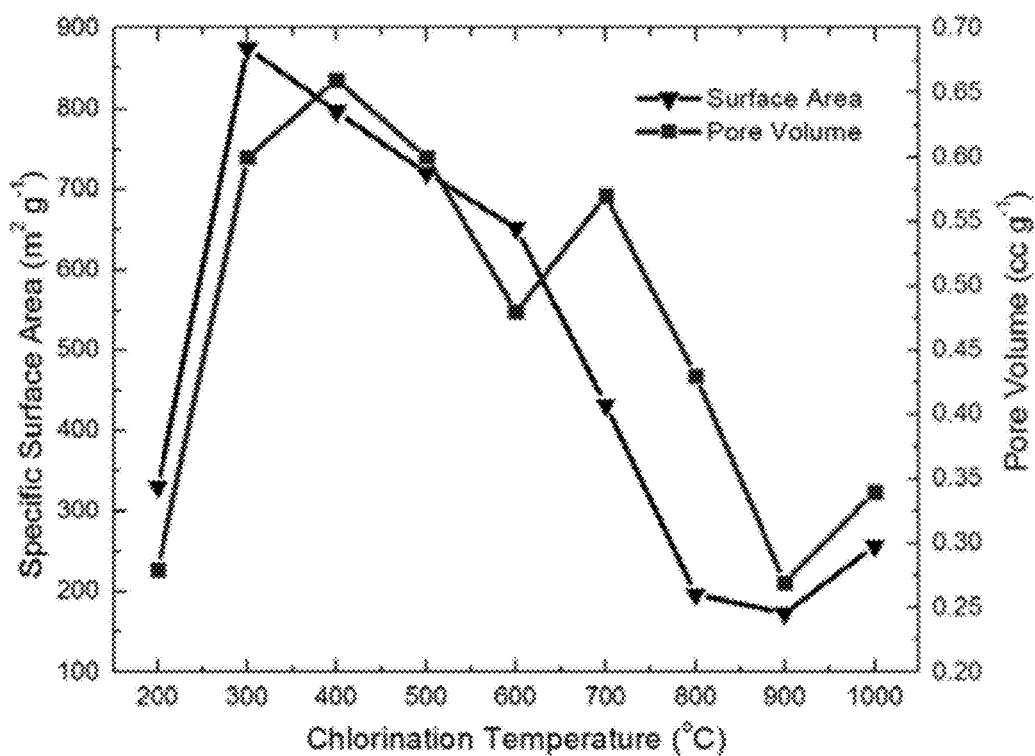
FIG. 16 is a graph of the specific surface area ($m^2\ g^{-1}$) along the left axis and the pore volume (cc $g^{-1}$) along the right axis as a function of the chlorination temperature (° C.) for annealed $Fe_3C$-CDCs.

The change in porosity versus chlorination temperature can be seen in FIG. 16. A maximum specific surface area of 875 $m^2$ $g^{-1}$ was achieved for the 300C-2h-H2 sample. It is possible that this surface area could further increase at chlorination temperatures ≤300° C., since at these temperatures it was difficult to achieve complete extraction of iron within 2 hours. The pore volume was relatively consistent for samples chlorinated between 300° C. and 700° C., with a maximum pore volume of 0.66 cc $g^{-1}$ for 400C-2h-H2. As the chlorination temperature increases over this range, there is a decrease in surface area and increase in mesoporosity. These trends are correlated with an increase in graphitization and ordering of the carbide-derived carbon at higher chlorination temperatures.

TABLE 3

Synthesis Conditions and Porosity for Annealed $Fe_3C$-CDCs

| Sample Name | Chlorination Time (h) | Annealing Time (h) | Specific Surface Area ($m^2$ $g^{-1}$)[a] | Pore Volume (cc $g^{-1}$)[b] |
|---|---|---|---|---|
| $Fe_3C$ | 0 | 0 | 20 | 0.02 |
| $Fe_3C$-CDC-200C-2h-$H_2$ | 2 | 3 | 330 | 0.28 |
| $Fe_3C$-CDC-300C-2h-$H_2$ | 2 | 3 | 875 | 0.60 |
| $Fe_3C$-CDC-400C-2h-$H_2$ | 2 | 3 | 860 | 0.66 |
| $Fe_3C$-CDC-500C-2h-$H_2$ | 2 | 3 | 748 | 0.60 |
| $Fe_3C$-CDC-600C-2h-$H_2$ | 2 | 3 | 652 | 0.48 |
| $Fe_3C$-CDC-700C-2h-$H_2$ | 2 | 3 | 432 | 0.57 |
| $Fe_3C$-CDC-800C-2h-$H_2$ | 2 | 3 | 197 | 0.43 |
| $Fe_3C$-CDC-900C-2h-$H_2$ | 2 | 3 | 173 | 0.27 |
| $Fe_3C$-CDC-1000C-2h-$H_2$ | 2 | 3 | 261 | 0.34 |

[a]Obtained by BET Analysis at a Relative Pressure (P/$P_0$) Range of 0.01-0.05
[b]Obtained at P/$P_0$ = 0.99

Figure 17:
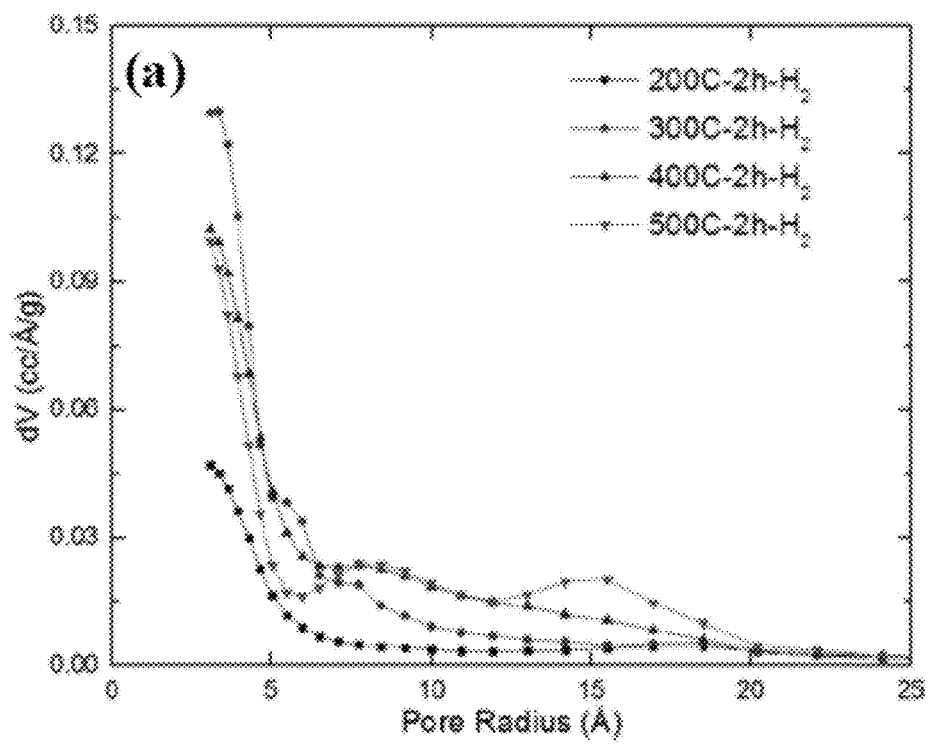
FIG. 17 is a graph of the pore size distribution plotted as derivative volume (cc/Å/g) as a function of the pore radius (Å) for annealed $Fe_3C$-CDCs chlorinated at various temperatures from 200° C. to 500° C.
Figure 18:
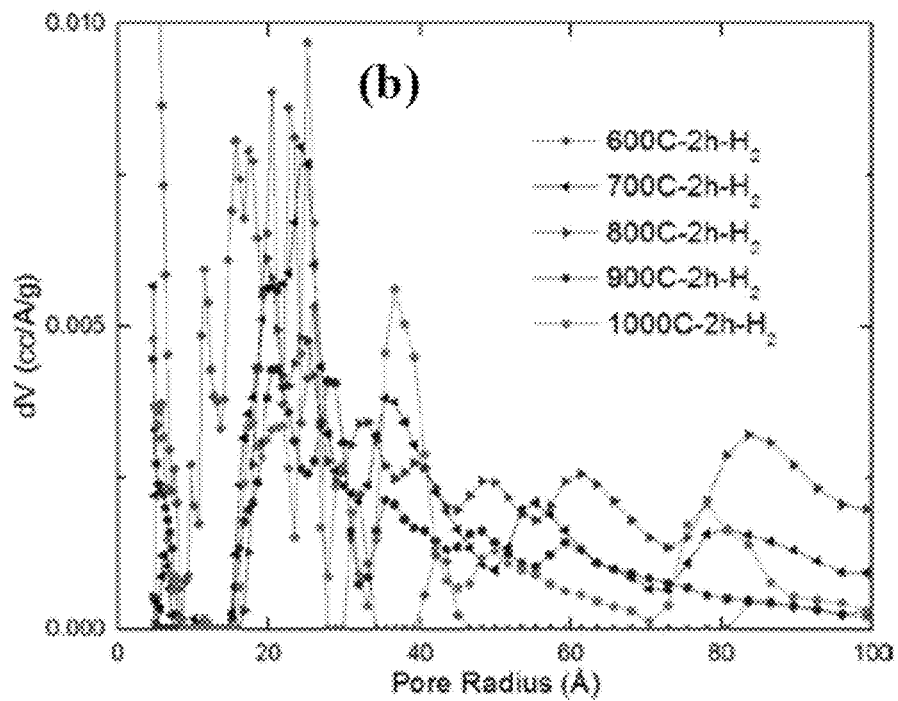
FIG. 18 is a graph of the pore size distribution plotted as derivative volume (cc/Å/g) as a function of the pore radius (Å) for annealed $Fe_3C$-CDCs chlorinated at various temperatures from 600° C. to 1000° C.

Quenched Solid Density Functional Theory (QSDFT) was used to further investigate the effect of chlorination temperature on pore size, and the results are summarized in FIG. 17 and FIG. 18. Two different QSDFT methods were used to account for the distinct shift in pore architecture evident by the isotherm shapes in FIG. 14 and FIG. 15. A slit-pore model was assumed for samples ≤500° C. with type I isotherms, and an adsorption branch slit-pore and cylindrical pore model was assumed for samples >500° C. exhibiting type IV isotherms and characteristic cavitation effects. Only the adsorption branch of the isotherm was applied for samples >500° C., as the sudden pore emptying in the desorption branch around P/$P_0$=0.42 is caused by the thermo-physical properties of nitrogen at 77 K and is not indicative of the pore size. In FIG. 17, samples chlorinated at ≤500° C. show the majority of pores are <2 nm in diameter with an initial peak maximum at 7 Å, with further microporosity likely present at pore sizes too small to be accurately infiltrated by the nitrogen probe molecule. A significant amount of small mesopores (<4 nm in diameter) begin to develop at 400° C. as higher temperature $Fe_3C$-CDCs exhibit a micro and mesoporous structure due to increased structural ordering. In FIG. 18, there is a severe decrease in microporosity after 600° C. and a broad range of mesoporosity between 2-8 nm pore diameter. Further increases occur for meso and macropores with diameters >100 nm for ≥700° C. samples, consistent with the sharp increase at high relative pressures for these samples.

Figure 19:
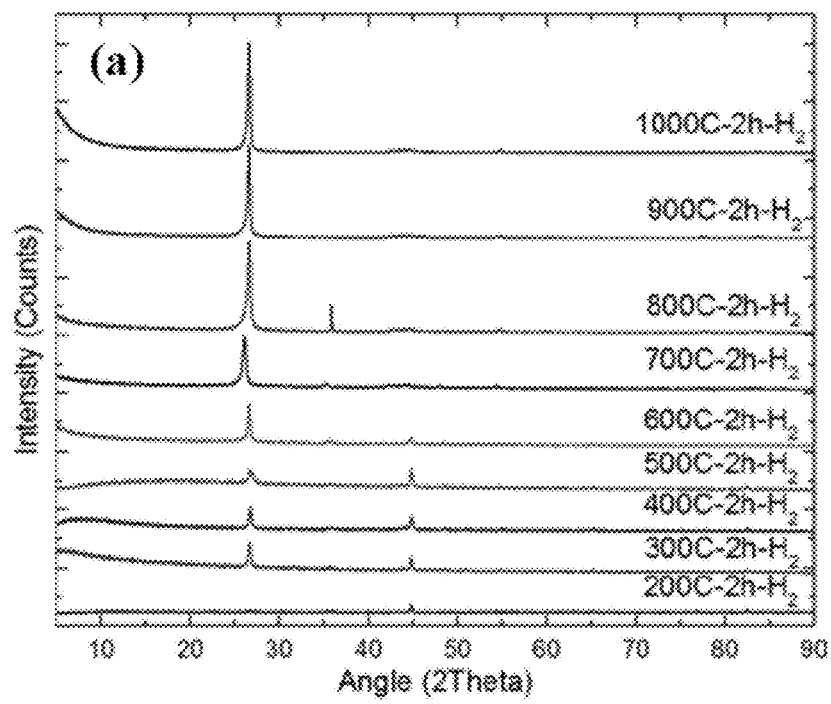
FIG. 19 is a powder X-ray diffraction (PRXD) pattern for annealed $Fe_3C$-CDCs.
Figure 20:
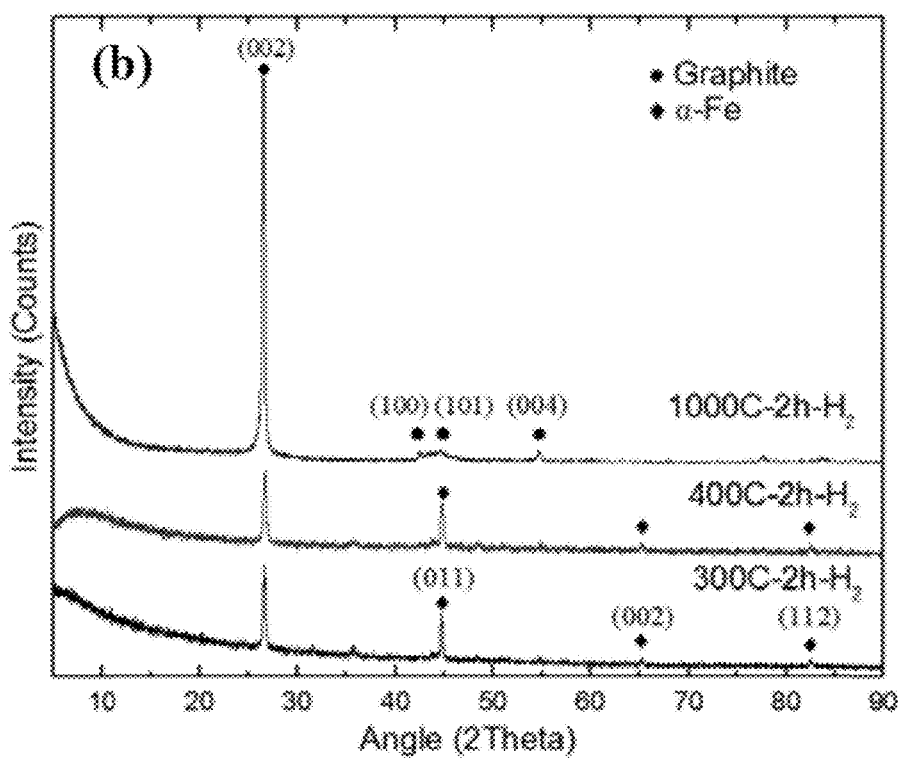
FIG. 20 is a powder X-ray diffraction (PRXD) pattern for annealed $Fe_3C$-CDCs labeling peaks associated with graphite (circles) and α-Fe (diamonds).

Powder X-ray Diffraction (PXRD) patterns were collected for all samples and can be seen in FIG. 19 and FIG. 20. The increase in mesoporosity at higher chlorination temperatures correlates well with the appearance and increase in intensity of several peaks corresponding to graphite. Peaks at 2θ=~26° and 2θ=~55° are identified as the (002) and (004) graphite reflection, which correspond to the parallel stacking of graphite layers. At higher chlorination temperatures, the (100) and (101) planes that represent the in-plane symmetry along graphene layers are present as a broad peak at 2θ=~43°. These can be seen more clearly for 1000C-2h-$H_2$ in FIG. 20. The larger width of this peak at 2θ=~43° is due to the presence of stacking faults for the in-plane direction. Scanning electron microscopy (SEM) images of these samples also support a much higher degree of graphitic ordering and will be discussed in later sections. Samples with incomplete conversion, also exhibited peaks at 2θ=~45°, ~65°, and ~82° corresponding to the (011), the (002), and the (112) reflection of α-Fe. The presence of these peaks signify there is residual Fe present in the metallic form and not as unreacted carbide. Gravimetric calculations were performed for these samples according to Eqn. 3. It can be seen in Table 4 that there is a significant portion of iron that has not been extracted from the resulting CDC. As shown previously at 600° C., a large percentage of iron chloride products can be retained in $Fe_3C$-CDCs due to graphitic carbon nanostructures that prevent or slow their removal. After annealing treatment, they can be further reduced and present in the metallic form. From the α-Fe peaks present in FIG. 19 and FIG. 20, this phenomenon appears extendable to other temperature regimes.

$$X_{Fe_3C} = \frac{m_0 - m_f}{m_0} \frac{M_{Fe_3C}}{M_{Fe}} \quad (3)$$

The (002) reflection of graphite at 2θ=~26° is present for all samples, even for 200C-2h-$H_2$. A previous study. showed unannealed Fe3C-derived carbons chlorinated at or below 500° C. to be amorphous and found no evidence of ordered parallel graphitic layers via the (002) or (004) reflection in the PXRD pattern (Dimovski S, at al., *Journal of Materials Chemistry*. 2004, 14(2):238-43) The addition of an annealing treatment and temperature ramp from chlorination temperature to the annealing temperature of 600° C. in this study likely facilitates this graphitization. We have shown that a significant percentage of iron chloride products are retained as nanoparticles within the resulting CDC framework. Not wishing to be bound by any theory, it was hypothesized that $FeCl_3$ is retained at chlorination temperatures exceeding its decomposition temperature by catalyzing the growth of surrounding graphitic carbon nanostructures that prevent its removal to the bulk gas phase. Gravimetric calculations in Table 4, as well as the α-Fe present in the PXRD patterns in FIG. 19 and FIG. 20, signify the presence of the iron chlorides before annealing treatment, and these retained iron chlorides likely catalyze the growth of graphitic domains during the temperature ramp. These graphitic domains are further investigated using Raman spectroscopy and their morphology is examined through Scanning Electron Microscopy.

TABLE 4

Metal Removal for Annealed Fe$_3$C-CDCs

| Sample Name | Percent Metal Removed (%)[a] |
|---|---|
| Fe$^3$C | — |
| Fe$^3$C-CDC-200C-2h-H$_2$ | 73.6 |
| Fe$^3$C-CDC-300C-2h-H$_2$ | 94.9 |
| Fe$^3$C-CDC-400C-2h-H$_2$ | 95.5 |
| Fe$^3$C-CDC-500C-2h-H$_2$ | 95.0 |

[a]Calculated with Eqn. 3.

Figure 21:
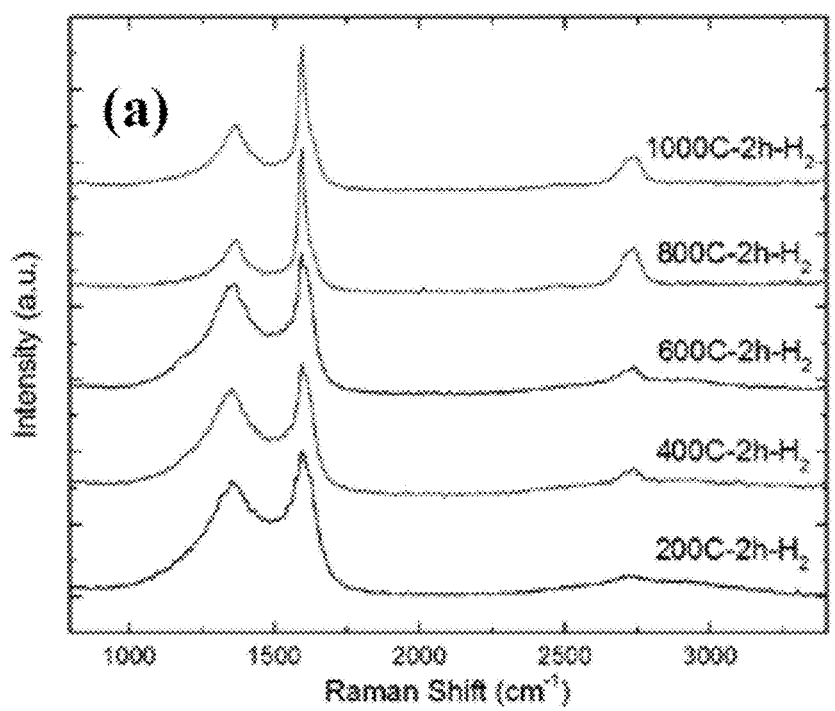
FIG. 21 is a graph of the Raman spectra of annealed $Fe_3C$-CDCs.
Figure 22:
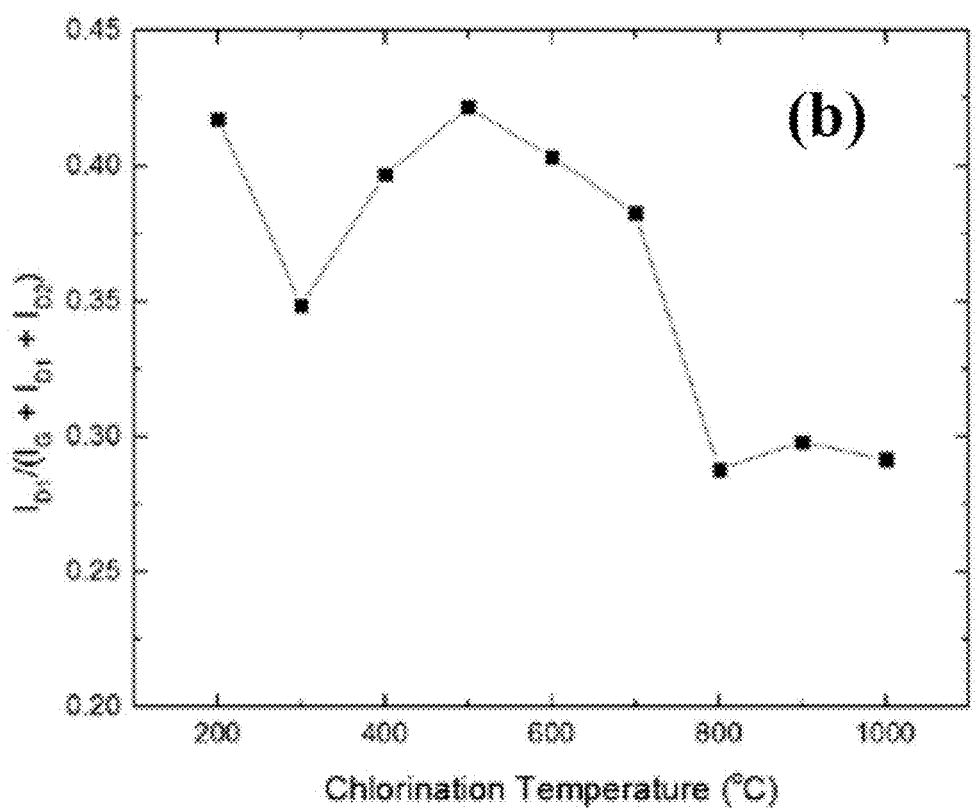
FIG. 22 is a graph of the degree of graphitization of annealed $Fe_3C$-CDCs as a function of the chlorination temperature (° C.).

Raman spectra for annealed Fe3C-CDCs are presented in FIG. 21. For all samples, two large first-order peaks were observed at ~1350 cm$^{-1}$ and ~1590 cm$^{-1}$. These peaks were assigned to the D band and graphitic G band, respectively. The D band corresponds to defects and disorder within graphitic sheets and the G band corresponds to the vibrational mode of an ideal graphitic lattice with E$_2$g symmetry. The D band can be further deconvoluted, depending on the type of carbonaceous material. Disordered graphite is usually fit with three peaks: the G band, the D1 band at ~1350 cm$^{-1}$ assigned to the graphitic lattice breathing mode with A$_1$g symmetry, and the D$_2$ band at ~1610 cm$^{-1}$ corresponding to a graphitic lattice vibration mode with E$_2$g symmetry, but at the surface of a graphite crystal. These three peaks fit well for Fe$_3$C-CDCs chlorinated at temperatures >800° C., as the D$_1$ band can clearly be seen as a right shoulder to the main G band peak. For samples chlorinated at a lower temperature, the D band was further deconvoluted into an additional D$_3$ peak present at 1510 cm$^{-1}$, and a broad D$_4$ peak present at 1150 cm$^{-1}$. The D$_4$ peak has been tentatively ascribed to polyene structures and ionic impurities within graphitic lattices, and the D$_3$ peak is assigned to amorphous carbon. All peaks were fit with Lorentzian peak shapes, except D$_3$, where a Gaussian peak was assumed. The degree of graphitization was used to determine the relative degree of ordering with a carbonaceous material, and these results are plotted versus chlorination temperature in FIG. 22. The degree of graphitization was calculated by averaging the I$_{D1}$\(I$_G$+I$_{D1}$+I$_{D2}$) ratio taken from several spots within the CDC. The degree of graphitization is seen to remain relatively constant until a sharp decrease at chlorination temperatures ≥800° C. These observations are consistent with the appearance of the (004) and (101) peaks in the diffraction patterns, indicating a direct relationship between graphitic ordering and chlorination temperature for annealed Fe$_3$C-CDCs.

A second-order peak was also observed at ~2720 cm$^{-1}$, becoming gradually sharper at higher chlorination temperatures. This broad peak, was assigned to the first overtone of the D, band, (2*D$_1$), and is also referred to as the S, band. In the case of well-ordered graphite, this band splits into two distinct peaks—a main peak at ~2720 cm$^{-1}$ for the (2*D$_1$)1 band, with a pronounced shoulder at ~2680 cm$^{-1}$ labeled as the (2*D$_1$)2 band. The increased intensity of the S$_1$ band at higher chlorination temperatures correlates well with the appearance of (004), (100), and (101) reflections of graphite in the PXRD patterns. These samples are still disordered graphitic structures even when chlorinated at 1000° C., as the S$_1$ band can still be seen as one broad peak, indicating a lack of highly ordered graphite over significant 3-D domains.

Dependence of Fe$_3$C-CDC Topology on Chlorination Temperature

SEM images were taken across the full range of chlorination temperature. There were noted differences in the SEM images for Fe$_3$C-CDCs chlorinated at low and high temperatures. At 300° C. and 500° C.,) highly ordered tubular structures with sharp edges were observe in the SEM images. These structures were investigated further using TEM. These domains are not present at higher temperatures, where the carbon is seen to be largely comprised of planar graphitic sheets. This is consistent with the high amount of 3-D ordering previously seen in the PXRD patterns. Similar tubular structures were confirmed to be carbon nanotubes under TEM.

The 200C-2h-H$_2$ sample exhibits the most interesting structures in SEM. Well-ordered rectangular prisms were seen in SEM, and ordered cylinders are present in the SEM, as well as pillared, complex 3-D prisms and cubes. At 200° C., one of the main chlorination products, FeCl$_3$, is present below its boiling point (316° C.) for this sample. Most of the reaction product is still able to vaporize to the bulk gas phase, as evident from its high conversion in Table 4, and EELS spectra on cubic shaped particles observed by TEM show no Fe present in these cubic domains. Both carbon and chlorine are present in the EELS Spectra, and as evident from the diffraction patterns, these domains exhibit crystallinity. Not wishing to be bound by any theory, it is hypothesized that the slow vaporization of FeCl$_3$ at this temperature allows ample time for the catalyzed formation of these intricate structures. At modest temperatures <600° C., iron chlorides are postulated to catalyze carbon nanostructures above its boiling point, as these nanostructures are hypothesized to impede the sublimation of FeCl$_3$ decomposition products, FeCl$_3$ and Fe$_2$Cl$_6$. The presence of iron chloride in the tips of carbon nanotubes and Fe particles surrounded by graphitic carbon nanostructures were observed by TEM for samples synthesized at 600° C. Similar, curved graphitic carbon nanotubes can be seen both in the SEM images and in TEM at chlorination temperatures of 300° C. and 500° C.

Ammonia Breakthrough Experiments for Unannealed Fe3C-CDCs

Figure 23:
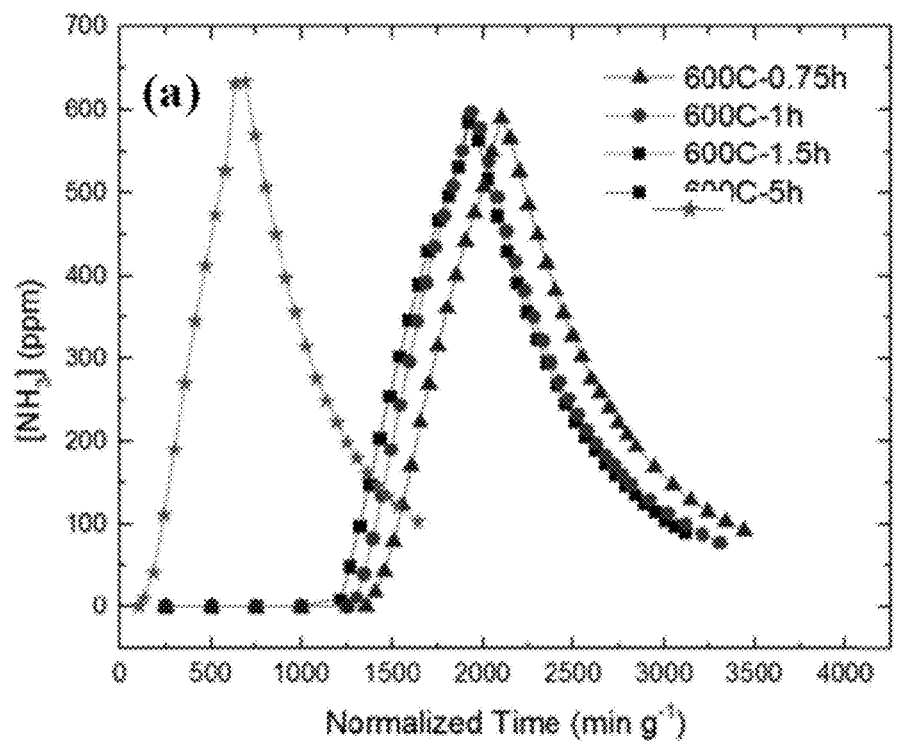
FIG. 23 is a graph of the ammonia breakthrough and desorption curves for unannealed $Fe_3C$-CDCs under dry conditions (0% RH) plotted as [$NH_3$] (ppm) as a function of normalized time (min $g^{-1}$).
Figure 24:
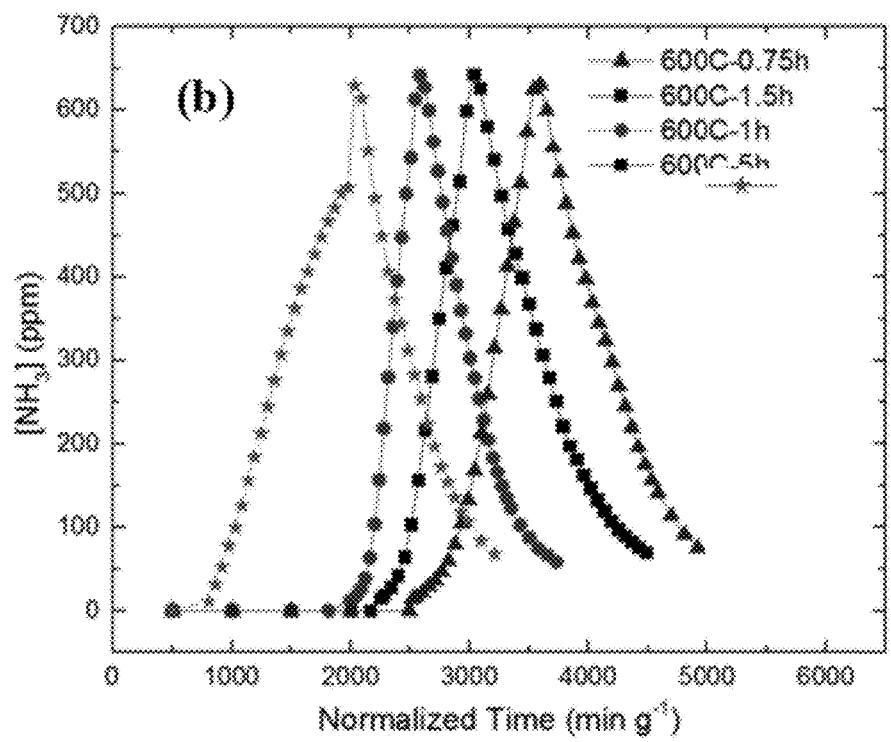
FIG. 24 is a graph of the ammonia breakthrough and desorption curves for unannealed $Fe_3C$-CDCs under humid conditions (75% RH) plotted as [$NH_3$] (ppm) as a function of normalized time (min $g^{-1}$).

Ammonia breakthrough curves are shown in FIG. 23 for dry and FIG. 24 for humid conditions at 25° C. For these experiments, a series of unannealed Fe$_3$C-CDCs were evaluated. These unannealed Fe$_3$C-CDCs were chlorinated at 600° C. for various chlorination times to include residual FeCl$_3$ nanoparticles. Unlike the samples chlorinated at different temperatures, as seen in Table 3, these samples were not annealed to prevent the reduction of FeCl$_3$ to metallic Fe. It was hypothesized that NH$_3$ would form strong chemisorption interactions with FeCl$_3$ via the formation of metal amine chlorides. To evaluate the effect of FeCl$_3$ nanoparticles, Fe$_3$C was also chlorinated at 5 hours to prepare a metal free sample for use as a standard. Trapped Cl$_2$ is also present in unannealed CDCs, and prepared unannealed Fe$_3$C-CDCs were probed by EDS and FTIR to understand the role of residual chlorine on dynamic adsorptive performance. The breakthrough time for these dynamic experiments was normalized on a per gram basis and the dynamic capacities, W$_E$, were calculated by Equation (4):

$$W_E = \frac{\dot{n}_{NH_3} t_b}{m_{bed}} \quad (4)$$

A molar flow rate of $NH_3$, $\dot{n}_{NH_3}$ was adsorbed by the bed until breakthrough at time, $t_b$. This breakthrough time, $t_b$, is the time from when the $NH_3$ stream was first switched on, until initial breakthrough when the electrochemical sensor first registered $[NH_3]>0$ ppm on the effluent stream. It is important to note that these dynamic capacities were taken at this initial breakthrough condition, as dynamic capacities calculated in other studies can also contain the integral of the breakthrough curve until saturation, which includes additional dynamic capacity retained by the sample after initial breakthrough but before complete saturation. The molar adsorbed amount of $NH_3$ was normalized by a known mass of the adsorbent, $m_{bed}$, to provide the normalized dynamic loading for each sample seen in Table 5. Repeatability of $t_b$ on this breakthrough system was +/−10%.

The bulk porosity and pore size distributions for unannealed $Fe_3C$-CDCs can be seen as in Table 5. Surface area, pore volume, and pore size are consistent between samples. Unannealed CDCs have lower surface area than the annealed CDCs seen in Table 3 due to the presence of trapped chlorine that are normally removed by $H_2$ treatment. We have shown that the presence of moderate amounts of $FeCl_3$ nanoparticles does not greatly affect porosity. No significant improvement in surface area was seen after chlorinating past 45 min at 600° C. to fully remove residual Fe species. The metal free standard, 600C-5h, has slightly lower surface area and lower volume of micropores, which is likely caused by some structural degradation or increased pore filling from trapped chlorine species due to long exposure of chlorine gas at high temperature. Residual chlorine concentrations obtained through EDS show a decrease in chlorine concentration with increasing treatment time, as more $FeCl_3$ nanoparticles are slowly removed from the CDC matrix. The metal free standard had no measurable Fe present over numerous spots within the sample, but did include a significant amount of trapped chlorine species.

Role of Chlorine and $FeCl_3$ Nanoparticles for Ammonia Adsorption

Under dry conditions in FIG. 23, all samples had very similar breakthrough times around 1300 min $g^{-1}$, corresponding to dry capacities between 1.62-1.88 mmol $g^{-1}$. Under wet conditions in FIG. 24, the 600C-0.75h sample with 8.4% residual Fe has the highest wet capacity, at 3.44 mmol $g^{-1}$, while 600C-1h and 600C-1.5h exhibit lower wet capacities of 2.45 and 2.91 mmol $g^{-1}$. The metal-free standard, 600C-5h, had almost instantaneous breakthrough under dry conditions, and drastically lower humid dynamic capacity. This standard had similar physical properties and chlorine content to samples containing $FeCl_3$ nanoparticles, and heavily suggests residual metal plays a strong role in dynamic $NH_3$ adsorption.

Figure 25:
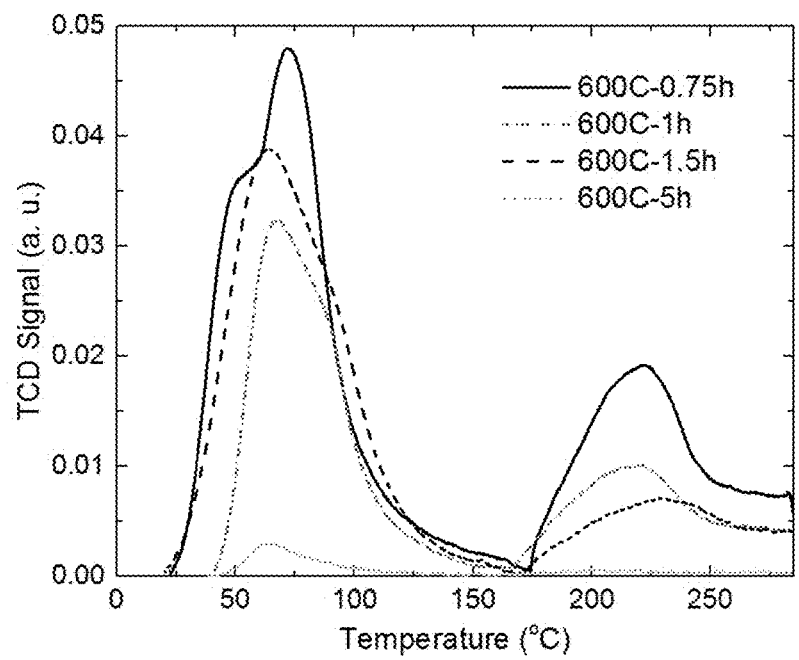
FIG. 25 is a graph of the temperature programmed desorption (TPD) of $NH_3$ from unannealed $Fe_3C$-CDCs plotted as the thermal conductivity detector (TCD) signal (a.u.) as a function of temperature.

To further elucidate the interactions between $NH_3$ and $FeCl_3$ nanoparticles embedded in unannealed $Fe_3C$-CDCs, $NH_3$-TPD experiments were carried out and ammonia desorption profiles can be seen in FIG. 25. Two main peaks were observed—centered at ~70° C. and 220° C., respectively. The integral of the 220° C. peak increases with residual Fe content, and was not observed for the metal free 600C-5h sample. This peak was assigned to chemisorption interactions resulting from the formation of iron ammine chlorides, and is not present for the 600C-5h as a result of complete $FeCl_3$ removal.

One likely complex is $Fe[(NH_3)_6]Cl_3$, which has been observed to form spontaneously from $FeCl_3$ and $NH_3$ at room temperature. Desorption occurring at ~70° C. is suggested to be weak physisorption interactions occurring between the pore wall and $NH_3$, in addition to interactions residual trapped chlorine present from the chlorination synthesis.

FTIR spectra were collected for fresh and exhausted samples. 600C-1h-DE and 600C-1h-WE, after exposure to ammonia during dry breakthrough (DE) and wet breakthrough conditions (WE), show a strong peak at 1400 $cm^{-1}$. This peak corresponds to the $NH_4$ deformation and matches well with the FTIR spectra of $NH_4Cl$, further indicating the formation of an ammine complex with the iron salt. All fresh and exhausted samples also exhibit a strong peak at ~1375 $cm^{-1}$. This peak was assigned to C—H bending in plane, separate from the $NH_4^+$ peak at 1400 $cm^{-1}$. The ammonium peak is absent from the metal-free 600C-5h spectrum under dry conditions, and only present under humid conditions. As this peak is present for 600C-5h-WE, the retention of $NH_4^+$ under humid conditions is not solely due to complexation with $FeCl_3$. It is well-known that chlorine gas reacts with water to form HOCl and HCl. Trapped chlorine gas is also likely to form ammonium chloride through the following reaction scheme:

$$Cl_2 + H_2O \rightarrow HOCl + HCl \quad (5)$$

$$NH_3 + HCl \rightarrow NH_4Cl \quad (6)$$

The ability of trapped chlorine gas to convert to HCl and react to form an ammonium salt explains the modest capacity of 600C-5h under humid breakthrough conditions. It has been seen in the literature that the dissolution of ammonia in co-adsorbed water could also facilitate acid-base interactions between $NH_3$ and acidic functional groups on the surface of carbon adsorbents. However, there are relatively little oxygen containing functional groups seen in the FTIR spectra of unannealed $Fe_3C$-CDCs and low oxygen content seen in EDS experiments, making it likely that ammonium

TABLE 5

Dry and Humid NH3 Dynamic Adsorption Capacities

| Sample Name | Specific Surface Area ($m^2 g^{-1}$) | Pore Volume ($cc\ g^{-1}$) | Amount Fe (wt %)[a] | Amount Cl (wt %)[b] | Dry $NH_3$ Dynamic Capacity (mmol $g^{-1}$)[c] | Humid $NH_3$ Dynamic Capacity (mmol $g^{-1}$)[c] |
|---|---|---|---|---|---|---|
| $Fe_3C$-CDC-600C-0.75h | 339 | 0.34 | 8.4 | 15.0 | 1.88 | 3.44 |
| $Fe_3C$-CDC-600C-1h | 374 | 0.40 | 4.0 | 13.4 | 1.75 | 2.45 |
| $Fe_3C$-CDC-600C-1.5h | 353 | 0.38 | 2.4 | 10.8 | 1.62 | 2.91 |
| $Fe_3C$-CDC-600C-5h | 257 | 0.36 | 0.0 b | 5.7 | 0.17 | 1.07 |

[a]Calculated from TGA
[b]Determined from EDS
[c]Calculated by initial breakthrough time is predominately formed through interactions with chlorine in 600C-5h, as opposed to acidic functional groups.

Observations

Fe was selectively extracted from Fe$_3$C via chlorination and the effect of chlorination temperature on the physical properties of annealed Fe$_3$C-CDCs was examined. Highly microporous Fe$_3$C-CDCs can be synthesized at low chlorination temperatures, with a maximum surface area (875 m$^2$ g$^{-1}$) obtained at 400° C. It is possible that even higher surface areas and pore volumes can be obtained by chlorinating till complete extraction at extremely low temperatures (200° C.). The pore size of annealed Fe$_3$C-CDCs is highly versatile, and can be tuned by raising the chlorination temperature to allow increasing amounts of mesoporosity and macroporosity when desired. At low temperatures, the extraction of Fe is seen to catalyze the formation of very well ordered tubular and planar carbon structures. Over the entire temperature range, a high degree of graphitization was observed within both the PXRD patterns and Raman spectra.

In addition, at certain temperatures it was previously found that Fe$_3$C-CDCs synthesized at 600° C. could retain iron chloride nanoparticles dispersed with their nanoporous framework. These samples were evaluated for NH$_3$ breakthrough experiments and exhibited high dynamic loadings under both dry and wet conditions. The sample with the highest amount of residual metal, 600C-0.75 h, had the best performance with dynamic capacities of 1.88 mmol g$^{-1}$ and 3.44 mmol g$^{-1}$ under dry and wet conditions, respectively. When compared to a metal free Fe$_3$C-CDC control, Fe$_3$C-CDC-0.75h performed 1100% and 320% better under dry and wet conditions, respectively. NH$_3$-TPD and FTIR experiments show that this superior performance is a direct result of chemisorption interactions between NH$_3$ and FeCl$_3$ particles within the microporous framework. This is a particularly important conclusion, as these nanoparticles are hypothesized to be retained during synthesis due surrounding graphitic nanostructures, which hinder their diffusion into the bulk gas phase. In this work, these nanoparticles are still shown to be active in the adsorption of ammonia from air, indicating that they remain accessible and are able to interact with small gases. In addition, trapped chlorine gas present from the CDC synthesis is shown to play a beneficial role for NH3 adsorption in humid environments.

Example 3

Effect of Pore Size on Acid Functionalized Mo$_2$C-derived Carbons for Ammonia Adsorption Carbide-derived carbons were synthesized by chlorinating Mo$_2$C at temperatures ranging from 500-900° C. The chlorination temperature was varied to create carbide-derived carbons with unique micro, micro/meso, and mesoporous pore structures. Sulfuric and nitric acid treatments were performed to graft acidic functional groups on the carbon surface to provide specific interactions with NH$_3$. Acid-treated Mo$_2$C-CDC were evaluated in dynamic NH$_3$ breakthrough experiments and shown to have exceptional breakthrough capacities in both dry (0% RH) and humid (75% RH) environments. Acidic groups were characterized by X-ray Photoelectron Spectroscopy (XPS), Boehm Titration, and Fourier Transform Infrared Spectroscopy (FTIR) to normalize the performance of acid-treated Mo$_2$C-CDC on a per acid group basis and understand the unique mechanisms within each pore structure. From these results, it was suggested that acidic functional groups are best utilized in predominately microporous structures for NH$_3$ adsorption under both dry and humid conditions. Specific interactions between NH$_3$ and surface carboxyl, ester, and nitrate groups are hypothesized to contribute to high dynamic loadings for CDC adsorbents.

Materials

Carbide-derived carbons were prepared using one gram of Mo$_2$C (Sigma Aldrich 99.5% purity −325 mesh). The carbide precursor was spread out on a quartz boat and inserted into a quartz tube of ID 1", length 20" and into a horizontal tube furnace. Samples were heated to a reaction temperature of 500° C., 700° C., or 900° C. at a ramp rate of 5° C. min$^{-1}$ under 100 ml min$^{-1}$ of Ar flow (Airgas 99.999%). After reaching the desired chlorination temperature, chlorine gas (Airgas 99.5%) was introduced into the reactor at a flow rate of 25 ml min$^{-1}$ for 2, 3, or 4 hours, for 500° C., 700° C., or 900° C. respectively, while the Ar flow was maintained at 100 ml min$^{-1}$. The chlorination time was increased to ensure complete etching of the carbide precursor at lower temperatures. A scrubber solution of concentrated NaOH was used to neutralize acidic gases present in the effluent stream, including Cl$_2$, HCl, and molybdenum chlorides.

After the chlorination time had elapsed the chlorine gas flow was turned off and samples were cooled or heated to 600° C. at a ramp rate of 5° C. min$^{-1}$ under Ar flow. The Ar flow was then switched to 5% H$_2$ in Ar (Airgas 99.999%) at a rate of 100 ml min$^{-1}$ for 3 hours at 600° C. to anneal the CDC materials and remove residual chlorine. At the end of the annealing treatment, these samples were cooled to room temperature under Ar flow. These samples are referred to as "annealed" molybdenum carbide derived carbons and were labeled as M-CT, where CT denotes the chlorination temperature.

Mo$_2$C-CDCs were prepared batch-wise according to the procedure in the previous section until a batch size of 250 mg was attained at all chlorination temperatures. Each batch was verified by N$_2$-sorption at 77K, and Powder X-ray Diffraction (PXRD) to be structurally and porosimetrically equivalent. Energy dispersive spectroscopy (EDS) was used to verify that all batches were fully etched, and did not include any residual Mo$_2$C. For the acid treatment, 7 mL of a 13M stock solution of H$_2$SO$_4$ was added to 200 mg of each Mo$_2$C-CDC and heated at 70° C. in an oil bath for 6 hours. The temperature was subsequently raised to 100° C. and held for 12 hours. Samples were then transferred to rotary oven in a 45 mL teflon-lined acid digestion vessel for 12 hours at 200° C. Finally, samples were added to 7 mL of a 15M stock solution of HNO$_3$ and heated to 70° C. in an oil bath for 6 hours. After each treatment, samples were diluted and decanted stepwise with copious amounts of distilled water. Once the decanted liquid reached a minimum pH of 3, the samples were filtered and repeatedly washed with distilled water until the filtrate reached a neutral pH. Scanning electron microscopy (SEM) images were taken before and after to verify that the resulting acid treated samples did not include any remnants of filter paper. These samples were labeled M-CT-S-N to signify the acidification via both sulfuric acid and nitric acid.

Methods

Power X-ray Diffraction (PXRD) patterns were collected using an X'Pert X-ray PANalytical diffractometer using a Cu Kα X-ray source (Δ=1.5418 Å) and an X'accelerator module. PXRD spectrums were collected at room temperature from a range of 4-90 in two theta (2θ) with a step size of 0.02°. Nitrogen sorption measurements were obtained on a Quadrasorb System from Quantachrome Instruments, and used to calculate specific surface area, pore volume, and pore size distribution. Approximately 30-50 mg of each sample was activated overnight at 423K under vacuum and isotherms were collected at 77K. Specific surface areas were calculated using the BET model under the pressure range 0.01-0.05 $P/P_0$. Pore size distributions for all samples were obtained using the Quenched Solid Density Functional Theory (QSDFT) model in version 5.11 of the QuadraWin™ software. Parameters for the QSDFT model were chosen depending on the characteristics of the isotherm. For microporous, type I isotherms, a slit-pore model, nitrogen adsorbate, and carbon adsorbent were assumed for the QSDFT model. Whereas, for type IV isotherms that exhibited characteristic cavitation effects, an adsorption branch slit-pore/cylindrical pore model was used with an assumed nitrogen adsorbate and carbon adsorbent.

Scanning electron microscopy (SEM) images were obtained using a LEO 1530 Thermally-Assisted Field Emission (TFE) Scanning Electron Microscope (SEM). All samples were deposited onto carbon tape and not sputter coated prior to scanning. Images were scanned at an accelerating voltage of 10 kV. Quantitative chemical analysis of select samples was conducted utilizing an Oxford-7426 EDS detector attached to the LEO 1530 TFE SEM. At least three separate spots were surveyed for each sample.

Boehm titration was performed to quantify the amount of acidic functional groups. Briefly, 50 mg of each sample was added to a 0.01M solution of NaOH. The solution was shaken for 24 h and filtered. 10 mL aliquots of the filtrate solution were collected, and 20 mL of a 0.01M HCl solution was added. $N_2$ was bubbled through the solutions for 2 h to remove $CO_2$ and the solutions were subsequently back titrated with a 0.01M NaOH solution. A pH probe was used to monitor the endpoint of the titration at pH=7.0 under constant stirring.

X-ray Photoelectric Spectroscopy (XPS) measurements were taken on a Thermo K-alpha XPS, monochromated Al Kα source with a double-focusing hemispherical analyzer. High resolution spectra were taken of C1s, O1s, N1s with 30 total scans at 0.1 eV step size, 50 ms dwell time, 50 eV pass energy, and 400 µm spot size. A total of 10 survey scans were used to quantify the surface elemental concentration. A Magna 560 FTIR (Nicolet Instruments) was used to collect FTIR spectra. FTIR samples were prepared by diluting CDC powder with KBr in a 1:200 ratio and then pressed into a 13 mm disk. Absorbance data was averaged over 128 scans at a resolution of 2 $cm^{-1}$. A fresh background scan was taken and subtracted before each sample.

For ammonia breakthrough experiments, samples were evaluated on our experimental setup described in FIG. 2 and FIG. 3. $Mo_2C$-CDC powder was packed within a quartz bed against a fine quartz frit of ID 4 mm to a standardized bed volume of 55 $mm^3$. Samples were activated under 50 ml $min^{-1}$ $N_2$ flow at 150° C. for 2 hours and then allowed to cool back down to room temperature for 30-45 minutes. A dilute concentration of ammonia was flowed through the quartz bed at a flow rate of 20 ml $min^{-1}$. Breakthrough experiments were run under dry (0% RH) and humid (75% RH) conditions; humid conditions were achieved through the use of a water bubbler. The ammonia concentration for dry and humid runs was 1500 ppm and 1431 ppm, respectively. The dry run was started by switching the $N_2$ to a stream of 1500 ppm $NH_3$ in air at a rate of 20 ml $min^{-1}$ (Airgas). For a humid breakthrough run, a humid stream was created by flowing air at 16 ml $min^{-1}$ through a $H_2O$ bubbler, and then combining it with a $NH_3$ stream of 7155 ppm in air at a flow rate of 4 ml $min^{-1}$. The effluent stream was analyzed using an Analytical Technology H10-15 ammonia electrochemical sensor. Once the dilute $NH_3$ stream was switched on, data points were taken at 30 second intervals until the sensor reached 500 ppm $NH_3$, at which point the NH3 was switched off to preserve the life of the sensor. $N_2$ flow was maintained at 50 ml $min^{-1}$ to capture the desorption behavior of the bed, and the sensor reading was recorded until the $NH_3$ concentration returned to ~100 ppm. A blank bed of sand was used to calculate the dead time within the system, and was subtracted from the breakthrough time of evaluated samples. No significant pressure drop was noted for these conditions. The procedure for wet and dry conditions was identical. The activated mass was used in performance normalization calculations.

Physical Properties of $Mo_2C$-CDCs Before and after Acidification

Molybdenum was selectively etched from $Mo_2C$ in the following reaction scheme to create $Mo_2C$-CDC:

$$Mo_2C + 5Cl_2 \rightarrow 2MoCl_2 + C \qquad (7)$$

$Mo_2C$-CDCs were synthesized at different chlorination temperatures and annealed with $H_2$ to remove residual chlorine species and maximize available surface area. The chlorination temperature significantly affects the bulk porosity and pore size distributions of CDCs. Acidified $Mo_2C$-CDC-S-N were synthesized by subjecting each carbide-derived carbon to a strong oxidative treatment in concentrated $H_2SO_4$ and $HNO_3$. Acidification is known to cause pore blockage and possible degradation of the carbide-derived carbon framework. In addition, the additional mass of functional groups that do not contribute additional porosity can reduce the specific surface area, as it on a mass basis. Both of these effects were investigated through nitrogen sorption and Quenched Solid Density Function Theory (QSDFT). Nitrogen isotherms at 77K can be seen in FIG. 26 and FIG. 27 for both as-synthesized untreated $Mo_2C$-CDCs and treated $Mo_2C$-CDC-S. Pore size distributions for both series of samples are presented in FIG. 28 and FIG. 29. Bulk porosity can be found in Table 6.

Figure 26:
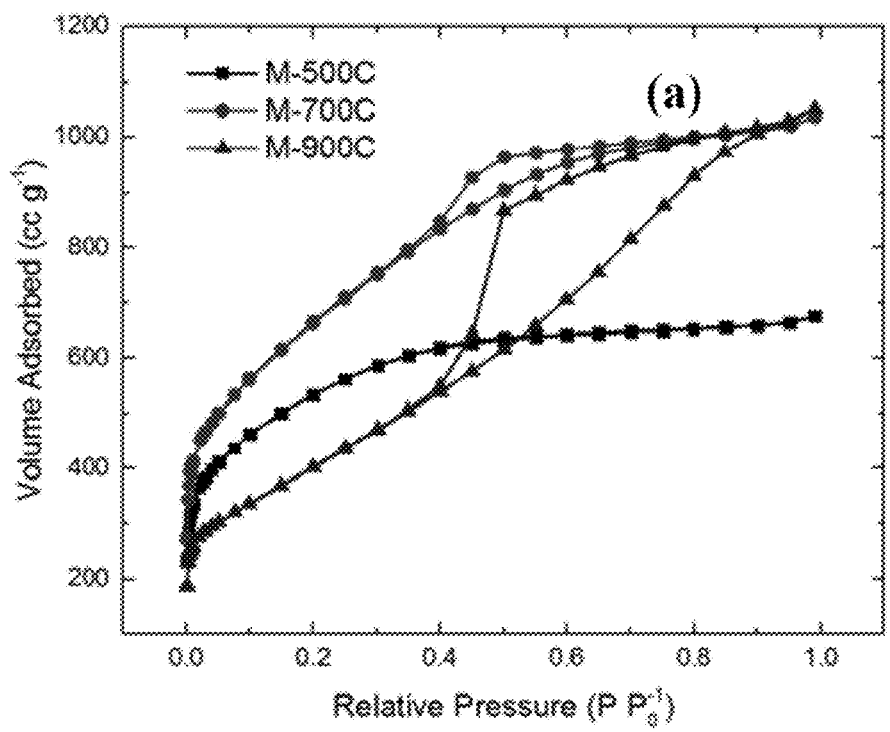
FIG. 26 is a graph is a graph of the $N_2$ adsorption isotherm at 77K for untreated $Mo_2C$-CDCs plotted as the volume of $N_2$ adsorbed (cc/g) as a function of the relative pressure ($P/P_0$).
Figure 27:
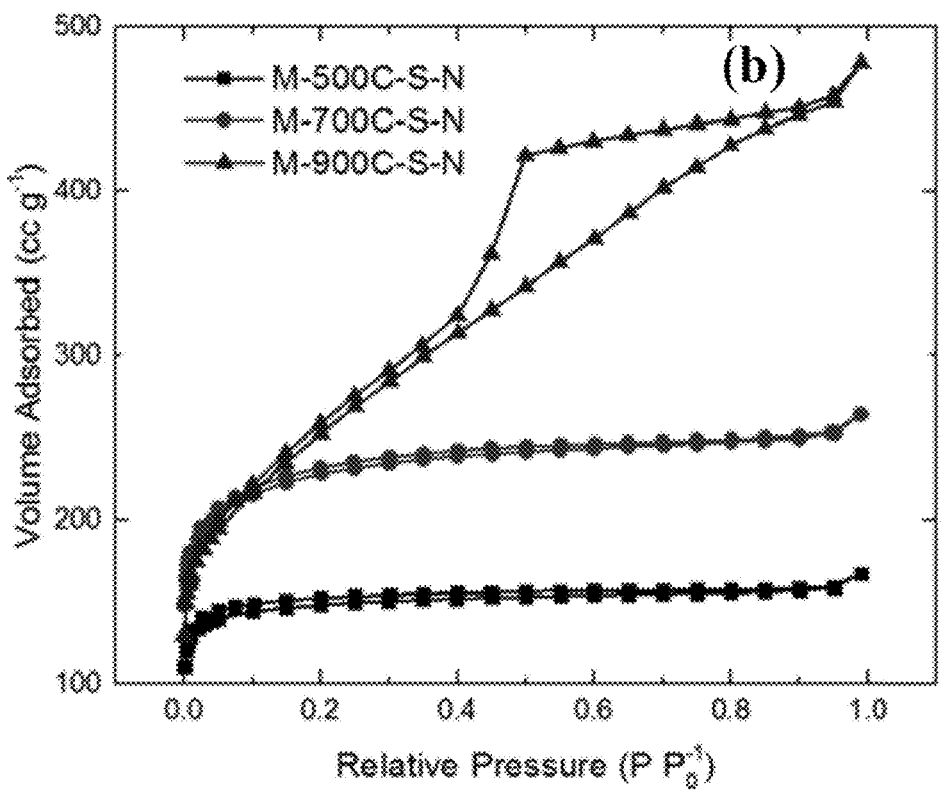
FIG. 27 is a graph is a graph of the $N_2$ adsorption isotherm at 77K for acid-treated $Mo_2C$-CDCs plotted as the volume of $N_2$ adsorbed (cc/g) as a function of the relative pressure ($P/P_0$).

In FIG. 26 and FIG. 27, the shape of the nitrogen isotherm was seen to be strongly dependent on the chlorination temperature. M-500C has a characteristic Type I isotherm shape by Brunauer classification, indicating a microporous structure. As the chlorination temperature increases, there is a growing hysteresis loop present in M-700C and M-900C's nitrogen isotherm, and both samples resemble a type VI isotherm with a triangular $H_2$ hysteresis loop according to IUPAC classification. This hysteresis is likely caused by the presence of cavitation effects. The rapid pore emptying of nitrogen at relative pressure=0.42 is characteristic of the tensile stress limit of the condensed nitrogen fluid. Since this rapid desorption is caused by the thermo-physical properties of the fluid, and not characteristic of the pore structure, only the adsorption branch for M-700C and M-900C was used in subsequent QSDFT calculations. Untreated $Mo_2C$-CDCs show high bulk porosity at all three chlorination temperatures, with M-700C having the greatest specific surface area of 1793 $m^2\ g^{-1}$. M-700C and M-900C have similarly high pore volumes of 1.63 cc $g^{-1}$. M-500C exhibits a high surface area of 1457 $m^2\ g^{-1}$, but comparatively smaller total pore volume, and appears highly microporous from the isotherm shape. These results are in good agreement with previous investigations on $Mo_2C$-CDCs.

TABLE 6

Porosity and residual metal for prepared Mo$_2$C-CDCs

| Sample Name | Specific Surface Area (m$^2$ g$^{-1}$)$^a$ | Pore Volume (cc g$^{-1}$)$^b$ | V$_{micro}$ | V$_{meso}$ | Micropore Volume (%) | V$_{micro}$ change (%) | V$_{meso}$ change (%) |
|---|---|---|---|---|---|---|---|
| M-500C | 1457 | 1.05 | 0.73 | 0.23 | 69.5 | — | — |
| M-700C | 1793 | 1.61 | 0.45 | 1.05 | 28.0 | — | — |
| M-900C | 1141 | 1.63 | 0.16 | 1.38 | 9.8 | — | — |
| M-500C-S-N | 557 | 0.26 | 0.25 | 0.01 | 96.2 | −65.7 | −95.7 |
| M-700C-S-N | 773 | 0.41 | 0.27 | 0.10 | 65.9 | −40.0 | −90.5 |
| M-900C-S-N | 714 | 0.74 | 0.17 | 0.52 | 23.0 | 6.3 | −62.3 |

$^a$Obtained by BET Analysis at a Relative Pressure Range of 0.01-0.05 P/P$_0$
$^b$Obtained at P/P$_0$ = 0.99

Figure 28:
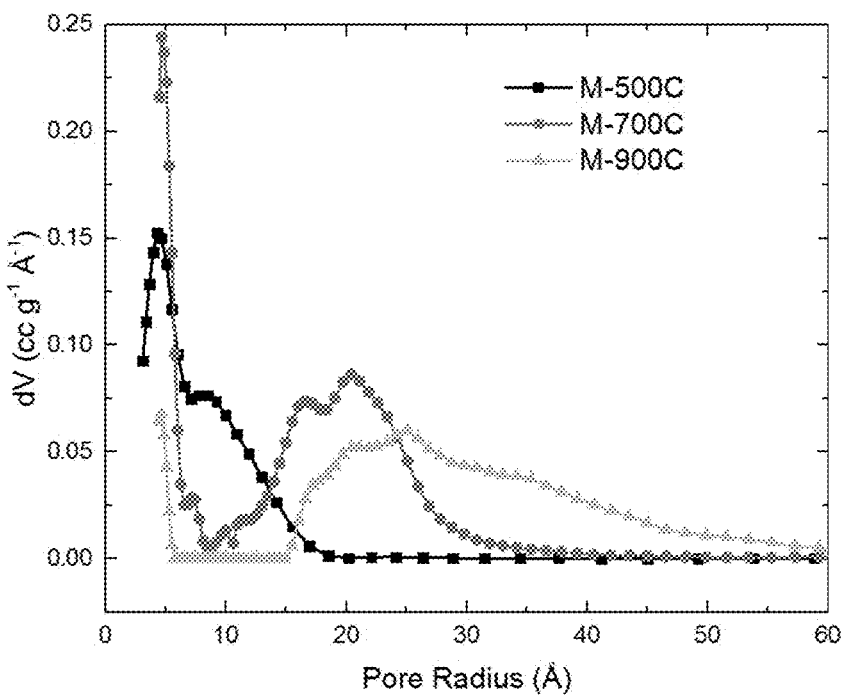
FIG. 28 is a graph of the pore size distribution plotted as derivative volume (cc $Å^{-1}$ $g^{-1}$) as a function of the pore radius (Å) for untreated $Mo_2C$-CDCs chlorinated at 500° C., 700° C., and 900° C.
Figure 29:
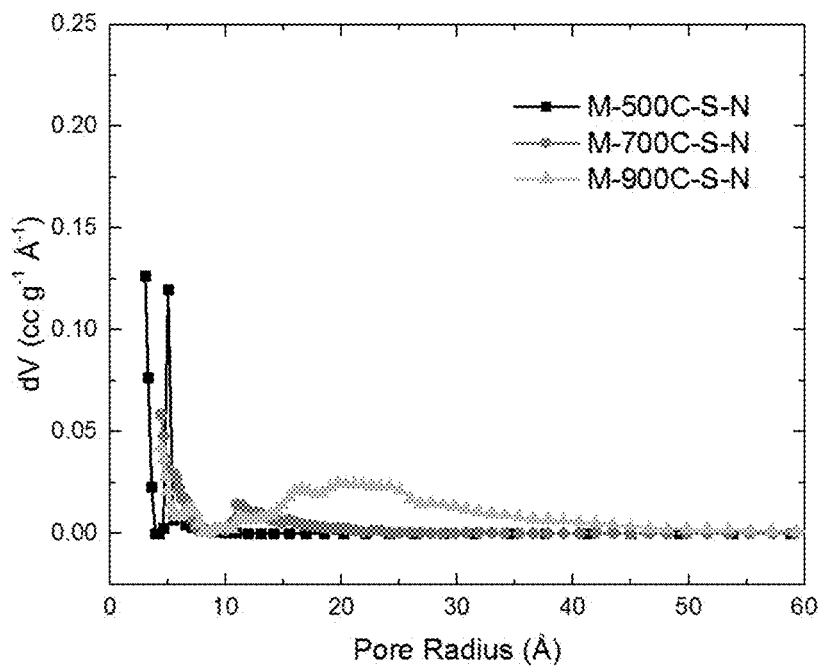
FIG. 29 is a graph of the pore size distribution plotted as derivative volume (cc $Å^{-1}$ $g^{-1}$) as a function of the pore radius (Å) for acid-treated $Mo_2C$-CDCs chlorinated at 500° C., 700° C., and 900° C.

Pore size distributions in FIG. 28 and FIG. 29 show distinct differences between the pore structures of synthesized Mo$_2$C-CDCs. M-500C is mainly a microporous structure, with almost all pores less than 3 nm in diameter. As the chlorination temperature increases, increased mesoporosity is seen in M-700C and M-900C. M-700C features a large amount of micropores and small mesopores from 2-5 nm diameter. M-900C is largely mesoporous, with a wide peak of mesopores between 3-12 nm in diameter. This increase in mesoporosity correlates well with the gradual shift from Type I to Type IV isotherm at increasing chlorination temperatures. In Table 6, drastic differences occur in the percentage of total pore volume resulting from micropores (diameter <2 nm). Chlorination at 500° C. results in 69.5% microporous pore volume, while M-900C total pore volume only exhibits a 9.8% contribution from its micropores.

After acidification, there are notable changes in the bulk porosity, isotherm shape, and pore size distribution of Mo$_2$C-CDCs. As expected, the surface area decreases after acidification. The volume of micropores and mesopores, V$_{micro}$ and V$_{meso}$ respectively, both decrease significantly after acidification for all samples except for M-900C-S-N. This decrease is likely caused by three factors. First, the additional mass of functional groups that do not add porosity dilute the overall pore volume on a mass basis. Second, a percentage of mesopores are likely converted to micropores after the addition of functional groups within the pore space. The increase in V$_{micro}$ for M-900C-S-N supports that there are functional groups grafted within the pore space, especially considering the first mass dilution effect. Third, some pore blockage and pore degradation is suggested to cause some porosity loss. From the pore size distributions in FIG. 28 and FIG. 29, there are several changes within specific pore sizes for these samples. In general, the small mesopores (2-5 nm in diameter) seem to completely shift or experience blockage/degradation after acidification. The mesopores present in this range for M-500C are completely absent in M-500C-S-N's pore size distribution, and only a small broad peak from 2-3 nm is noted from M-700C-S-N. More striking is the difference in isotherm shape for M-700C, which shifts from a Type IV isotherm to a Type I after acidification. The hysteresis loop present in M-700C due to cavitation is no longer seen in the isotherm after acidification. It is possible that functional groups are now present in the large main pore cavity, reducing its size and removing the cavitation effect. It is also likely that in some ink-bottle type pores, the small neck is now blocked by these functional groups.

Acid Group Functionalities after Acidification of Mo$_2$C-CDCs

Figure 30:
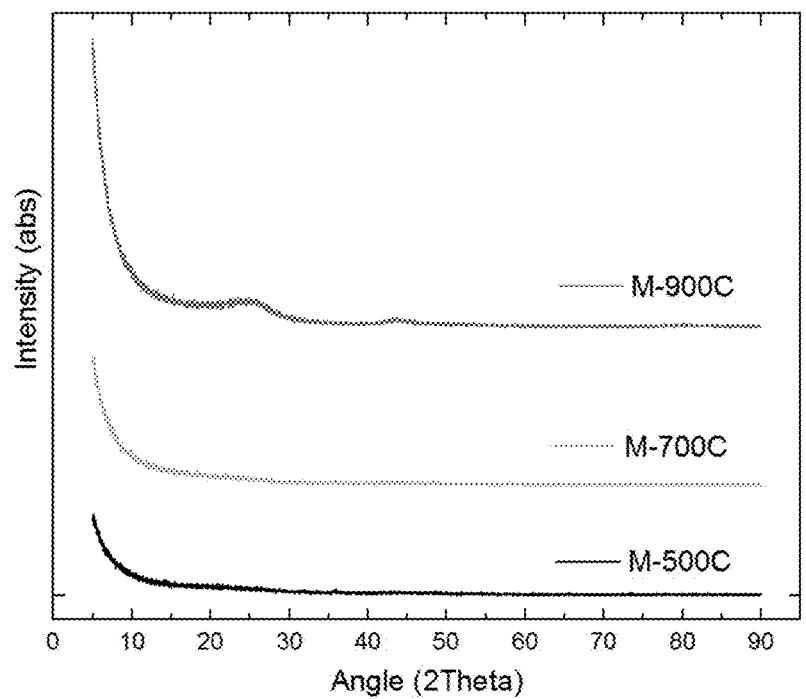
FIG. 30 is a graph of the X-Ray diffraction (XRD) spectra for untreated $Mo_2C$-CDCs chlorinated at 500° C., 700° C., and 900° C.
Figure 31:
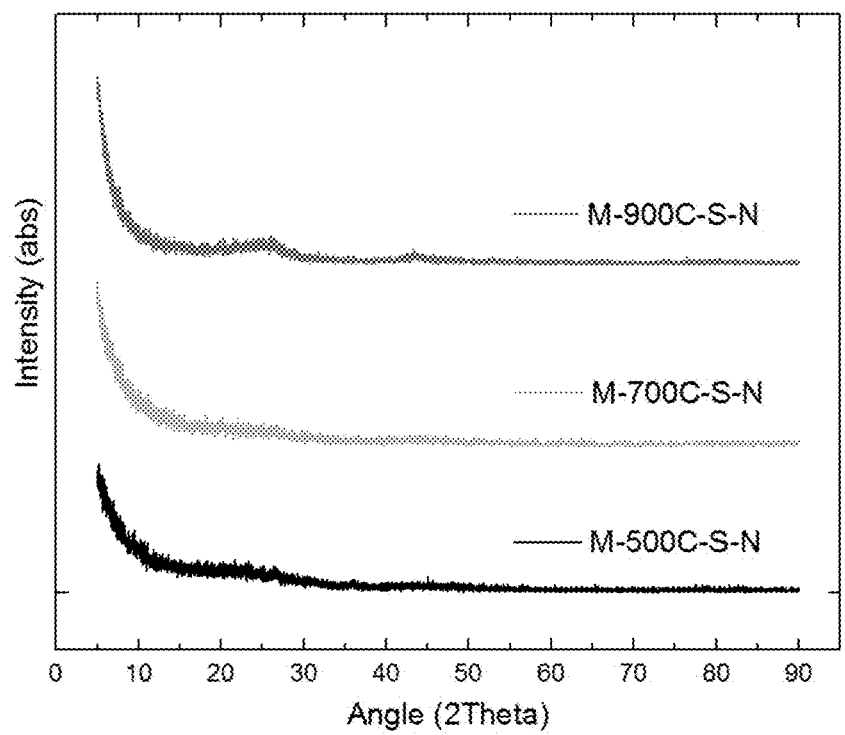
FIG. 31 is a graph of the X-Ray diffraction (XRD) spectra for acid-treated $Mo_2C$-CDCs chlorinated at 500° C., 700° C., and 900° C.
Figure 32:
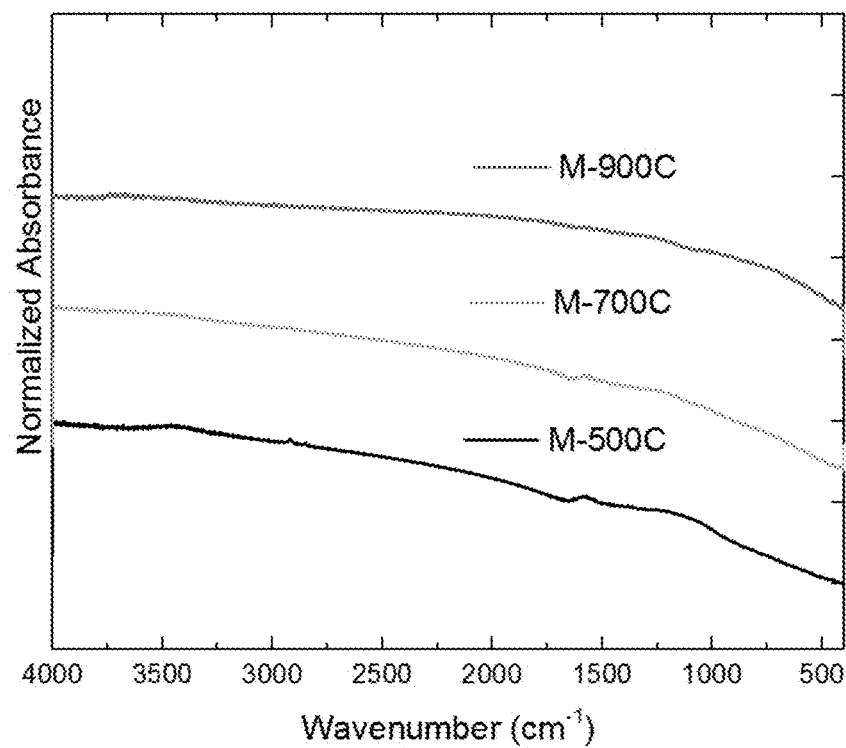
FIG. 32 is a graph of the FT-IR spectra of untreated $Mo_2C$-CDCs chlorinated at 500° C., 700° C., and 900° C.

Acidification through subsequent sulfuric acid and nitric acid treatment severely altered the surface chemistry of Mo$_2$C-CDCs. Elemental data from XPS survey scans in Table 7, shows drastic increases in oxygen content for all samples. There is also an increase in nitrogen content for M-500C-S-N and M-700C-S-N. Relatively little difference is seen in the XRD patterns in FIG. 30 and FIG. 31, the broad (002) reflection of M-900C-S-N is still preserved after acidification, indicating no severe changes in carbon structure. As XRD only shows quite amorphous structures for untreated Mo$_2$C-CDCs, the resulting differences in surface species are best observed in the FTIR spectra in FIG. 32 and FIG. 33. Little significant functional groups were observed in Mo$_2$C-CDCs prior to acidification, and XPS data confirms that Mo$_2$C-CDCs have relatively little oxygen and no nitrogen content before acidification. There is a trend of increasing oxygen content at lower chlorination temperatures for untreated Mo$_2$C-CDCs. This has previously been seen in the literature for other carbide-derived carbons. One possible explanation is that there are more dangling bonds present in CDCs chlorinated at lower temperatures due to the reduced mobility of carbon. Oxygen is then able to form functionalities on the surface post-synthesis after reintroduction of ambient air. Although carbides typically have a layer of respective metal oxide after passivation, it is unlikely that any oxygen containing species originating from the carbide precursor are able to retained at such high chlorination and annealing temperatures.

Figure 33:
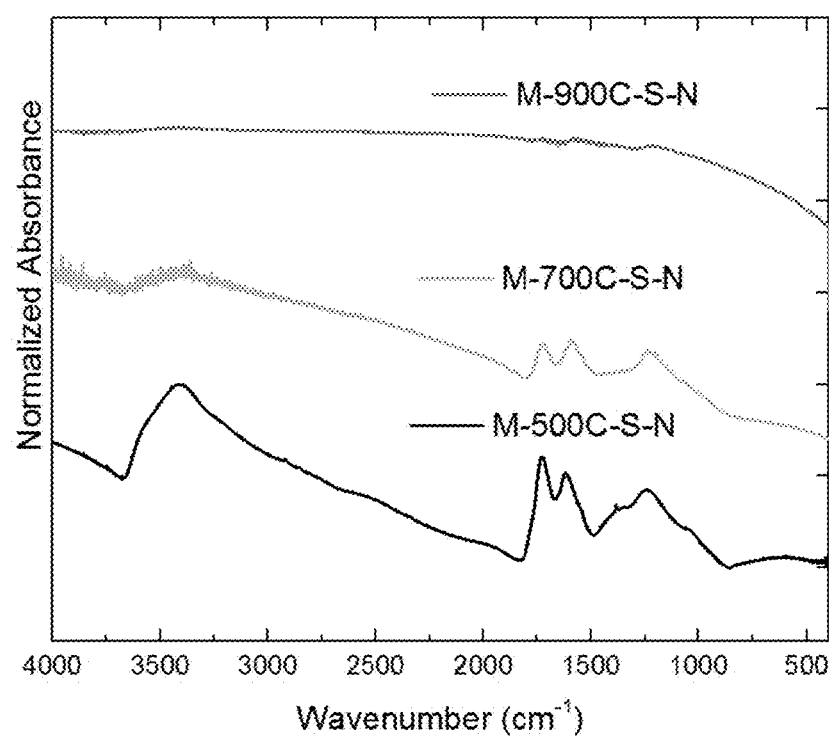
FIG. 33 is a graph of the FT-IR spectra of acid-treated $Mo_2C$-CDCs chlorinated at 500° C., 700° C., and 900° C.

After acidification, several groups are present in the FTIR spectra, seen in FIG. 33 and the XPS data in Table 7. Although FTIR is not quantitative, the relative intensities in the FTIR spectra for treated Mo$_2$C-CDCs reflect greater oxidation for samples chlorinated at lower temperatures. The intensities of these peaks match well with the mass percentage of oxygen determined by XPS. There is a correlation between chlorination temperature and degree of oxidation; as the chlorination temperature decreases the extent of oxidation increases. It is suggested that the oxygen species present after chlorination could cause greater differences in electronegativity on the carbon surface, facilitating easier attack by oxidative agents. In addition, at lower chlorination temperatures there is less reorganization of carbon, which could provide easier sites of attack for the formation of carbonyl and hydroxyl groups, similar to the fashion in which these groups are first added on amorphous sites on carbon nanotubes.

TABLE 7

XPS for prepared and treated Mo$_2$C-CDCs

| Sample Name | Amount C (wt %) | Amount O (wt %) | Amount N (wt %) | Amount S (wt %) | Amount Mo (wt %) |
|---|---|---|---|---|---|
| M-500O | 96.51 | 3.49 | 0.0 | 0.0 | 0.0 |
| M-700O | 98.39 | 1.61 | 0.0 | 0.0 | 0.0 |
| M-900O | 99.31 | 0.69 | 0.0 | 0.0 | 0.0 |
| M-500O-S-N | 75.98 | 22.16 | 1.86 | 0.0 | 0.0 |
| M-700O-S-N | 84.10 | 14.54 | 1.24 | 0.12 | 0.0 |
| M-900C-S-N | 95.82 | 4.18 | 0.0 | 0.0 | 0.0 |

A peak at ~1725 cm$^{-1}$ was present for all samples and quite sharp for M-700-S-N and M-500C-S-N. This peak was assigned to the C═O stretch for carboxylic acids and ketones. This vibration was not assigned to the C═O stretch in aldehydes, as this would be accompanied by two bands for the C—H stretch in the 2830-2695 cm$^{-1}$ region: the fundamental aldehydic C—H stretch and the first overtone of the C—H bending vibration due to Fermi resonance. Another aldehyde band, present around 2720 cm$^{-1}$, is also absent in the spectra of treated Mo$_2$C-CDCs suggesting that aldehyde groups are not present. M-500C-S-N and M-700C-S-N feature a broad band centered at 3410 cm$^{-1}$ ranging from 3000-3670 cm$^{-1}$. This band was assigned to O—H stretching modes, and it is likely that there is a large contribution from hydroxyl functional groups. The peaks at 1220 cm$^{-1}$, 1230 cm$^{-1}$, and 1240 cm$^{-1}$ for M-900C-S-N, M-700C-S-N, and M-500C-S-N are most likely due to the C—O stretch for carboxylic acids. In all samples there is another strong peak at ~1600 cm$^{-1}$ that gradually "shifts" from lower to higher wavenumbers with decreasing chlorination temperature, from 1580 cm$^{-1}$ to 1590 cm$^{-1}$ to 1615 cm$^{-1}$ in M-900C-S-N, M-700C-S-N, and M-500C-S-N respectively. This peak is tentatively assigned to aromatic ring stretching modes or highly conjugated carbonyl groups. In M-500C-S-N a small unique peak is observed at 1383 cm$^{-1}$—this peak is tentatively assigned to the asymmetrical stretch of nitrate groups in nitroalkanes.

XPS deconvolutions showed the presence of functional groups within the C1s, O1s, and N1s spectra. No significant contribution was seen in the S2p spectra, and no residual chlorine or molybdenum was observed in any of the acidified samples. A split peak is observed for the N1s spectra for M-500C-S-N and M-700C-S-N. The first peak at 400.1 eV and 400.5 eV for M-500C-S-N and M-700C-S-N corresponds to N—H bonds, pyrrolic, and pyridine nitrogen, while a second peak present at 405.5 eV and 405.76 eV is assigned to nitrate groups. Only instrumental noise is observed for the M-500C-S-N N1s spectrum. The O1s spectra was deconvoluted into three peaks for all samples. The first peak is present at ~531.2 eV for all treated samples and is assigned to carbonyl groups likely present in carboxylic acids and ketone groups. The second peak, present at ~532.6 eV, is assigned to C—O present in epoxy, phenol, and carboxyl groups. Finally, the third peak centered 536.4 eV is likely due to chemisorbed oxygen or water that cannot be removed with ultra-high vacuum.

The C1s spectra was deconvoluted into several contributions from oxygen containing functional groups. First, a large peak, corresponding to graphitic, aromatic or aliphatic carbon is seen at ~284.5 eV for all three acidified samples. The peak at ~286.0 eV is assigned to the C—O bond in hydroxyl groups. The next peak present at ~287.0 eV is assigned to carbonyl groups, and possible —C—N present in nitrogen containing M-500C-S-N and M-700C-S-N. There is a large peak present at ~288.4 eV assigned to the carbonyl group present in ketones, carboxylic acids, and esters. The peak at ~289.9 eV is assigned to carboxylic acids (O—C═O) and the satellite peak of the π-π* transition for aromatic carbon. Finally, the shoulder at ~293.0 eV is assigned to the plasmon band. There are marked differences for C1s spectrum for acidified Mo2C-CDCs. The increase in intensity for the ~288.4 eV peak assigned to C═O in ketones, carboxylic acids, and esters correlates well with the intensity of the C═O stretch for carboxylic acids and ketones seen in the FTIR spectra. The relative intensity of this peak also suggests a greater degree of acidification with decreasing chlorination temperature.

Ammonia Breakthrough Experiments for Mo$_2$C-CDCs

Figure 34:
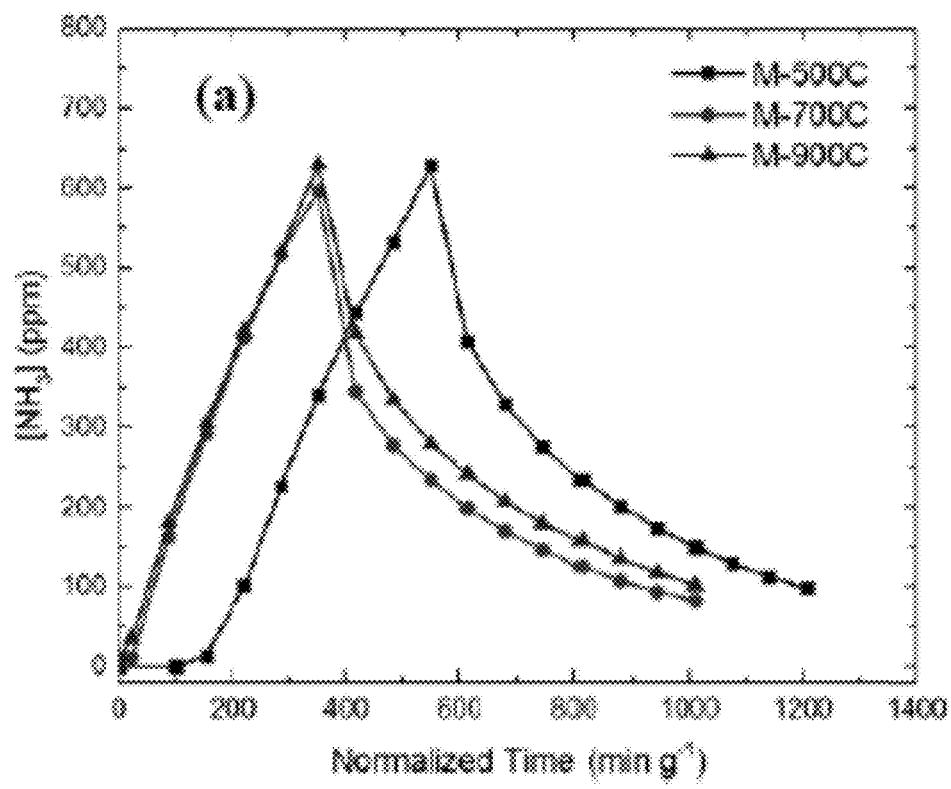
FIG. 34 is a graph of the ammonia breakthrough and desorption curves for untreated $Mo_2C$-CDCs under dry conditions (0% RH) plotted as [$NH_3$] (ppm) as a function of normalized time (min $g^{-1}$).
Figure 35:
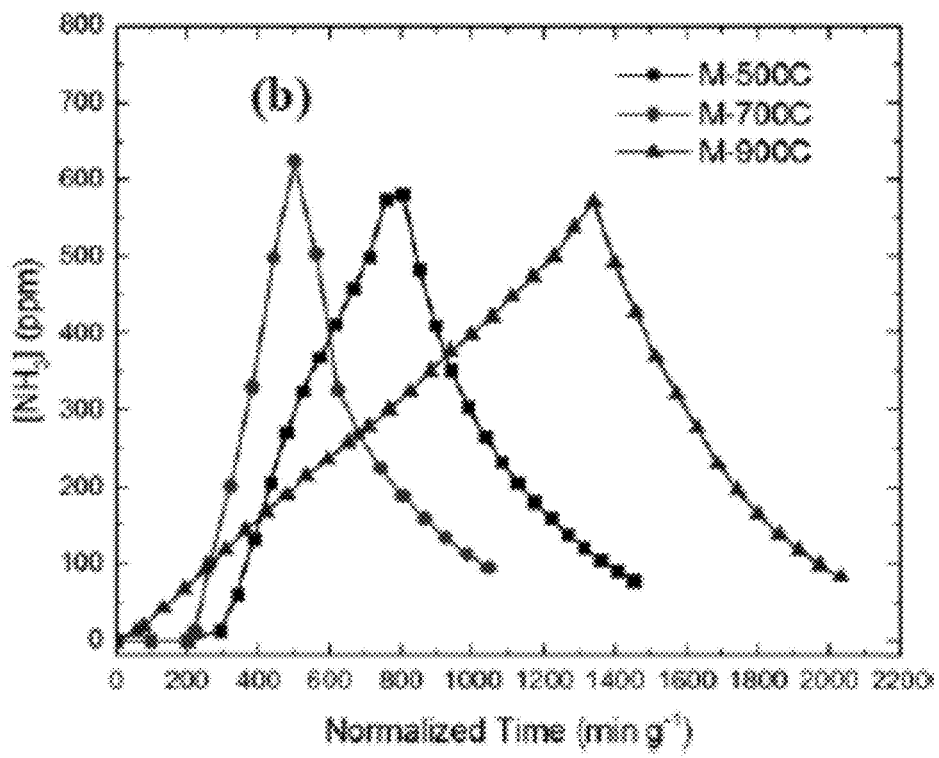
FIG. 35 is a graph of the ammonia breakthrough and desorption curves for untreated $Mo_2C$-CDCs under humid conditions (75% RH) plotted as [$NH_3$] (ppm) as a function of normalized time (min $g^{-1}$).

Ammonia dynamic adsorptive performance was tested under both dry and wet conditions for treated and untreated samples and the results are summarized in Table 8. Before acidification, Mo$_2$C-CDCs exhibit nearly instantaneous breakthrough in dry conditions, and marginally better performance with the addition of water in humid environments. Despite exceptional bulk porosity, Mo2C-CDCs can retain very little ammonia regardless of their pore size. Without the addition of specific interactions via acidifications, untreated samples cannot effectively bind ammonia to the surface. There is a slight trend of increased capacity with increasing microporosity, particularly under humid conditions. Water adsorbs more efficiently in small micropores, and it is likely that the higher volume of micropores and high amount of oxygen functionalities together increase the dynamic capacity for M-500C and M-700C Breakthrough adsorption curves for both wet and dry conditions can be seen in FIG. 34 and FIG. 35.

Dry and humid dynamic loadings for all samples drastically increased after acidification. M-500C-S-N exhibits the best dynamic capacity, adsorbing 4.95 mmol NH$_3$ and 6.01 mmol NH$_3$ per gram adsorbent under both dry and humid conditions respectively. M-700C-S-N also has great capacity with or without the presence of water, adsorbing 4.83 mmol g$^{-1}$ and 4.85 mmol g$^{-1}$ respectively. M-900C-S-N, which had the lowest functionalization based on XPS and FTIR measurements, had modest performance in comparison. However, when compared to its untreated analog, M-900C-S-N had drastic improvements in both dry (0.99 mmol g$^{-1}$) and wet capacity (1.31 mmol g$^{-1}$).

TABLE 8

Dry and Humid NH$_3$ dynamic capacities for prepared Mo$_2$C-CDCs

| Sample Name | Specific Surface Area (m$^2$ g$^{-1}$) | Pore Volume (cc g$^{-1}$) | Dry NH$_3$ Dynamic Capacity (mmol g$^{-1}$)$^a$ | Humid NH$_3$ Dynamic Capacity (mmol g$^{-1}$)$^a$ |
|---|---|---|---|---|
| M-500C | 1457 | 1.05 | 0.21 | 0.37 |
| M-700C | 1793 | 1.61 | 0.05 | 0.28 |
| M-900C | 1141 | 1.63 | 0.00 | 0.07 |
| M-500C-S-N | 557 | 0.26 | 4.95 | 6.01 |
| M-700C-S-N | 773 | 0.41 | 4.83 | 4.85 |
| M-900C-S-N | 714 | 0.74 | 0.99 | 1.31 |

$^a$Calculated by initial breakthrough time

A modified Boehm titration method was employed to quantify the total amount of acidic functional groups on the surface of treated samples and normalize breakthrough performance. Increasing acidic group content is seen at lower chlorination temperatures in Table 9, and correlates well with differences seen in the XPS and FTIR spectra of the treated samples. It is further suggested that there is a negative correlation between chlorination temperature and degree of acidification. Further identification of these oxygen containing surface groups could not be accurately employed through Boehm titration, as nitrogen groups present in XPS have similar pKa values, preventing deconvolution of the relative amounts of lactone, phenol, and carboxylic acid groups.

After normalization of acidic groups, predominately microporous samples are seen to perform the best under both dry and humid conditions. On a per acidic molar basis, M-900C-S-N still falls short in performance compared to M-700C-S-N and M-500C-S-N, which suggests that micropores best promote ammonia interactions with grafted acidic groups. As both the M-500C-S-N and M-700C-S-N have ammonia loadings in molar excess of their molar acidic groups under both wet and dry conditions, it is possible some ammonia is retained temporarily in small micropores within these samples or as a multilayer. Through breakthrough experiments on untreated Mo$_2$C-CDCs, it is clear that the presence of micropores without the presence of specific acidic groups are ineffective at binding appreciable amounts of ammonia.

Figure 36:
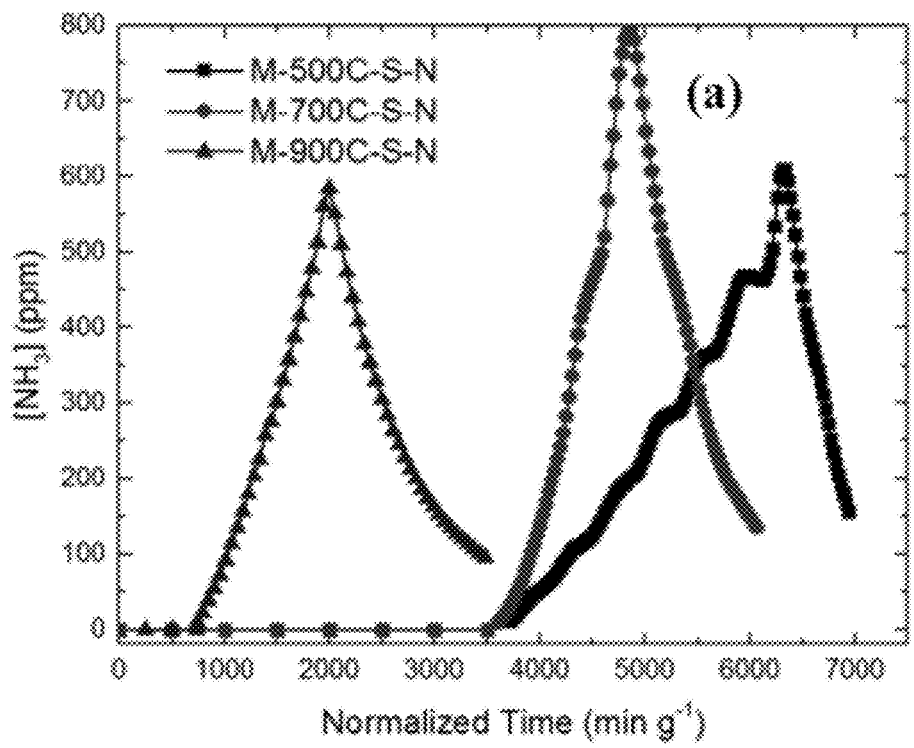
FIG. 36 is a graph of the ammonia breakthrough and desorption curves for acid-treated $Mo_2C$-CDCs under dry conditions (0% RH) plotted as [$NH_3$] (ppm) as a function of normalized time (min $g^{-1}$).
Figure 37:
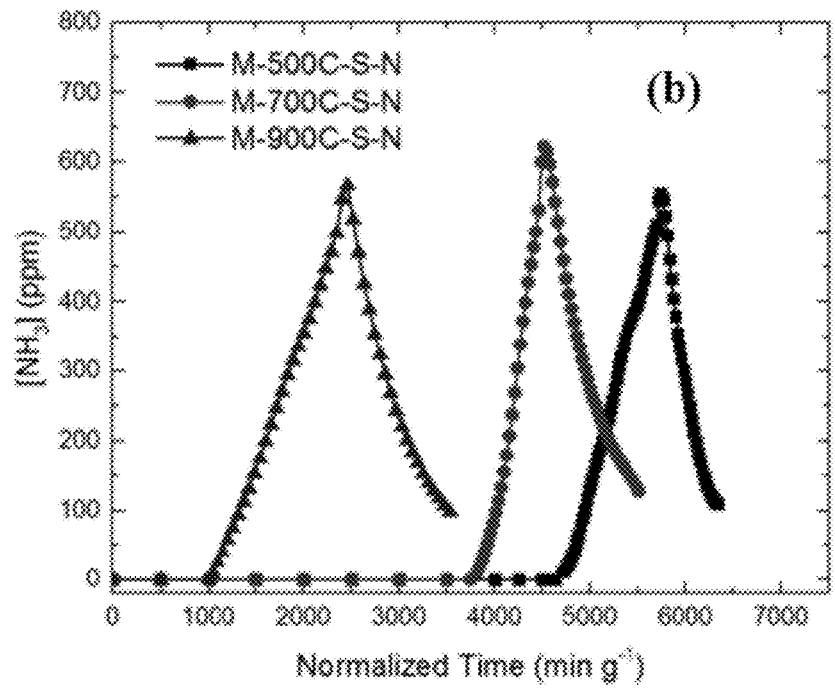
FIG. 37 is a graph of the ammonia breakthrough and desorption curves for acid-treated $Mo_2C$-CDCs under humid conditions (75% RH) plotted as [$NH_3$] (ppm) as a function of normalized time (min $g^{-1}$).

An increase in capacity under humid conditions is seen for all samples. As previously mentioned, ammonia is readily soluble in co-adsorbed water films due to hydrogen bonding. The formation of $NH_4^+$ upon dissolution is beneficial to reactive adsorption routes, such as facilitating acid-base interactions and the formation of an ammonium salt with deprotonated carboxylic acids. It was previously hypothesized that 2-3 nm pores would be the ideal size to accommodate water, functional groups, and ammonia. M-700C-S-N had the highest volume of these pores, but exhibited slightly decreased normalized capacity when compared to M-500C-S-N. It is possible that under wet conditions, smaller micropores are more advantageous. It is interesting to note that under dry conditions, M-500C-S-N has decreased normalized capacity. The irregular shape of the breakthrough curve in FIG. 36 suggests that at significantly small pore sizes, there could be diffusional issues that prevent efficient utilization of acidic groups. A similar, but less drastic change in slope is seen for M-700C-S-N around 4500 min g-1. Comparatively worse performance was also noted for highly microporous TiC-CDCs in H2S filtration applications. In addition to diffusion limitations, the location and dispersion of the functional groups can be crucial for targeting ammonia molecules before they are able to break through the packed bed. It is possible that acidic groups are more clustered in mainly microporous supports after acidification. Groups clustered near the entrance of small micropores could then hinder both the acidification of internal porosity and the accessibility of ammonia to these inner pore spaces.

Interestingly, under humid conditions, no significant changes in slope appeared in the breakthrough curve for M-500C-S-N or M-700C-S-N. It is suggested from these results that the presence of water can either aid diffusion of ammonia in the pore space, or negate this diffusional issue through another effect. Intuitively however, the diffusion of a molecule in empty pore space should be faster than through a film. It is possible that significant amounts of acidic functional groups on the surface of each CDC particle are able to form water films and attract ammonia to the internal pore space.

TABLE 9

Acidic Group Content in treated Mo2C-CDCs

| Sample Name | Acidic groups (mmol g$^{-1}$) | Dry Dynamic Capacity per Acidic Group (mmol NH$_3$/mmol acidic group) | Wet Dynamic Capacity per Acidic Group (mmol NH$_3$/mmol acidic group) |
|---|---|---|---|
| M-500C-S-N | 4.69 | 1.06 | 1.28 |
| M-700C-S-N | 4.30 | 1.12 | 1.13 |
| M-900C-S-N | 2.42 | 0.41 | 0.54 |

Analysis of Adsorption Mechanisms on Treated Mo$_2$C-CDCs

Figure 38:
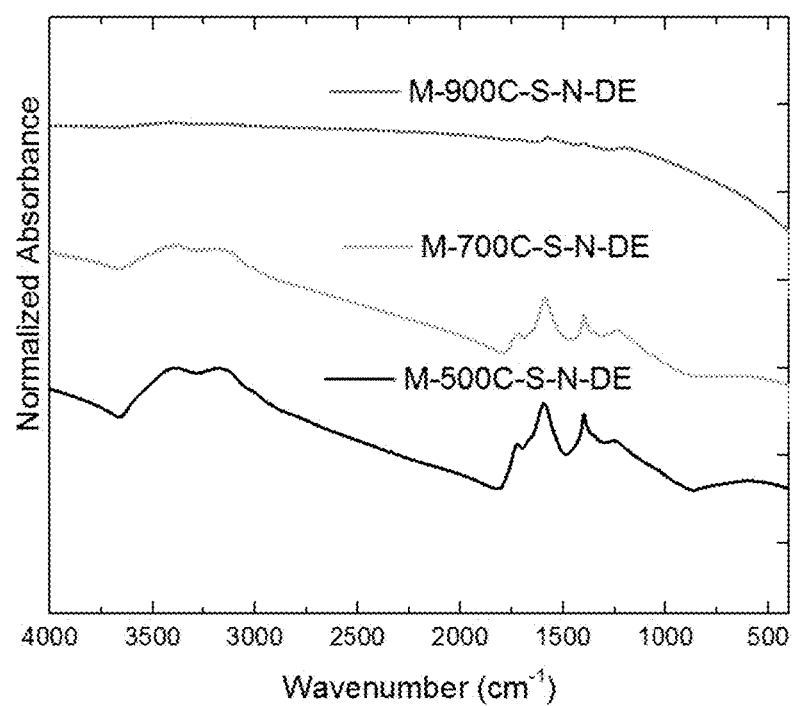
FIG. 38 is a graph of the FTIR spectra of dry exhausted (DE) acid-treated $Mo_2C$-CDCs.
Figure 39:
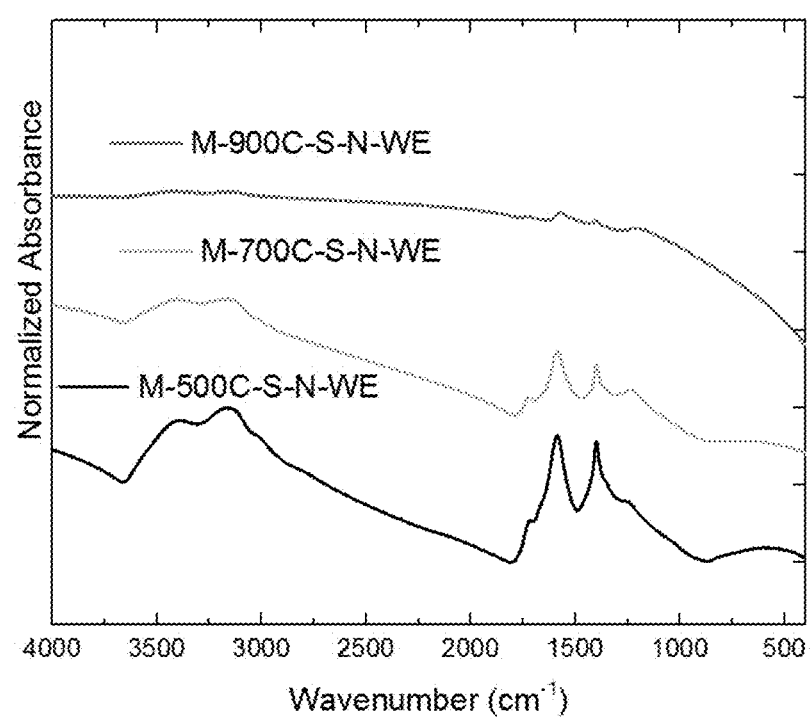
FIG. 39 is a graph of the FTIR spectra of wet exhausted (WE) acid-treated $Mo_2C$-CDCs.

FTIR spectra were collected on dry exhausted (DE) and wet exhausted (WE) samples to probe the specific adsorption mechanisms. In FIG. 38 and FIG. 39, there is a strong decrease in intensity for the peak at −1725 cm$^{-1}$ for all samples. This peak, previously assigned to the C=O stretch for carboxylic acids and ketones, suggests the reactive adsorption of ammonia with carboxylic acid groups. This is further supported by the decrease in intensity of the peak at 1220-1240 cm$^{-1}$ previously assigned to the C—O stretch for carboxylic acids. The appearance of a peak at 1402 cm$^{-1}$ is attribute to ammonium ions. Ammonia is able to interact with carboxylic acids through the use of its lone pair of electrons to form an ammonium salt. The previous broad peak ranging from 3000-3670 cm$^{-1}$ and centered at 3410 cm$^{-1}$ assigned to the O—H in various environments has broadened into peaks centered at 3150 cm$^{-1}$ and 3400 cm$^{-1}$. The broadening of this range is suggested to result from the conversion of esters to hydroxyl groups as ammonia is converted to surface NH$_2$ groups. These peak positions are relatively constant for all samples, but there is an increase in intensity with decreasing chlorination temperature and from dry to humid conditions for each sample. This correlates well with the dynamic loading capacity under each respective sample and condition.

Observations

A series of Mo$_2$C-CDCs were chlorinated at different temperatures to produce porous carbons with unique micro, micro/meso, and mesoporous pore spaces. These as-synthesized CDCs were then subjected to sulfuric and nitric acid treatment to form acidic functional groups on the surface. It was shown through FTIR that acidic oxygen groups were able to effectively bind ammonia to the surface through reactive mechanisms. After normalization on a per acidic group basis, results suggest that a microporous and small mesoporous pore structure is ideal for ammonia adsorption on an acid functionalized carbonaceous support, as M-700C-S-N is seen to have the highest utilization of acidic functional groups. In terms of dynamic adsorption on a per mass basis, M-500C-S-N had the highest dynamic capacity under both dry (4.95 mmol g$^{-1}$) and humid (6.01 mmol g$^{-1}$) conditions. However, these breakthrough capacities were calculated initial breakthrough, when the sensor registers [NH$_3$]>0 ppm. In contrast, the target loading is a saturated loading, and includes the amount of ammonia adsorbed until the sensor reaches the inlet concentration of [NH$_3$]=~1500 ppm. Through integration of the adsorbed amount of NH$_3$ from 0 to 500 ppm on the breakthrough curve, M-500C-S-N was estimated to have a dynamic capacity of 7.10 mmol g$^{-1}$ and 6.81 mmol g$^{-1}$ when under dry and wet conditions at [NH$_3$]=500 ppm. There are possible diffusion limitations noted for M-500C-S-N, and M-700C-S-N under dry conditions, due to irregular shapes in the breakthrough curve.

Curiously, this is not seen in humid conditions and dynamic adsorption studies on water could potentially bring key insight into this phenomenon. For ideal performance in a dynamic ammonia filtration process, there is likely a trade-off between effective diffusivity to active sites on the carbonaceous framework, requiring mesopores, and adequate proximity to nearby acidic groups, requiring small micropores.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A carbide-derived carbon comprising a plurality of metallic nanoparticles entrapped therein, the carbide derived carbon made by the steps of:
    extracting a metal from a metal carbide by chlorination of the metal carbide to produce a porous carbon framework having residual metal chloride nanoparticles incorporated therein,
    removing residual chloride by reducing the metal chloride nanoparticles to produce the metallic nanoparticles entrapped within the porous carbon framework, and
    reacting the carbide-derived carbon with a strong acid to produce the carbide-derived carbon having a plurality of acidic functional groups covalently attached to the porous carbon framework.

2. The carbide-derived carbon of claim 1, wherein the strong acid is sulfuric acid, nitric acid, or a combination of sulfuric acid and nitric acid.

3. The carbide-derived carbon of claim 1, wherein the acidic functional groups are present at a concentration of 2 mmol $g^{-1}$ to 10 mmol $g^{-1}$ based upon the weight of the carbide-derived carbon.

4. The carbide-derived carbon of claim 1, wherein the carbide-derived carbon has an ammonia dynamic loading capacity that is 300% to 1500% greater than the ammonia dynamic loading capacity of the otherwise same carbide-derived carbon except without the metallic nanoparticles,
    wherein the ammonia dynamic loading capacities are measured under the same conditions and at the same relative humidity.

5. The carbide-derived carbon of claim 1, wherein the carbide-derived carbon has an ammonia dynamic loading capacity of 1.5 mmol $g^{-1}$ to 10 mmol $g^{-1}$ at 0% RH.

6. The carbide-derived carbon of claim 1, wherein the carbide-derived carbon has an ammonia dynamic loading capacity of 3 mmol $g^{-1}$ to 15mmol $g^{-1}$ at 75% RH.

7. The carbide-derived carbon of claim 1, wherein the carbide-derived carbon has an ammonia dynamic loading capacity of 6.9 mmol $g^{-1}$ to 10 mmol $g^{-1}$ at a relative humidity of 0% RH to 75% RH.

8. The carbide-derived carbon of claim 1, wherein the metal is present in an amount from 2.0 wt % to 25.0 wt% based upon the weight of the carbide-derived carbon.

9. The carbide-derived carbon of claim 1, wherein the metal is selected from the group consisting of Fe, Co, Ni, Al, Mo, and a combination thereof.

10. The carbide-derived carbon of claim 1, wherein the carbide-derived carbon has a surface area of 300 $m^2$ $g^{-1}$ to 900 $m^2$ $g^{-1}$.

11. The carbide-derived carbon of claim 1, wherein the carbide-derived carbon has a pore volume of 0.2 cc $g^{-1}$ to 0.8 cc $g^{-1}$.

12. The carbide-derived carbon of claim 1, wherein the metallic nanoparticles have an average particle diameter of 1 nm to 10 nm.

* * * * *